US011783392B2

(12) United States Patent
Caraway et al.

(10) Patent No.: US 11,783,392 B2
(45) Date of Patent: Oct. 10, 2023

(54) SELF-ORGANIZING HANGING SYSTEM

(71) Applicant: Invi Works, LLC, The Woodlands, TX (US)

(72) Inventors: Autumn L. Caraway, Ann Arbor, MI (US); Angela M. Caraway, The Woodlands, TX (US); Nathaniel R. Caraway, The Woodlands, TX (US); R. Patrick Caraway, The Woodlands, TX (US)

(73) Assignee: Invi Works, LLC, The Woodlands, TX (US)

( * ) Notice: Subject to any disclaimer, the term of this patent is extended or adjusted under 35 U.S.C. 154(b) by 0 days.

(21) Appl. No.: 17/321,638

(22) Filed: May 17, 2021

(65) Prior Publication Data

US 2021/0357999 A1    Nov. 18, 2021

Related U.S. Application Data

(60) Provisional application No. 63/026,334, filed on May 18, 2020.

(51) Int. Cl.
*A47F 7/24*         (2006.01)
*G06Q 30/0601*   (2023.01)
(Continued)

(52) U.S. Cl.
CPC .......... *G06Q 30/0601* (2013.01); *A47F 7/24* (2013.01); *A47F 9/00* (2013.01); *A47F 10/00* (2013.01);
(Continued)

(58) Field of Classification Search
CPC ...... A47F 7/24; A47F 2010/005; A47F 10/00; A47F 9/00; A47G 25/06; A47G 25/0692;
(Continued)

(56) References Cited

U.S. PATENT DOCUMENTS 3,342,344 A * 9/1967 Magnuson ......... A47G 25/0692
                                                             211/113
3,452,878 A * 7/1969 Smith .................... B60R 7/088
                                                            312/107
(Continued)

FOREIGN PATENT DOCUMENTS

CN      107095555 A  *  8/2017
CN      111838989 A  *  10/2020
(Continued)

OTHER PUBLICATIONS

Longo Dit Operti, T., International Search Report for the International Patent Application No. PCT/2021/032697 dated Aug. 13, 2021.
(Continued)

*Primary Examiner* — Patrick D Hawn
(74) *Attorney, Agent, or Firm* — JACKSON WALKER, LLP

(57) ABSTRACT

A self-organizing hanging system generally includes at least two main components—bars and keys. The bars have at least three embodiments: standard embodiment, valet embodiment, and shelf embodiment. Each embodiment has variations of embodiments of bars and keys. Each of the bars and keys can have embodiments of magnetic elements and anti-rotation elements. The keys have additional opportunities for variations of embodiments to couple with a product support. In at least one aspect, the bars can be formed with receiver stations at predetermined spacing to cause organized placement for coupling keys with the bars. Further, the bars and keys can be coupled to appear as an integral assembly with one or more external surfaces in planar uniformity.

14 Claims, 54 Drawing Sheets

(51) Int. Cl.
*A47F 10/00* (2006.01)
*A47G 25/06* (2006.01)
*A47F 9/00* (2006.01)

(52) U.S. Cl.
CPC ........ *A47G 25/06* (2013.01); *A47F 2010/005* (2013.01)

(58) Field of Classification Search
CPC ............ A47G 25/0664; A47G 25/0678; B65G 2201/0229; B65G 1/0457; B65G 17/20; B65G 17/42; B65G 19/025
See application file for complete search history.

(56) References Cited

U.S. PATENT DOCUMENTS

| | | | | |
|---|---|---|---|---|
| 5,160,048 A * | 11/1992 | Leyden | ................ | E05B 69/006 70/59 |
| 7,137,515 B1 * | 11/2006 | Lawson | ............... | A47G 25/746 211/85.3 |
| 7,802,680 B2 * | 9/2010 | Krebs | ..................... | B25H 3/04 206/349 |
| 7,887,146 B1 * | 2/2011 | Louie | ...................... | G07F 11/64 211/85.15 |
| 7,909,186 B1 * | 3/2011 | Contreras | .......... | A47G 25/0664 211/124 |
| 8,840,162 B1 * | 9/2014 | Williams | ............. | B65H 75/366 294/143 |
| 9,441,875 B1 * | 9/2016 | Froehlich | ................ | F25D 25/00 |
| 10,729,244 B2 * | 8/2020 | Hansen, II | ............ | A47F 5/0093 |
| 10,875,173 B1 * | 12/2020 | Kao | ....................... | B25H 3/003 |
| 11,311,130 B1 * | 4/2022 | Ebersole | ................ | F16B 12/32 |
| 11,317,741 B2 * | 5/2022 | Willach | ................. | B65D 33/14 |
| 2002/0153337 A1 * | 10/2002 | Shuen | ...................... | B60R 7/10 211/105.3 |
| 2003/0189141 A1 * | 10/2003 | Turvey | ................... | B65D 33/14 248/95 |
| 2006/0231516 A1 * | 10/2006 | Moore | ............... | A47G 25/0692 211/85.3 |
| 2010/0084530 A1 * | 4/2010 | Lai | ..................... | A47G 25/0678 248/304 |
| 2012/0326887 A1 | 12/2012 | Inoko | | |
| 2022/0154389 A1 * | 5/2022 | Alexander | ............. | A47G 25/14 |

FOREIGN PATENT DOCUMENTS

| | | | | |
|---|---|---|---|---|
| CN | 214804017 U | * | 11/2021 | |
| CN | 113951640 A | * | 1/2022 | |
| CN | 216454489 U | * | 5/2022 | |
| DE | 8801999 U1 | | 4/1988 | |
| DE | 29805778 U1 | | 9/1999 | |
| FR | 995555 A | | 12/1951 | |
| FR | 3083068 A1 | * | 1/2020 | ......... A47G 25/0664 |
| FR | 3083068 A1 | | 1/2020 | |
| WO | 2006004288 A2 | | 1/2006 | |
| WO | WO-2006004288 A2 | * | 1/2006 | ........... A47F 5/0006 |

OTHER PUBLICATIONS

Longo Dit Operti, T., Written Opinion for the International Patent Application No. PCT/2021/032697 dated Aug. 13, 2021.

* cited by examiner

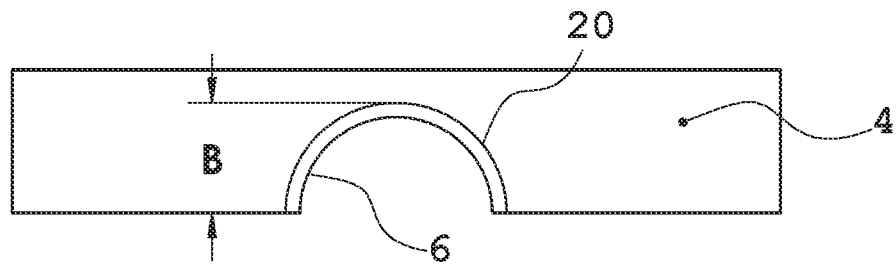
FIG. 2D
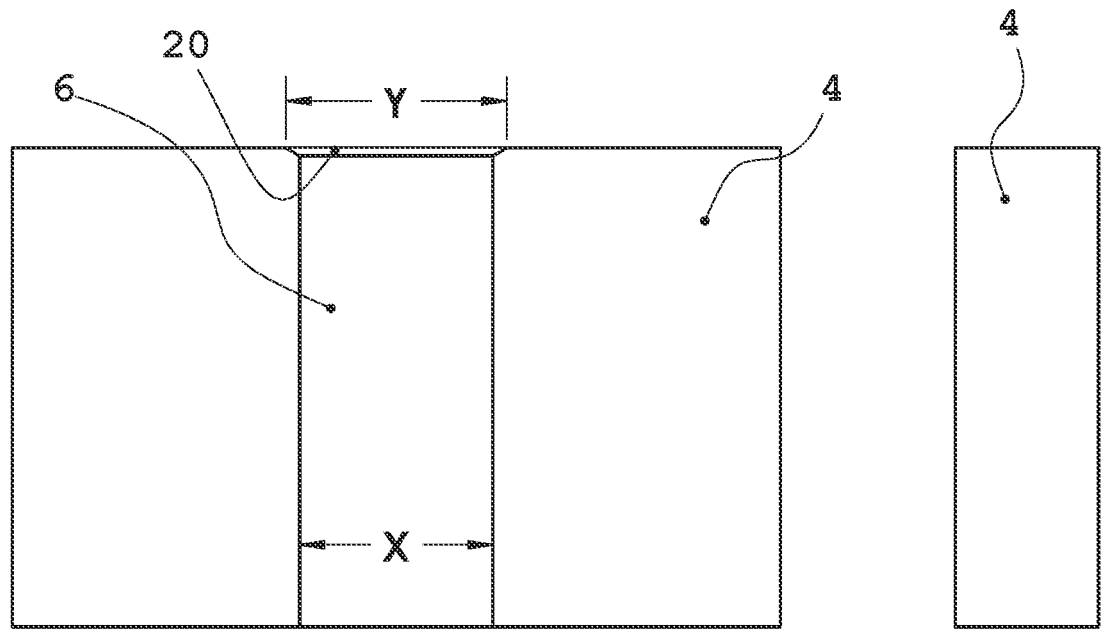
FIG. 2C
FIG. 2F
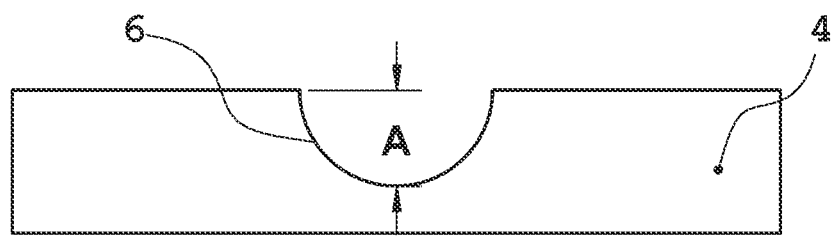
FIG. 2E

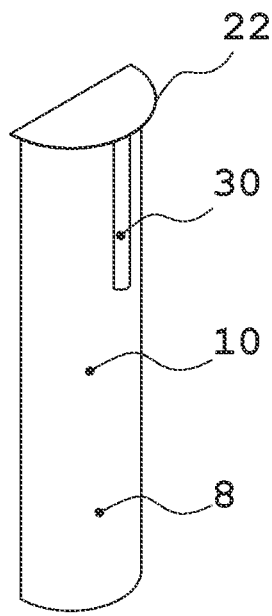
FIG. 6A
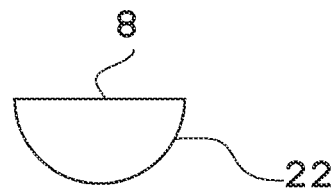
FIG. 6D
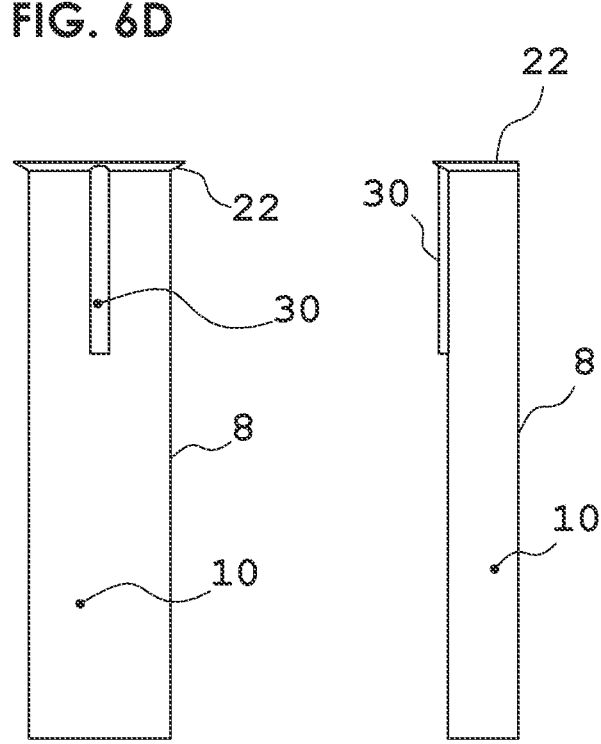
FIG. 6C
FIG. 6F
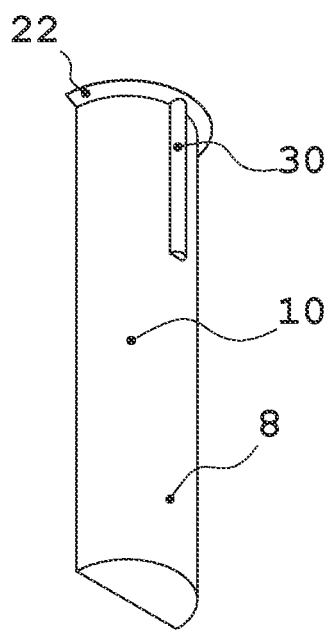
FIG. 6B
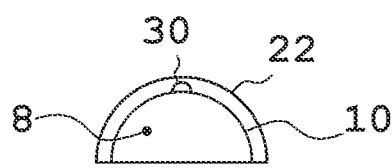
FIG. 6E

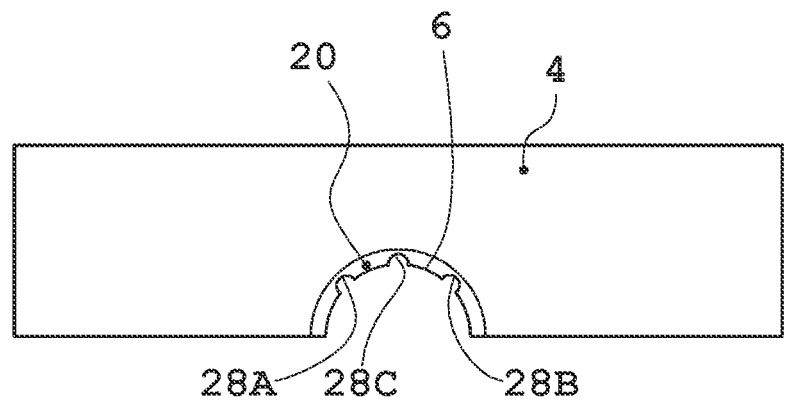
FIG. 9B
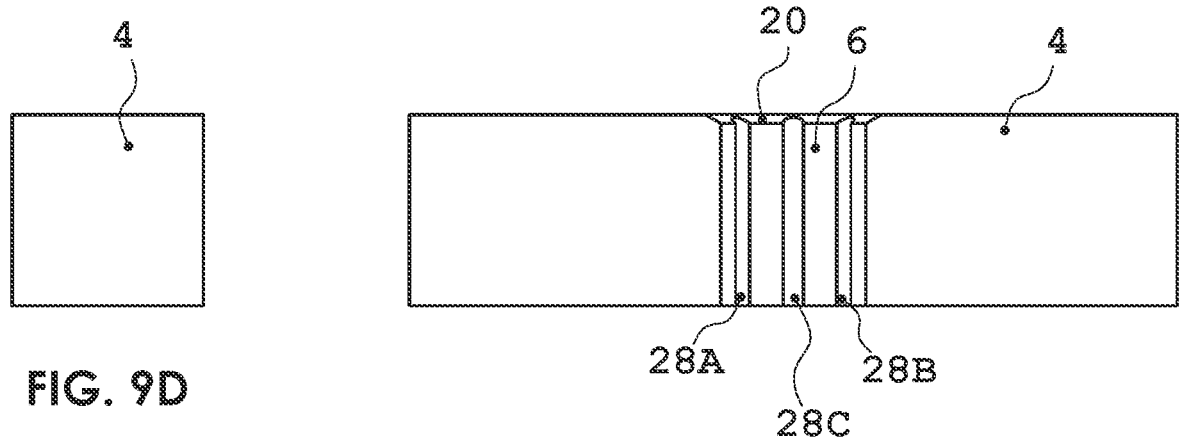
FIG. 9D
FIG. 9A
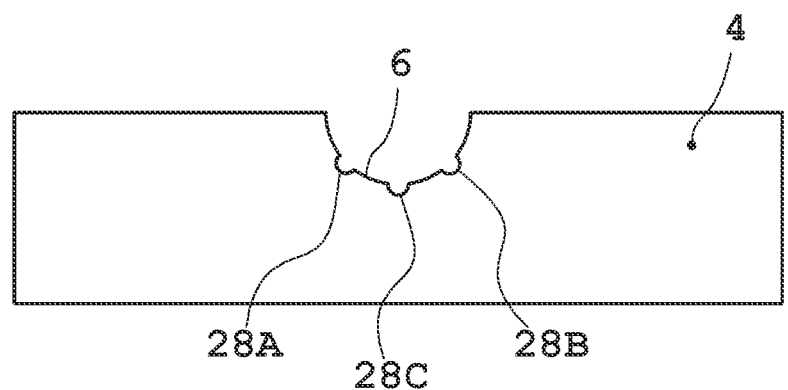
FIG. 9C

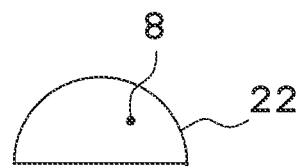
FIG. 13D
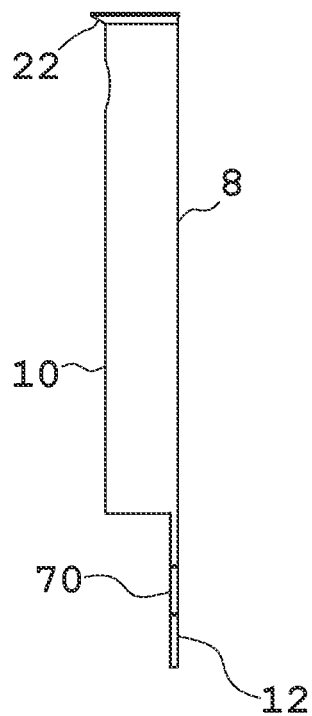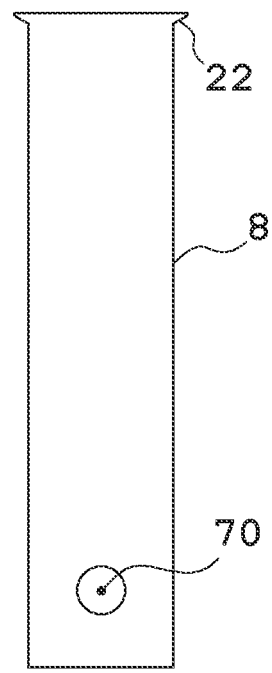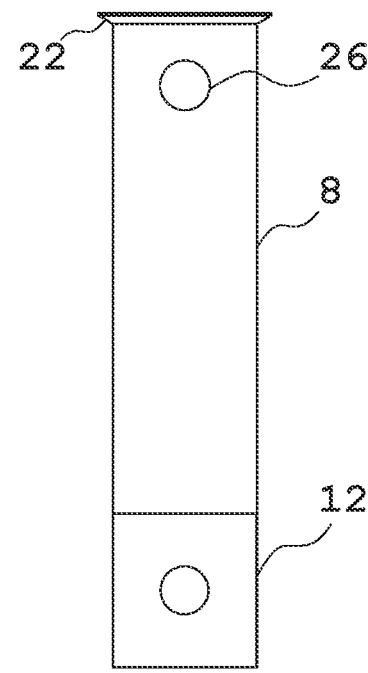
FIG. 13F     FIG. 13C     FIG. 13G
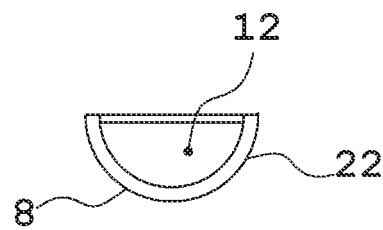
FIG. 13E

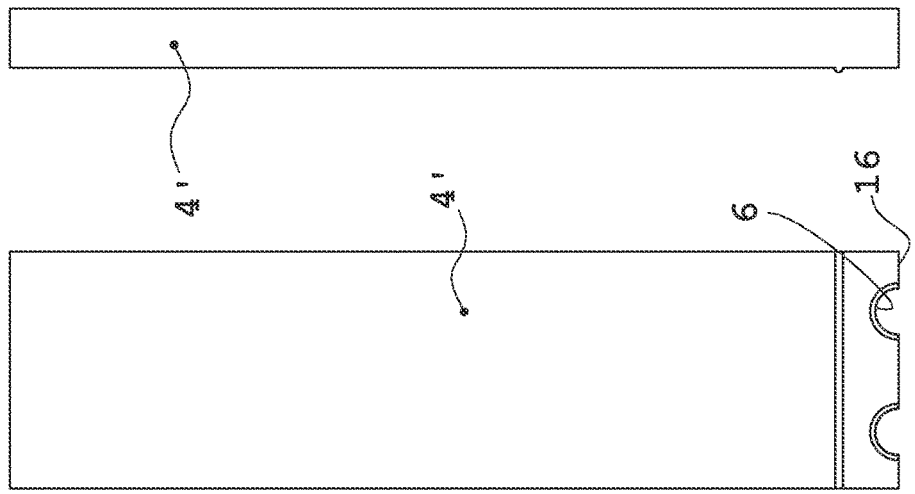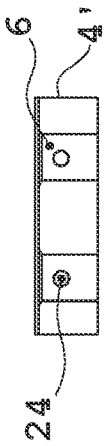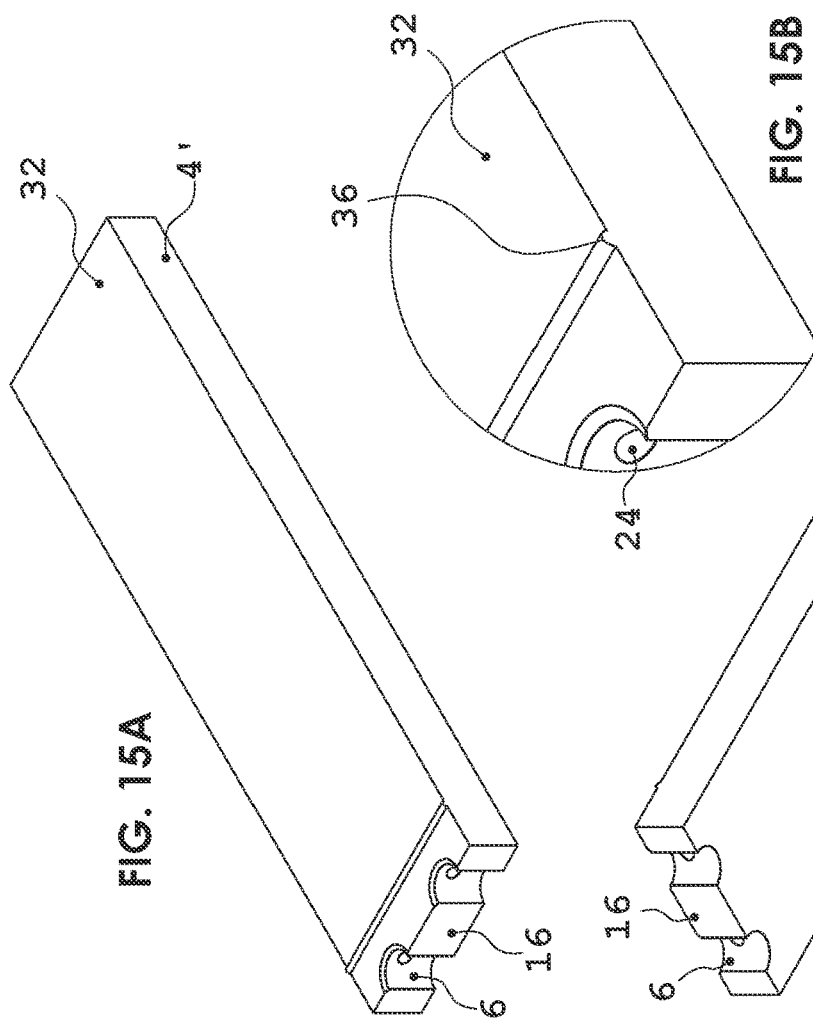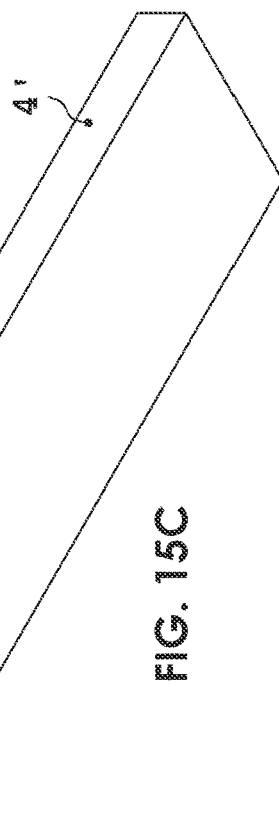

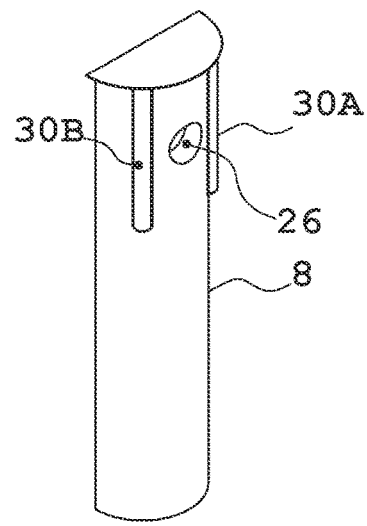
FIG. 17A
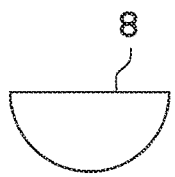
FIG. 17D
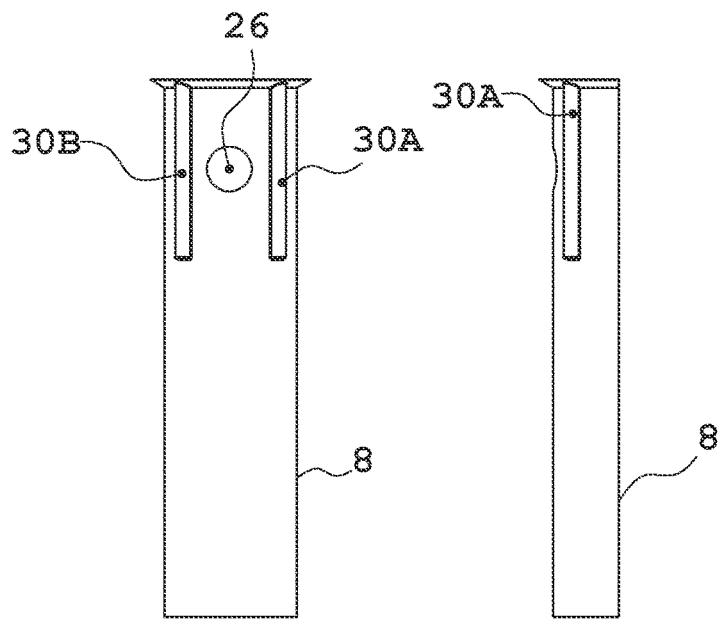
FIG. 17C
FIG. 17F
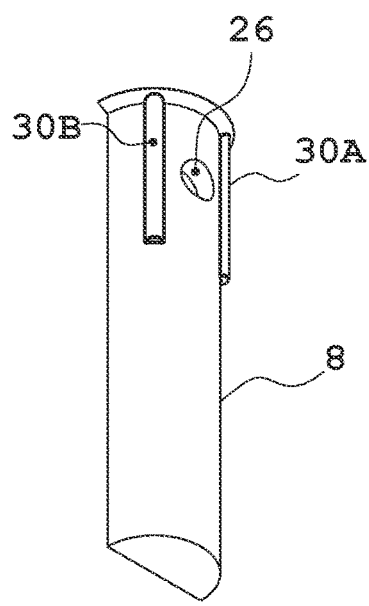
FIG. 17B
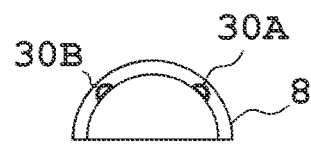
FIG. 17E

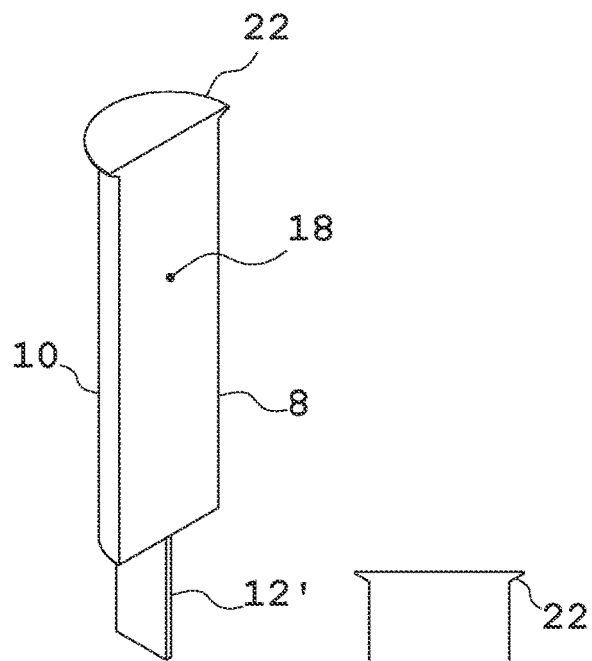
FIG. 25A
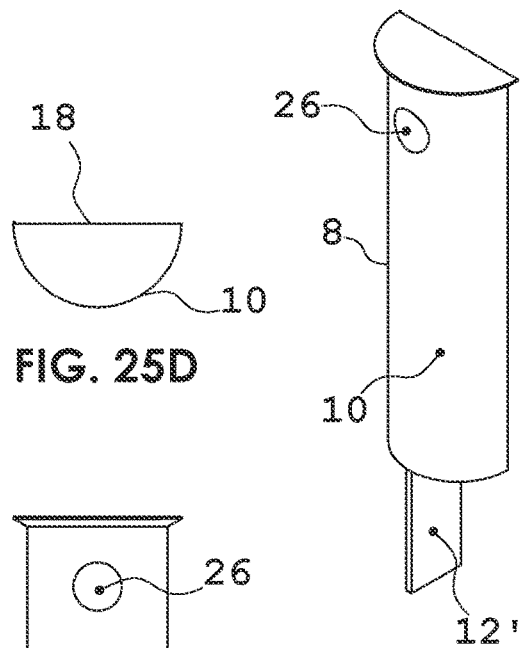
FIG. 25D
FIG. 25B
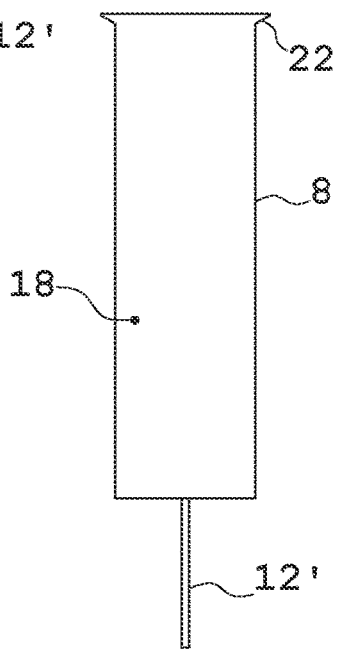
FIG. 25F
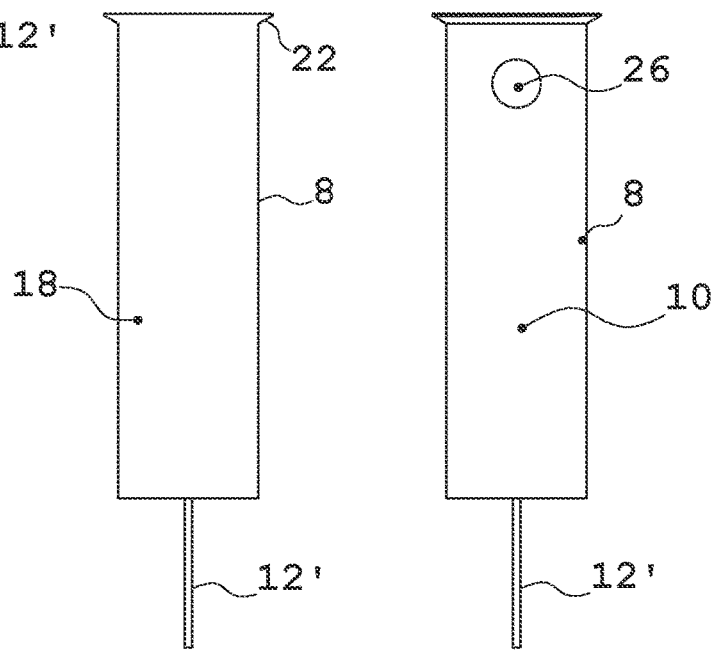
FIG. 25C
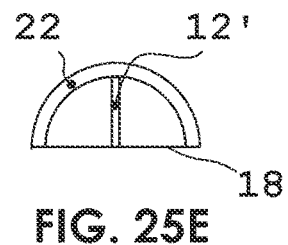
FIG. 25E

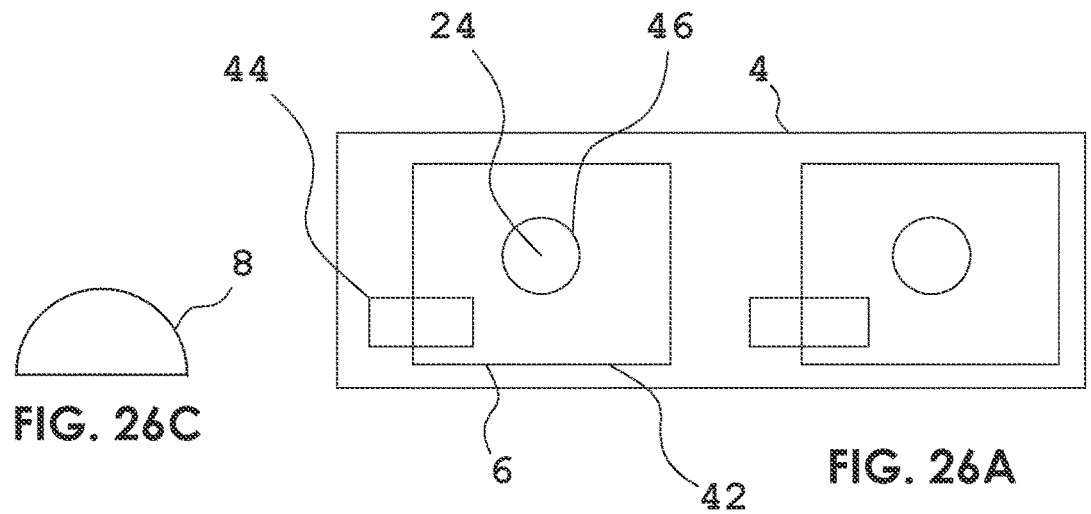
FIG. 26C
FIG. 26A
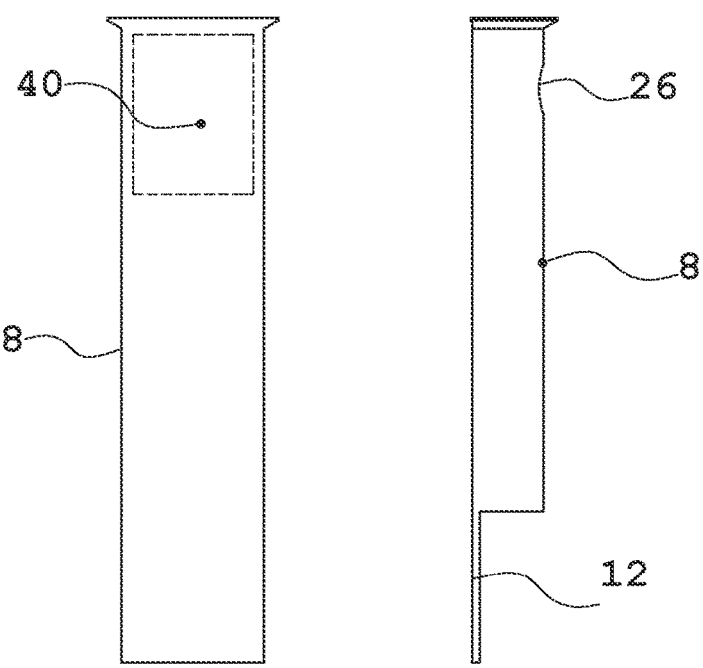
FIG. 26B
FIG. 26E
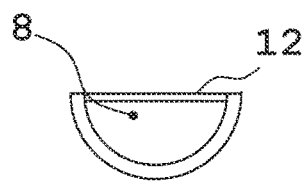
FIG. 26D

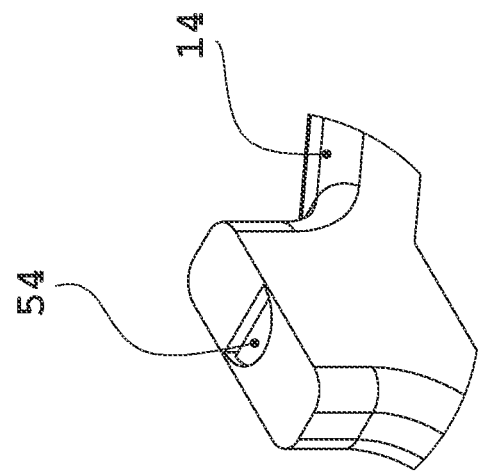
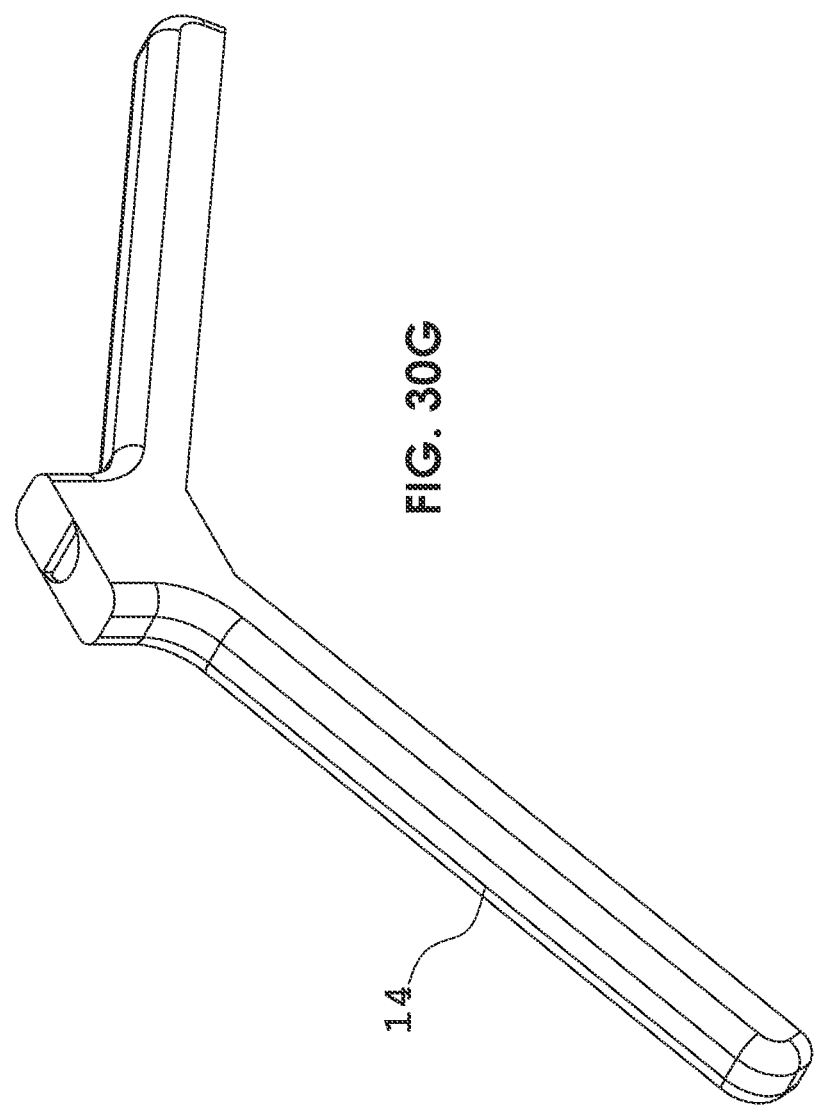

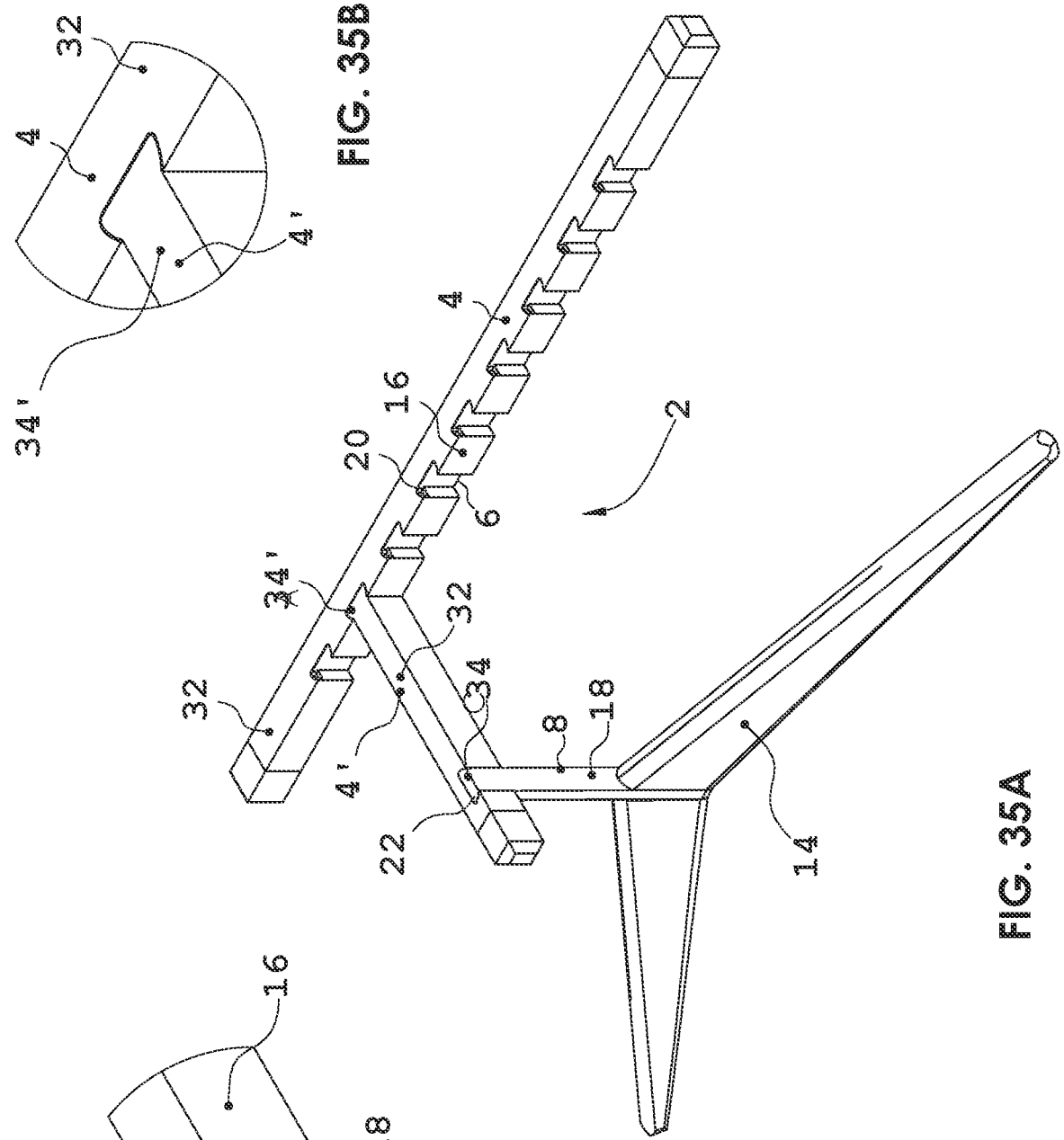

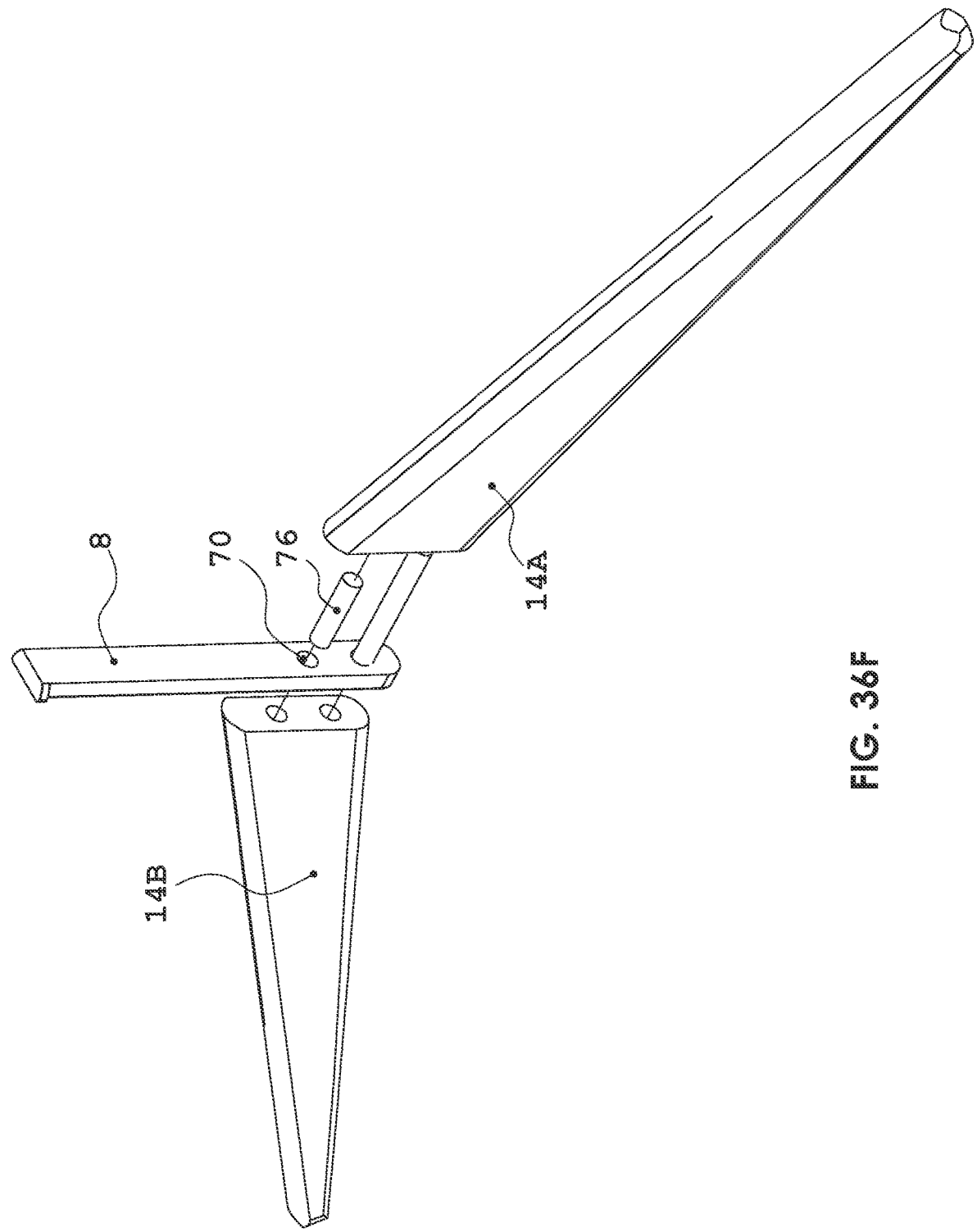

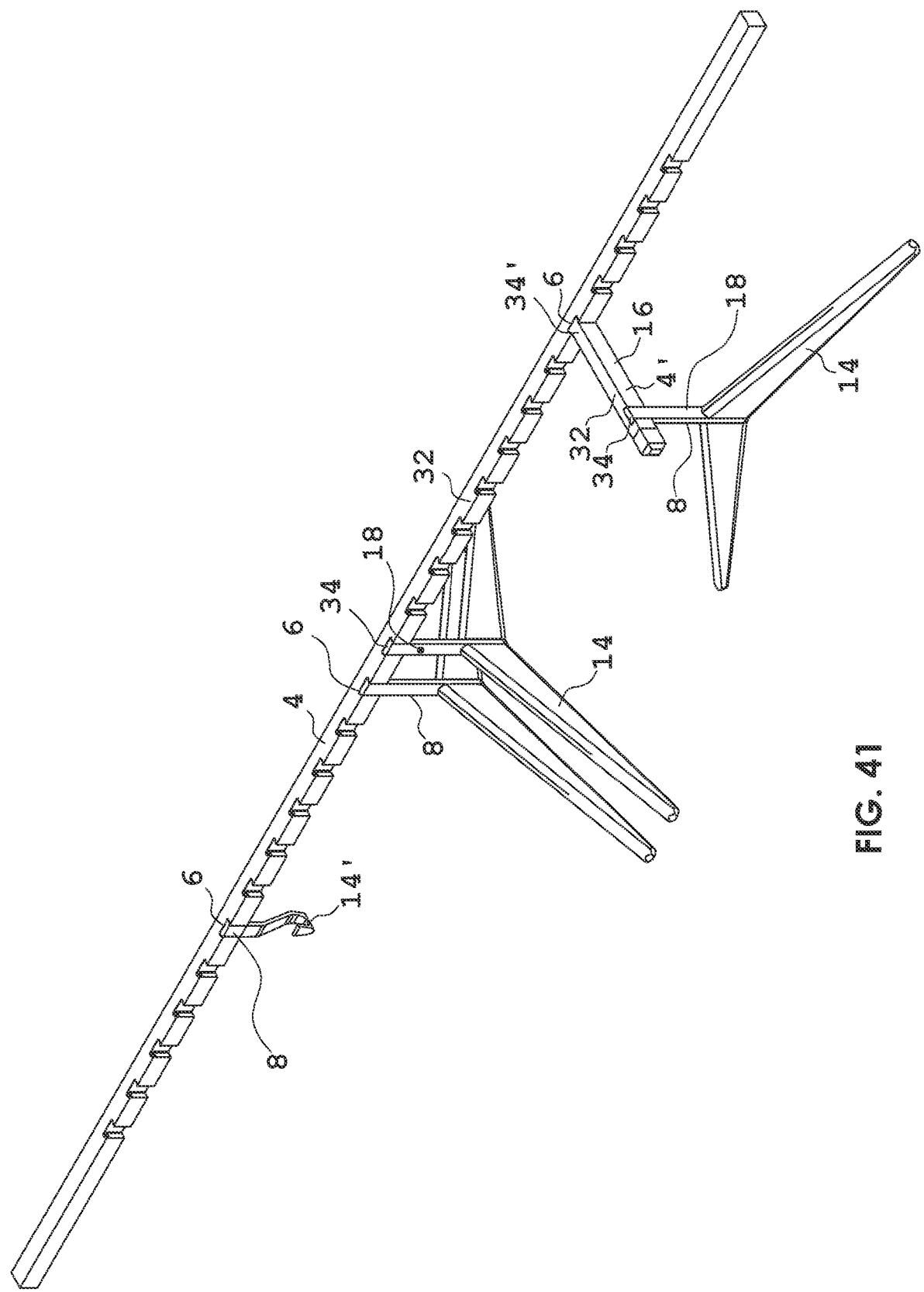

SELF-ORGANIZING HANGING SYSTEM

CROSS REFERENCE TO RELATED APPLICATIONS

This application claims the benefit of U.S. Provisional Application No. 63/026,334, filed May 18, 2020, entitled "Self-Organizing Hanging System," which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to systems for hanging products in an organized manner, such as in display racks, closets, and tool racks. More specifically, the disclosure relates to hanging systems that provide automatic spacing of products, and restricts the number of items along a given length while allowing easy retrieval of a product from a hanging position.

Description of the Related Art

Twenty percent (20%) of a person's closet is worn 80% of the time. The average wardrobe is underutilized and the average closet space is full of extraneous items. People could maintain a smaller wardrobe but there is a lack of incentive to purge periodically unworn or lightly worn clothing.

The sheer volume of closet space creates hidden costs for consumers. Losing items, disorganization, overcrowding, and lack of structure can all result in lost time and money. The term "shopping in your closet" describes a well-known phenomenon where people rediscover items that exist in their closet but have been forgotten. While "shopping in your closet" represents a situation where people find those lost items, it is also likely that the item will not be found. The owner may repeat purchases of the same clothing item from lost items due to closet disorganization and overcrowding.

Without the presence of systematic organization within a space, a once organized space can quickly become cluttered. This process is known as "Clutter Creep." If there is no enforced method of organization, the only limiting factor to prevent excess accumulation of clutter is the volume of the space itself.

These concepts overlap into commercial settings. The challenge of maintaining an organized clothing display is multiplied in a retail setting. On average, it takes 30 minutes to an hour for employees to organize the clothing racks after closing. Generally, a store schedules a fixed amount of FTEs (Full Time Equivalents) dedicated to organizing the store. If it takes too long, the retailer will likely exceed budgets on excess FTEs or else has a disorganized space that is not conducive to a pleasant in-store customer experience. Similarly, medical staff relies on efficient access to medical tools in their practice. Organization is important to efficient access.

Currently, many stores use people-tracking software and in-store Wi-Fi based cookies to gather customer data for product targeting and learning customer preferences. Data collection methods are customer-centric, rather than product-centric, because methods to track products individually can be cost prohibitive. Data collection from customer/product interactions could add valuable insight for improving product placement and pricing strategies.

Therefore, there is a need for an improved hanging system.

BRIEF SUMMARY OF THE INVENTION

A self-organizing hanging system generally includes at least two main components—bars and keys. The bars have at least three embodiments: standard embodiment, valet embodiment, and shelf embodiment. Each embodiment has variations of embodiments of bars and keys. Each of the bars and keys can have embodiments of magnetic elements and anti-rotation elements. The keys have additional opportunities for variations of embodiments to couple with a product support. In at least one aspect, the bars can be formed with receiver stations at predetermined spacing to cause organized placement for coupling keys with the bars. Further, the bars and keys can be coupled to appear as an integral assembly with one or more external surfaces in planar uniformity.

The disclosure provides a hanging system, comprising: a bar having at least a plurality of receiver stations; and a key having a shaped surface configured to be coupled to the plurality of receiver stations and a coupler configured to be coupled to a product support that hangs from the key.

The disclosure further provides various embodiments and variations of the hanging system, and methods associated with use of the hanging system.

BRIEF DESCRIPTION OF THE SEVERAL VIEWS OF THE DRAWINGS

FIG. 2C is a schematic front view of the bar of FIG. 2A.

FIG. 2D is a schematic top view of the bar of FIG. 2C.

FIG. 2E is a schematic bottom view of the bar of FIG. 2C.

FIG. 2F is a schematic side view of the bar of FIG. 2C.

FIG. 6A is a schematic top perspective rear view of the key of FIG. 4A.

FIG. 6B is a schematic bottom perspective rear view of the key of FIG. 6A.

FIG. 6C is a schematic rear view of the key of FIG. 6A.

FIG. 6D is a schematic top view of the key of FIG. 6C.

FIG. 6E is a schematic bottom view of the key of FIG. 6C.

FIG. 6F is a schematic side view of the key of FIG. 6C.

FIG. 9A is a schematic front view of another embodiment of a bar similar to the bar of FIG. 7B.

FIG. 9B is a schematic top view of the bar of FIG. 9A.

FIG. 9C is a schematic bottom view of the bar of FIG. 9B.

FIG. 9D is a schematic side view of the bar of FIG. 9B.

FIG. 13C is a schematic front view of the key of FIG. 13A.

FIG. 13D is a schematic top view of the key of FIG. 13C.

FIG. 13E is a schematic bottom view of the key of FIG. 13C.

FIG. 13F is a schematic left side view of the key of FIG. 13C.

FIG. 13G is a schematic rear view of the key of FIG. 13C.

FIG. 15A is a schematic top perspective view of another embodiment, termed a "shelf" embodiment, of a bar with a plurality of receiver stations on an end.

FIG. 15B is an enlarged schematic top perspective view of a portion of the bar of FIG. 15A.

FIG. 15C is a schematic bottom perspective view of the bar of FIG. 15A.

FIG. 15D is a schematic front view of the bar of FIG. 15A.

FIG. 15E is a schematic top view of the bar of FIG. 15D.

FIG. 15F is a schematic side view of the bar of FIG. 15D.

FIG. 17A is a schematic top perspective rear view of another embodiment of a key similar to the key of FIGS. 8A and 13A.

FIG. 17B is a schematic bottom perspective rear view of the key of FIG. 17A.

FIG. 17C is a schematic rear view of the key of FIG. 17A.

FIG. 17D is a schematic top view of the key of FIG. 17C.

FIG. 17E is a schematic bottom view of the key of FIG. 17C.

FIG. 17F is a schematic side view of the bar of FIG. 17C.

FIG. 25A is a schematic top perspective front view of the key of FIG. 23A.

FIG. 25B is a schematic top perspective rear view of the key of FIG. 25A.

FIG. 25C is a schematic rear view of the key of FIG. 25A.

FIG. 25D is a schematic top view of the key of FIG. 25C.

FIG. 25E is a schematic bottom view of the key of FIG. 25C.

FIG. 25F is a schematic front view of the key of FIG. 25C.

FIG. 26A is a schematic rear of another example of an embodiment of the hanging system having bar with a sensor and/or receiver.

FIG. 26B is a schematic front view of another example of an embodiment of the hanging system having a key having a sensor and/or receiver to be coupled with the bar of FIG. 26A.

FIG. 26C is a schematic top view of the key of FIG. 26B.

FIG. 26D is a schematic bottom view of the key of FIG. 26B.

FIG. 26E is a schematic side view of the key of FIG. 26B.

FIG. 27 is a schematic example of an electronic diagram for the hanging system of FIGS. 26A and 26B.

FIG. 28A is a schematic top perspective view of an embodiment of a hanging system.

Figure 28:
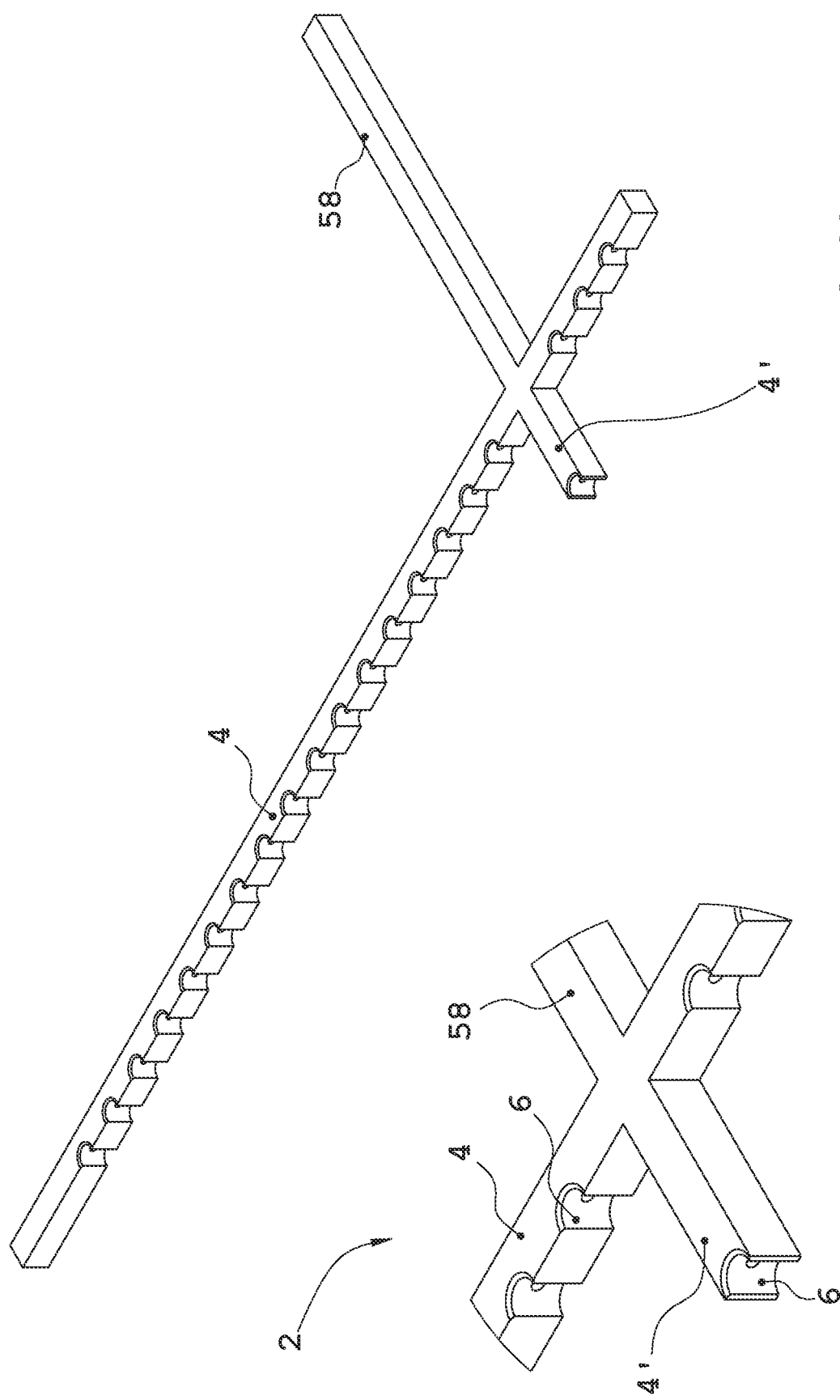

FIG. 28B is a schematic top perspective enlarged view of the embodiment of the hanging system of FIG. 28A.

Figure 29:
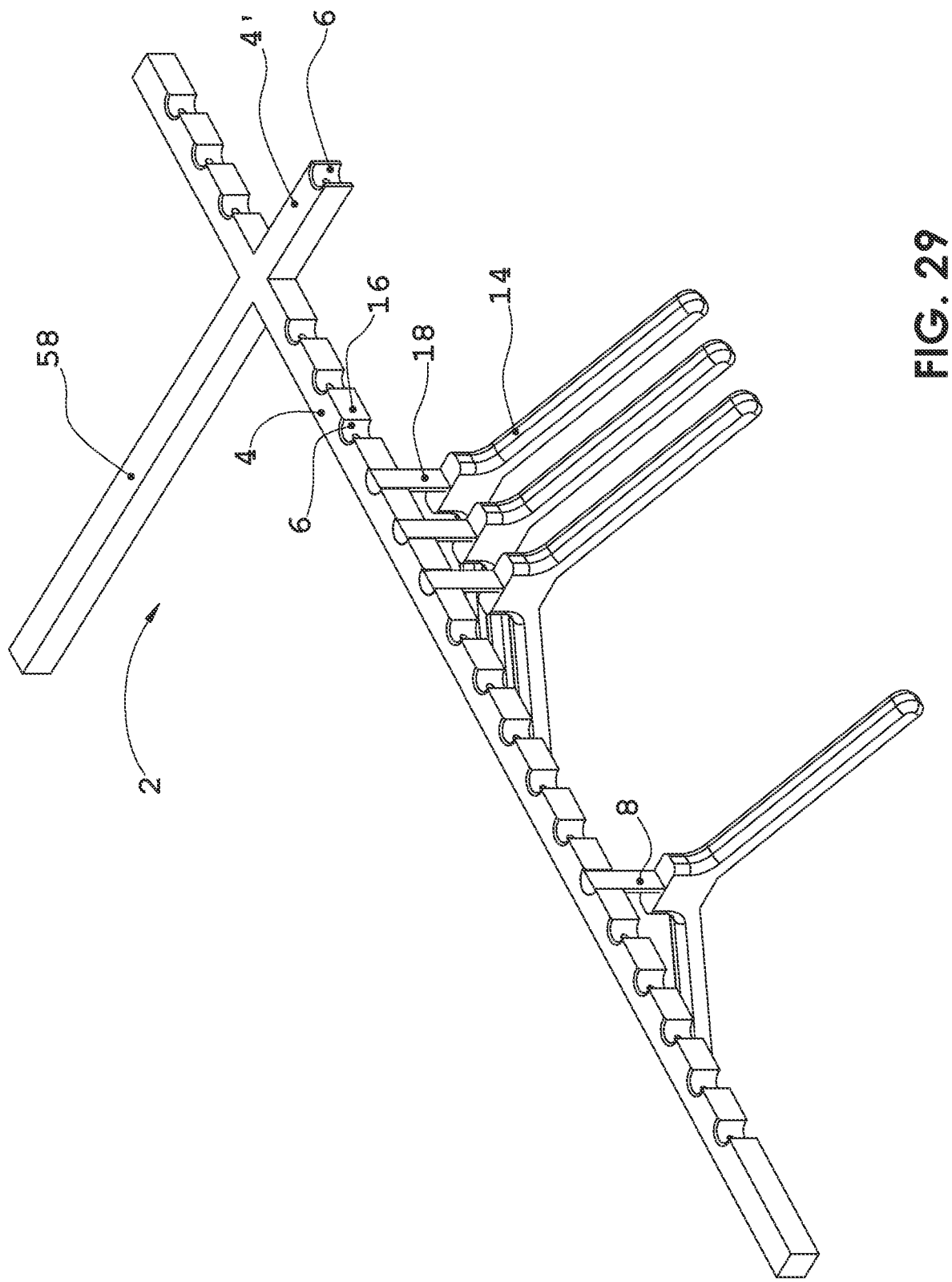

FIG. 29 is a schematic top perspective view of an embodiment of a hanging system with examples of product supports having keys removably coupled to receiver stations.

Figure 30A:
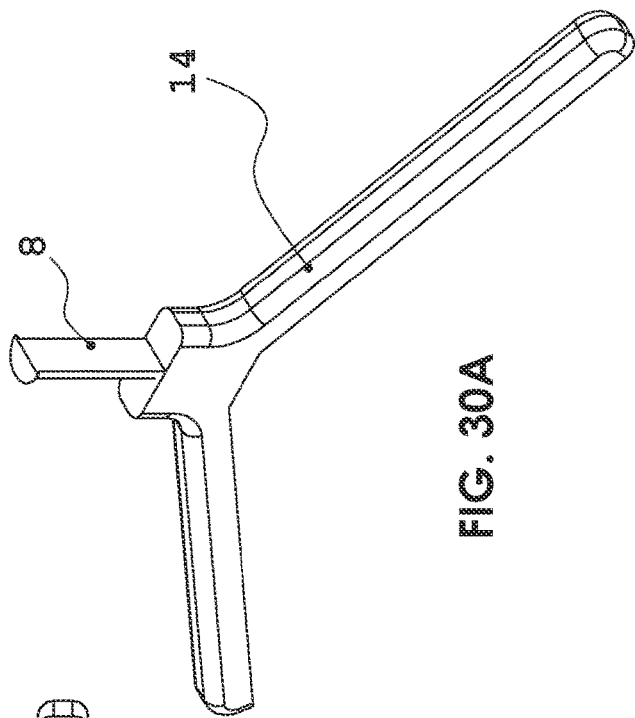

FIG. 30A is a schematic top perspective view of an embodiment of a product support with a key configured to be removably coupled with receiver stations.

Figure 30C:
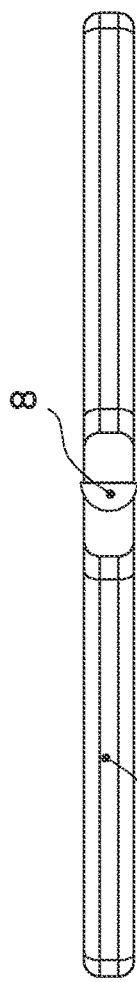
Figure 30B:
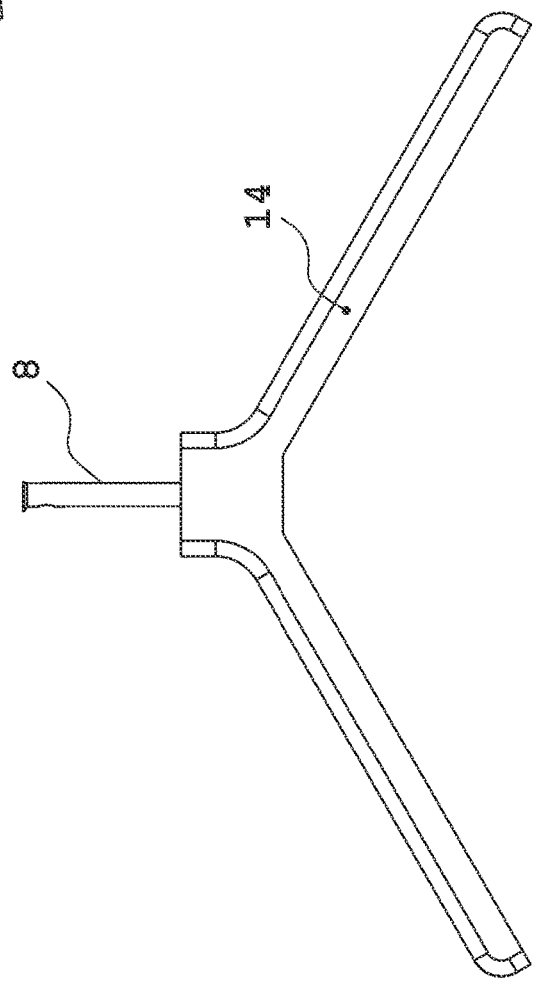

FIG. 30B is a schematic front view of the product support of FIG. 30A.

FIG. 30C is a schematic top view of the product support of FIG. 30B.

Figure 30D:
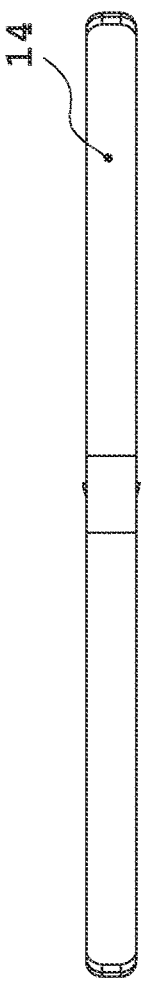

FIG. 30D is a schematic bottom view of the product support of FIG. 30B.

Figure 30E:
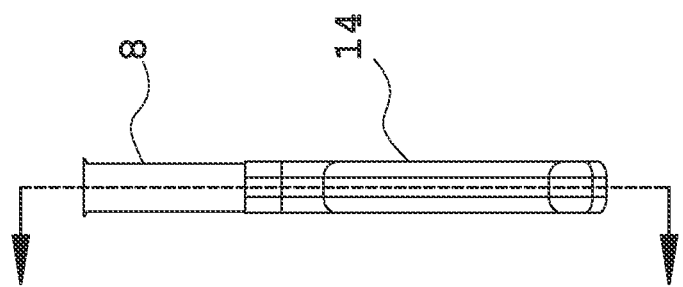

FIG. 30E is a schematic side view of the product support of FIG. 30B.

Figure 30F:
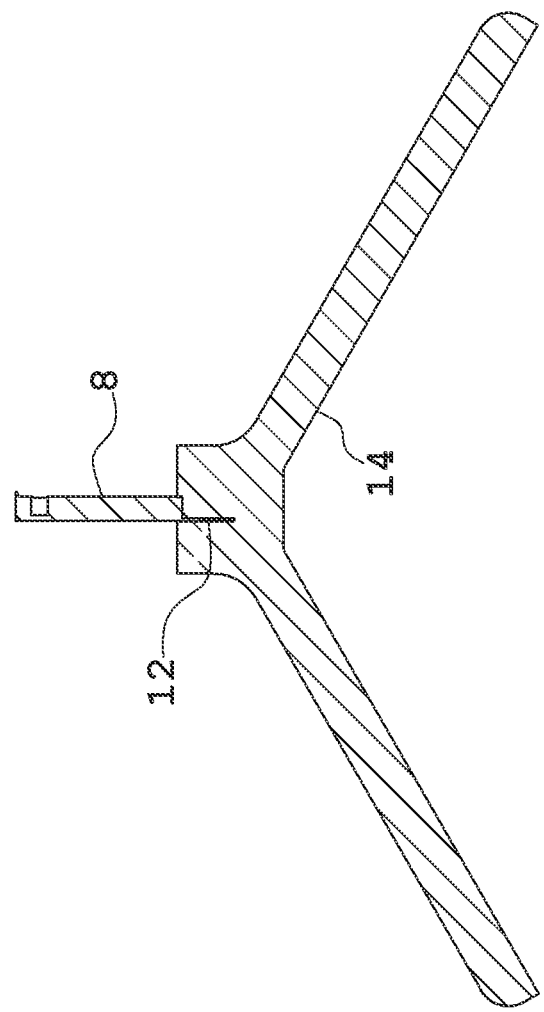

FIG. 30F is a schematic cross sectional view of the product support of FIG. 30B.

FIG. 30G is a schematic top perspective view of the product support of FIG. 30B prior to coupling with the key.

FIG. 30H is a schematic enlarged top perspective view of the product support of FIG. 30G.

Figure 31A:
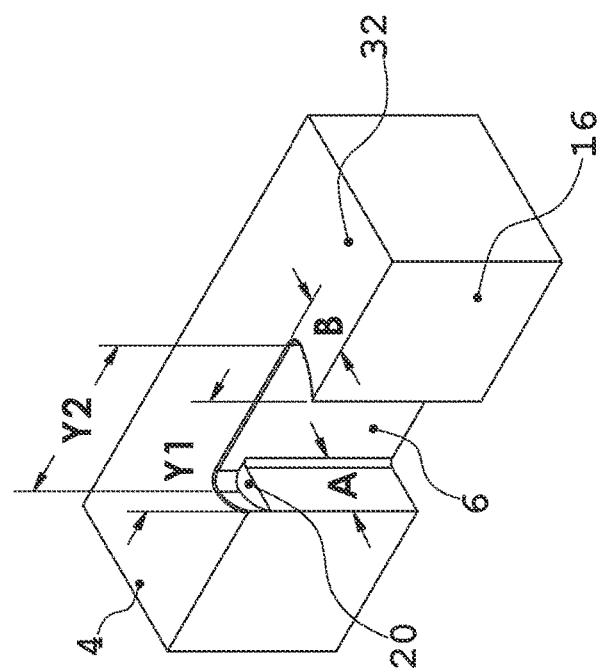

FIG. 31A is a schematic top perspective front view of another example of an embodiment of a bar for a hanging system.

Figure 31C:
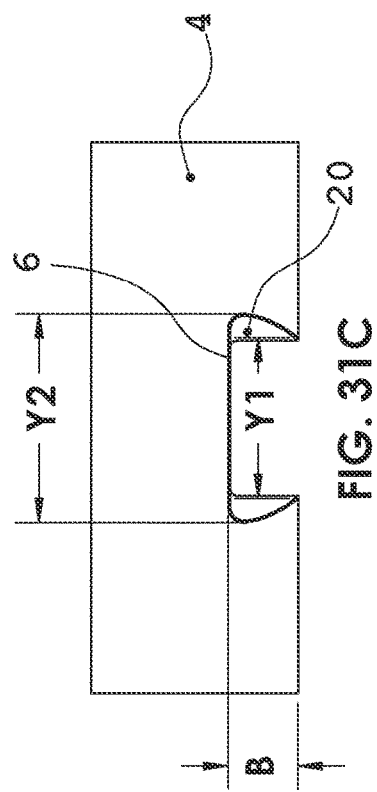
Figure 31B:
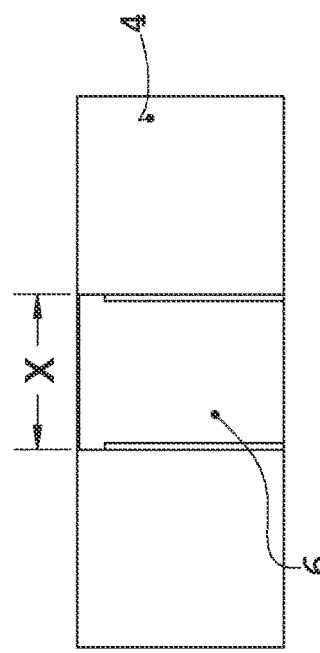

FIG. 31B is a schematic front view of the bar of FIG. 31A.

FIG. 31C is a schematic top perspective view of the bar of FIG. 31B.

Figure 31D:
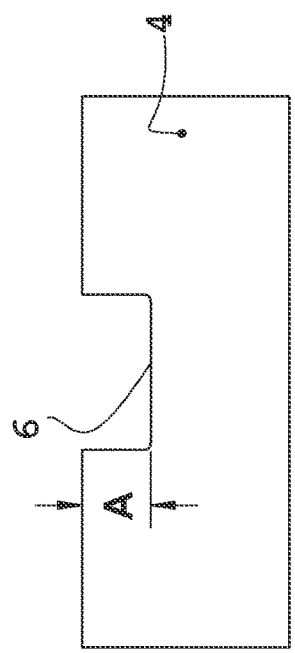

FIG. 31D is a schematic bottom perspective view of the bar of FIG. 31B.

Figure 32D:
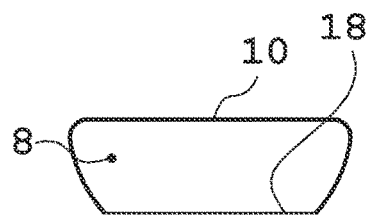
Figure 32F:
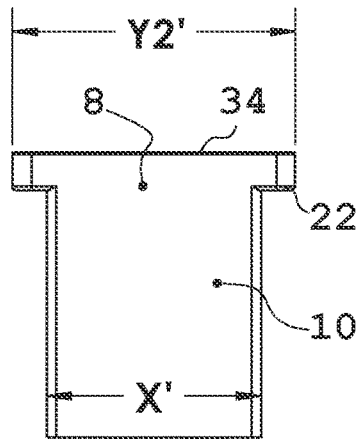
Figure 32C:
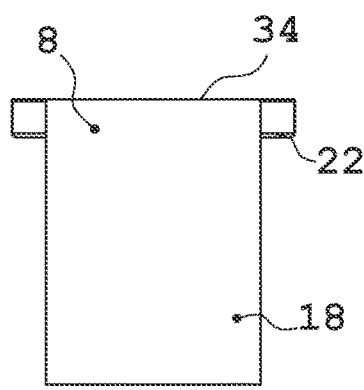
Figure 32G:
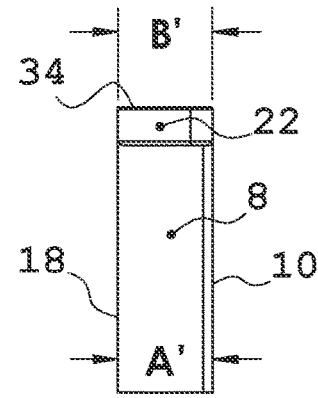
Figure 32E:
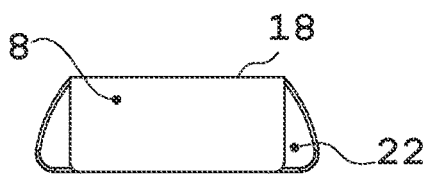
Figure 32A:
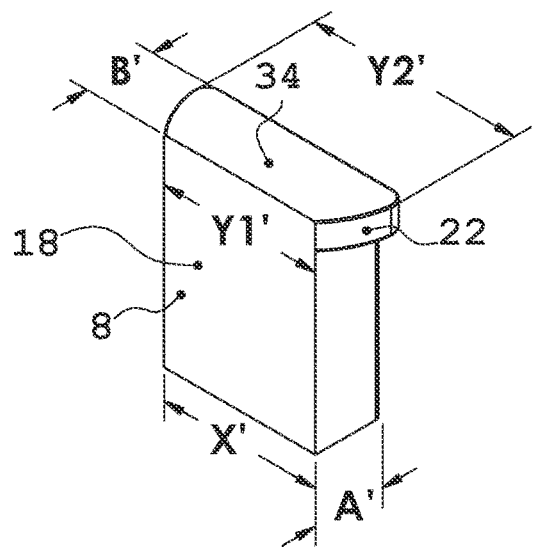

FIG. 32A is a schematic top perspective front view of an example of an embodiment of a key configured for the bar of FIG. 31A.

Figure 32B:
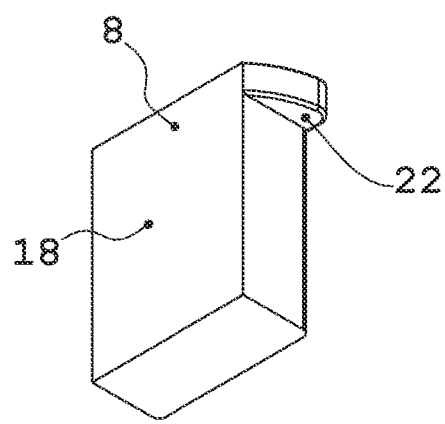

FIG. 32B is a schematic bottom perspective front view of the key of FIG. 32A.

FIG. 32C is a schematic front view of the key of FIG. 32A.

FIG. 32D is a schematic top view of the key of FIG. 32C.

FIG. 32E is a schematic bottom view of the key of FIG. 32C.

FIG. 32F is a schematic left side view of the key of FIG. 32C.

FIG. 32G is a schematic right side view of the key of FIG. 32C.

Figures 33A, 33B:
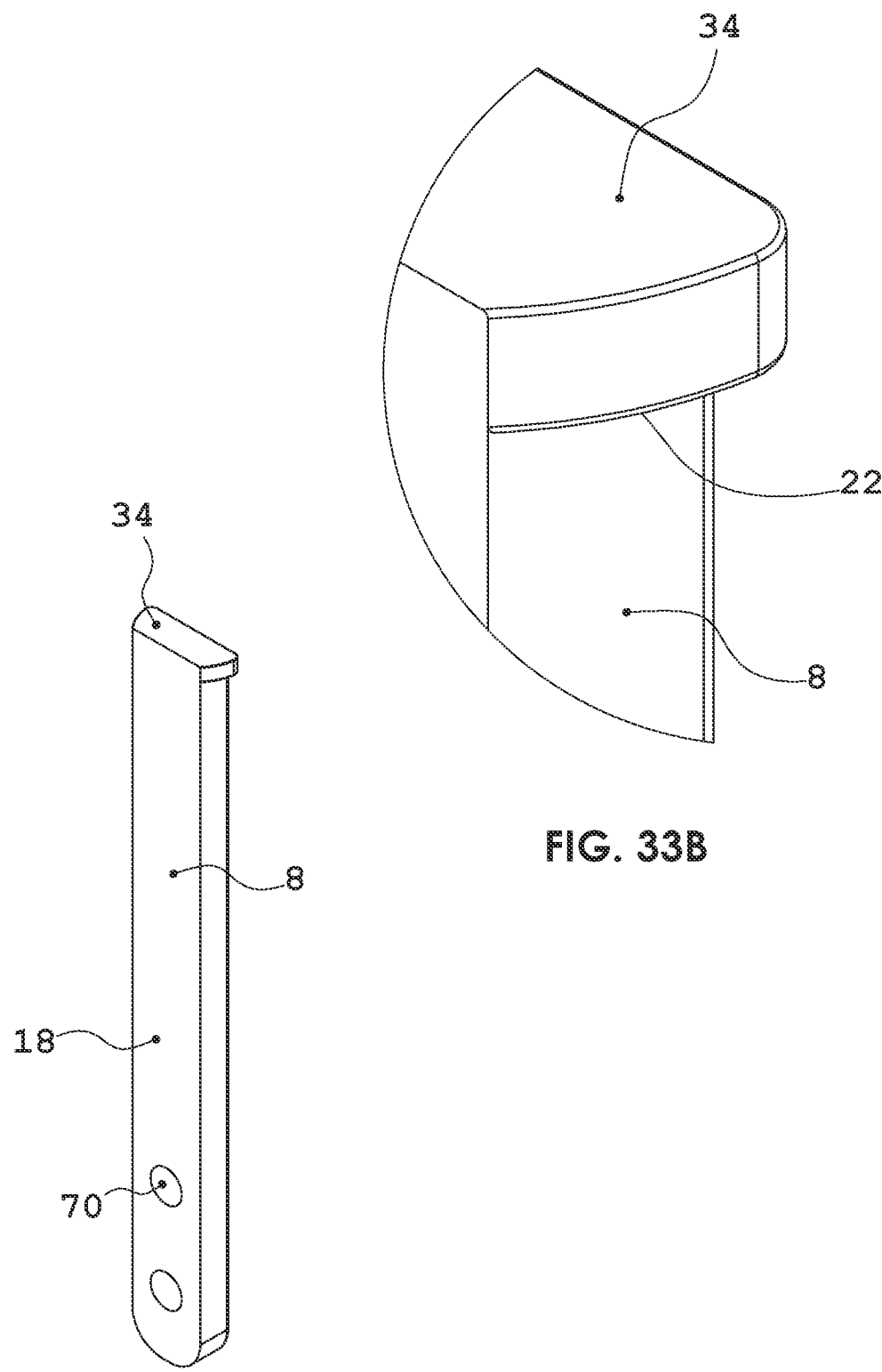

FIG. 33A is a schematic top perspective front view of another example of an embodiment of a key configured for the bars of FIGS. 31A and 34A (described below).

FIG. 33B is a schematic enlarged perspective front view of the key of FIG. 33A.

Figure 33D:
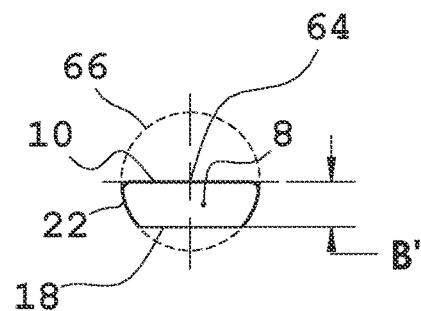
Figure 33F:
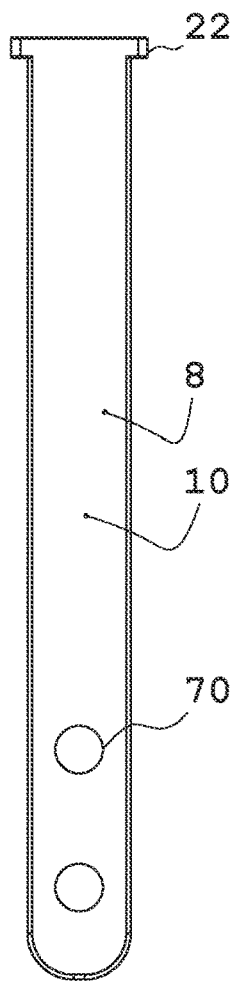
Figure 33C:
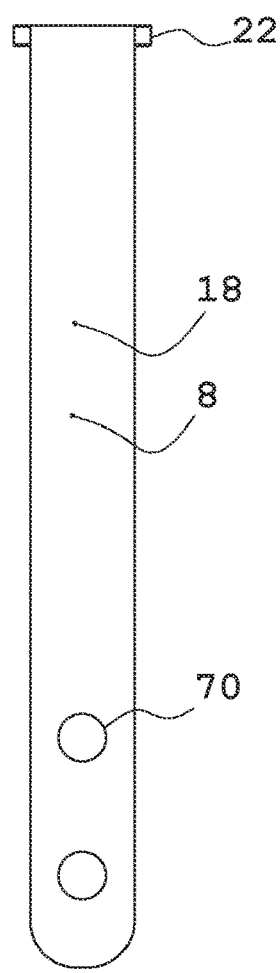

FIG. 33C is a schematic front view of the key of FIG. 33A.

FIG. 33D is a schematic top view of the key of FIG. 33C.

Figure 33G:
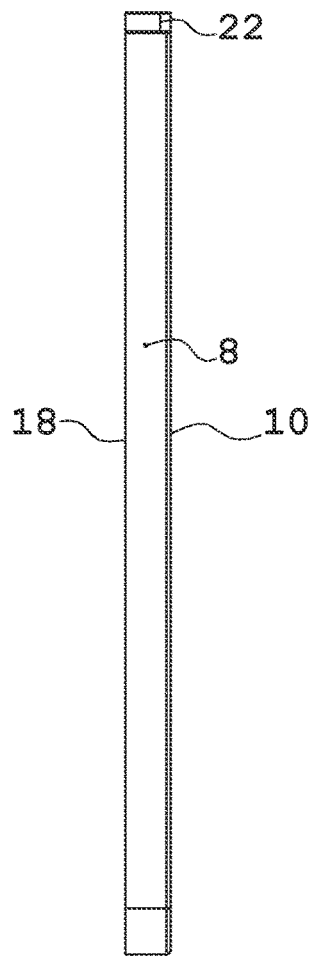
Figure 33E:
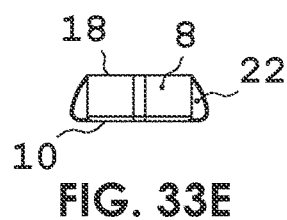

FIG. 33E is a schematic bottom view of the key of FIG. 33A.

FIG. 33F is a schematic left side view of the key of FIG. 33C.

FIG. 33G is a schematic right side view of the key of FIG. 33C.

Figure 34A:
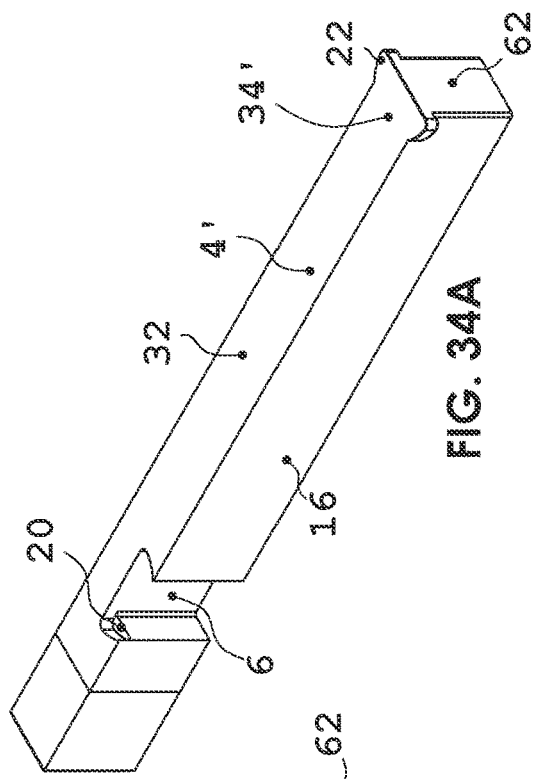

FIG. 34A is a schematic top perspective front view of another example of an embodiment of a bar for a hanging system having a key portion end.

Figure 34C:
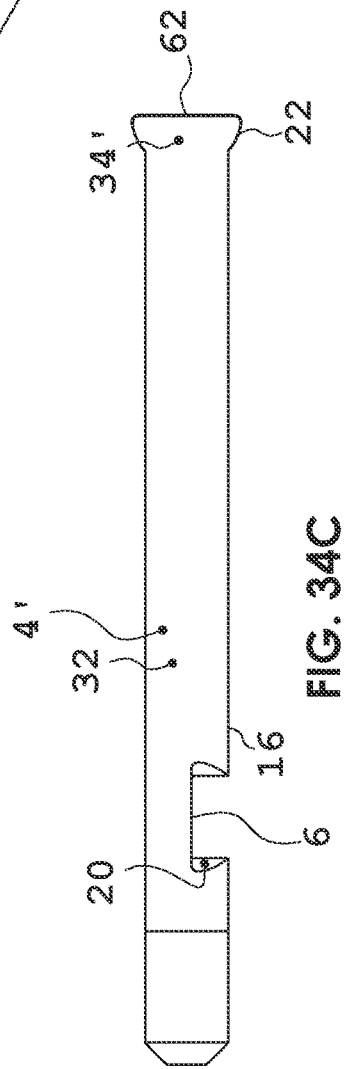
Figure 34B:
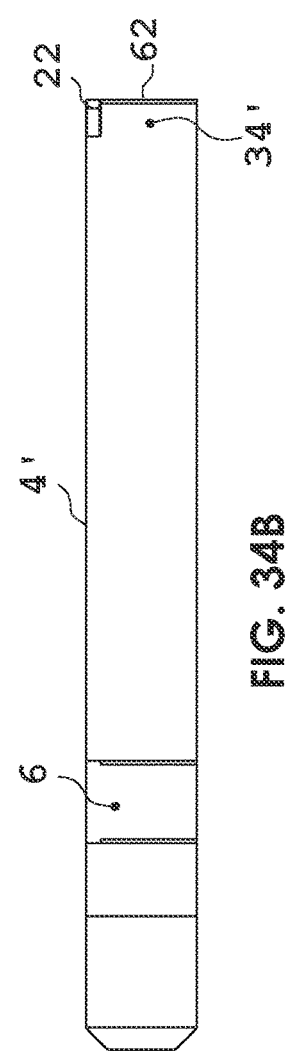

FIG. 34B is a schematic side view of the bar of FIG. 34A.

FIG. 34C is a schematic top perspective view of the bar of FIG. 34B.

Figure 34E:
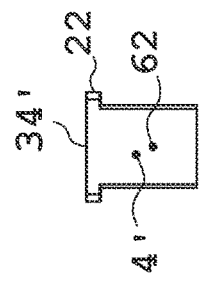
Figure 34D:
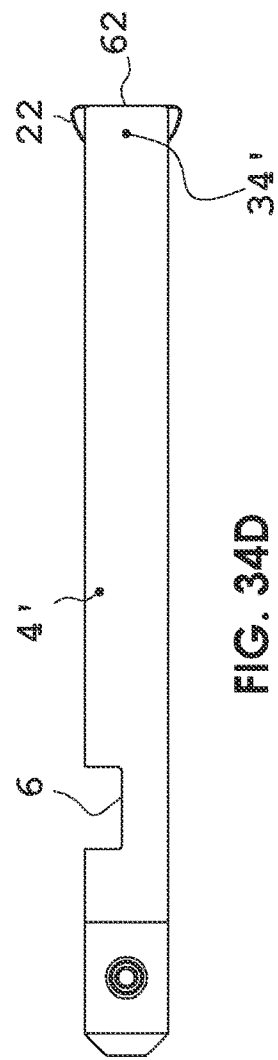

FIG. 34D is a schematic bottom perspective view of the bar of FIG. 34B.

FIG. 34E is a schematic rear view of the bar of FIG. 34B.

FIG. 35A is a schematic top perspective view of another embodiment of a hanging system with an example of the bar of FIG. 34A and a key with a product support removably coupled to a receiver station on the bar.

FIG. 35B is a schematic top detailed perspective view of a portion of the hanging system of FIG. 35A.

FIG. 35C is a schematic top detailed perspective view of another portion of the hanging system of FIG. 35A.

Figure 36A:
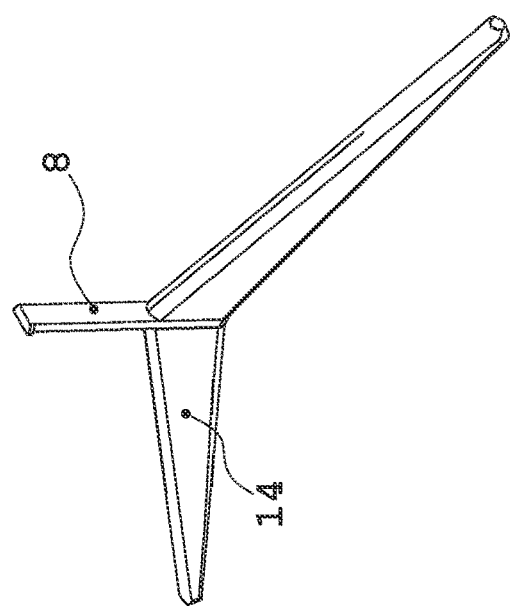

FIG. 36A is a schematic top perspective view of another embodiment of a product support with a key configured to be removably coupled with receiver stations.

Figure 36C:
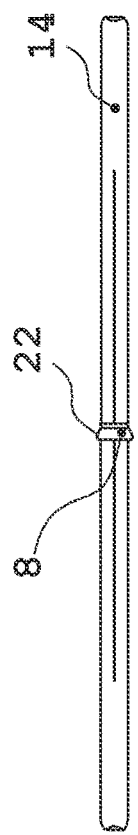
Figure 36B:
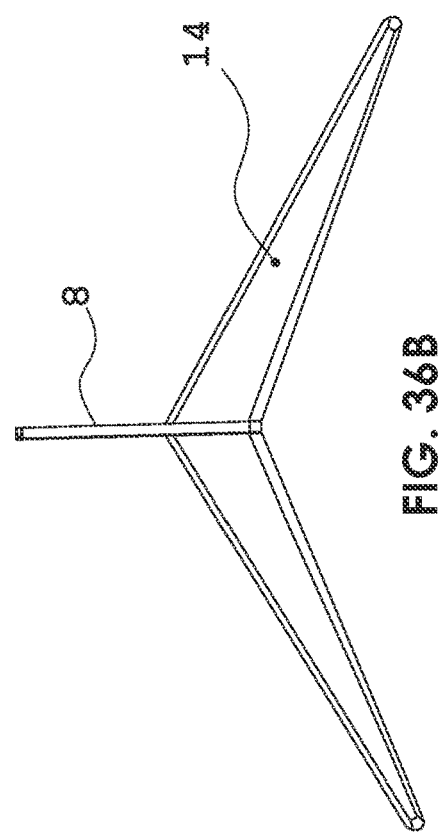

FIG. 36B is a schematic front view of the product support of FIG. 36A.

FIG. 36C is a schematic top view of the product support of FIG. 36B.

Figure 36D:
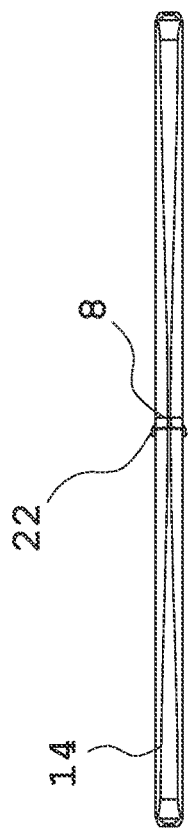

FIG. 36D is a schematic bottom view of the product support of FIG. 36B.

Figure 36E:
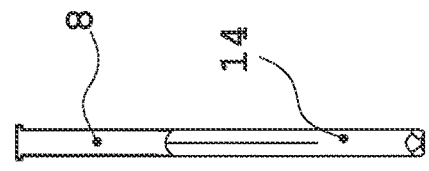

FIG. 36E is a schematic side view of the product support of FIG. 36B.

FIG. 36F is a schematic assembly view of the product support of FIG. 36B.

Figure 37D:
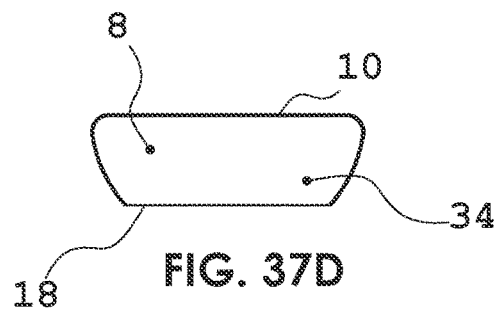
Figure 37F:
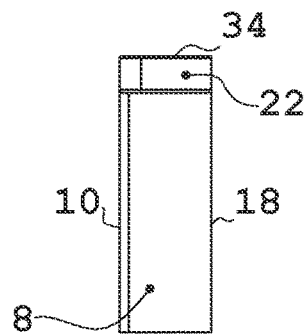
Figure 37C:
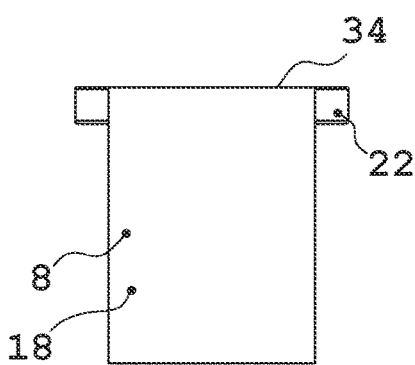
Figure 37G:
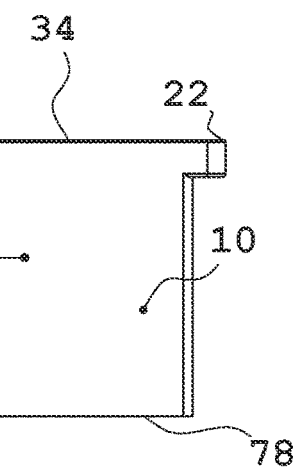
Figure 37E:
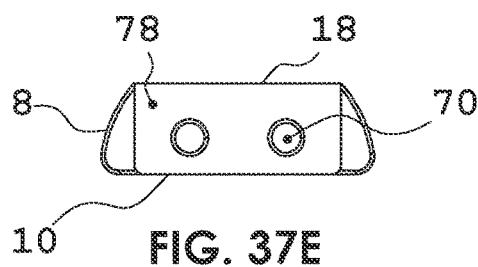
Figure 37A:
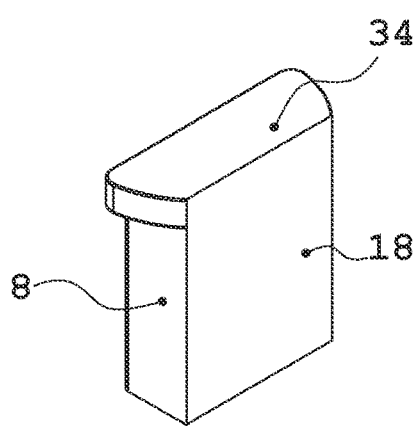

FIG. 37A is a schematic top perspective front view of an example of an embodiment of a key configured for the bars of FIGS. 31A and 34A.

Figure 37B:
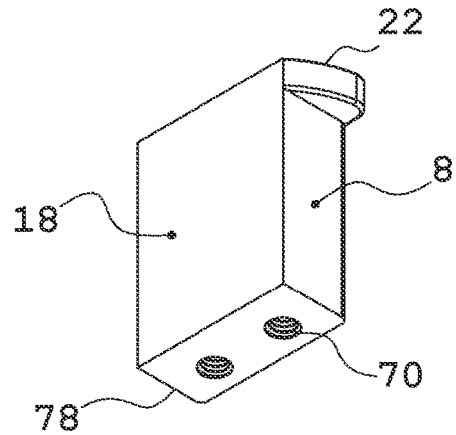

FIG. 37B is a schematic bottom perspective front view of the key of FIG. 37A.

FIG. 37C is a schematic front view of the key of FIG. 37A.

FIG. 37D is a schematic top view of the key of FIG. 37C.

FIG. 37E is a schematic bottom view of the key of FIG. 37C.

FIG. 37F is a schematic left side view of the key of FIG. 37C.

FIG. 37G is a schematic right side view of the key of FIG. 37C.

Figure 38A:
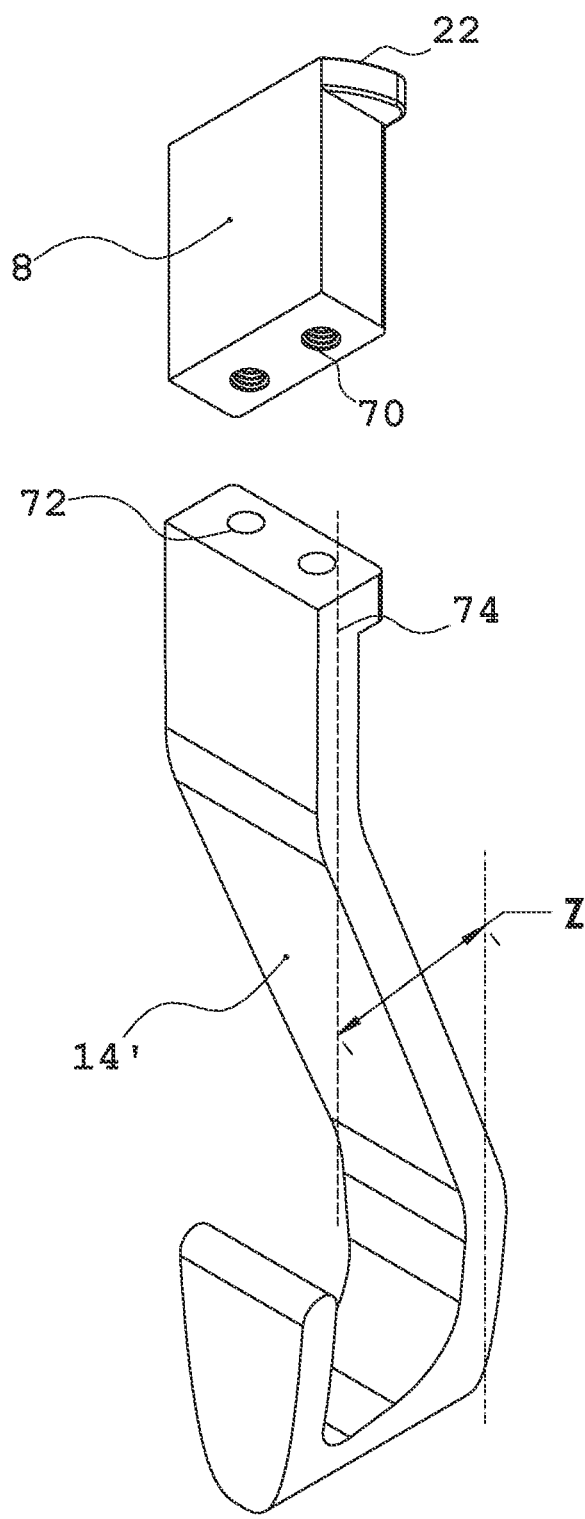

FIG. 38A is a schematic top perspective assembly view of another embodiment of a product support with a bottom perspective view of a key configured to be removably coupled with receiver stations.

Figure 38B:
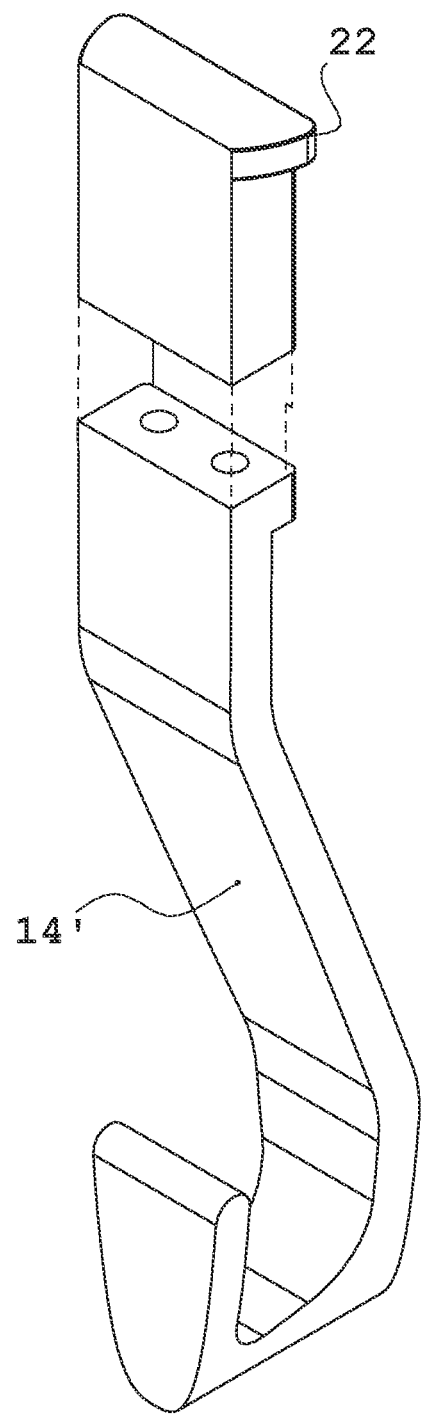

FIG. 38B is a schematic top perspective assembly view of the product support and a key of FIG. 38A.

Figure 38D:
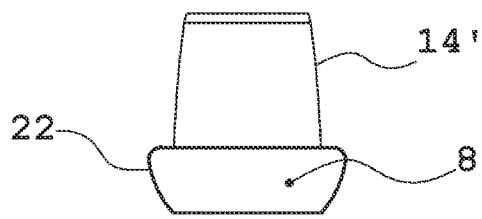
Figure 38C:
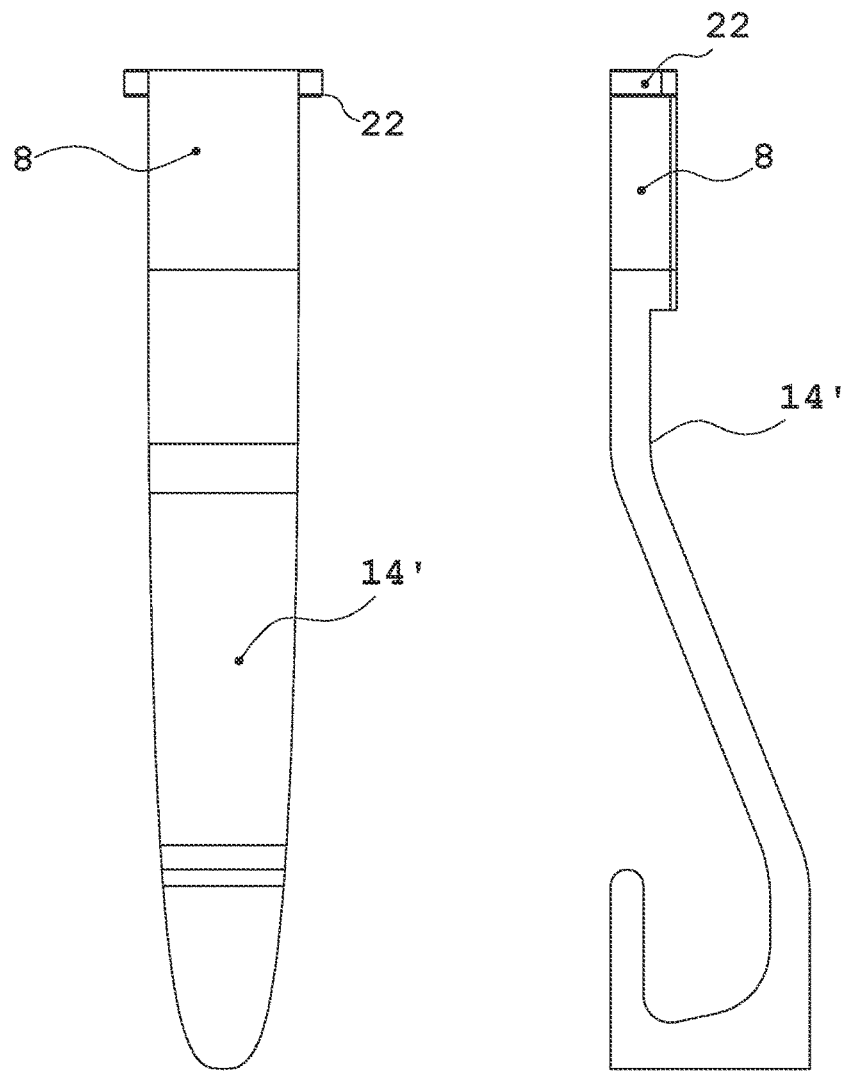

FIG. 38C is a schematic assembled front view of the product support and key of FIG. 38A.

FIG. 38D is a schematic top view of the product support and key of FIG. 38C.

Figure 38F:
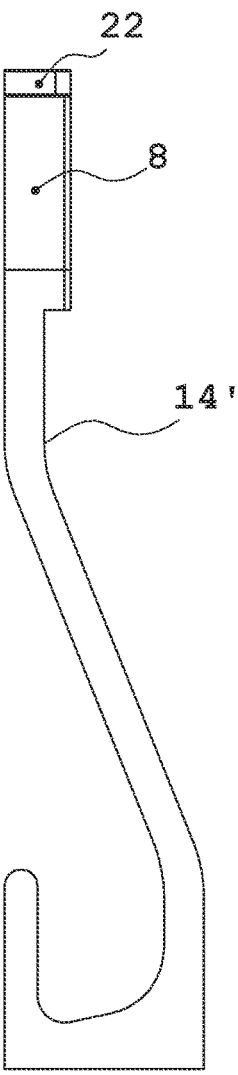
Figure 38E:
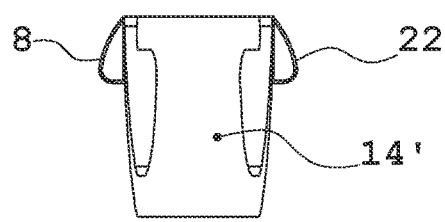

FIG. 38E is a schematic bottom view of the product support and key of FIG. 38C.

FIG. 38F is a schematic right side view of the product support and key of FIG. 38C.

Figure 38G:
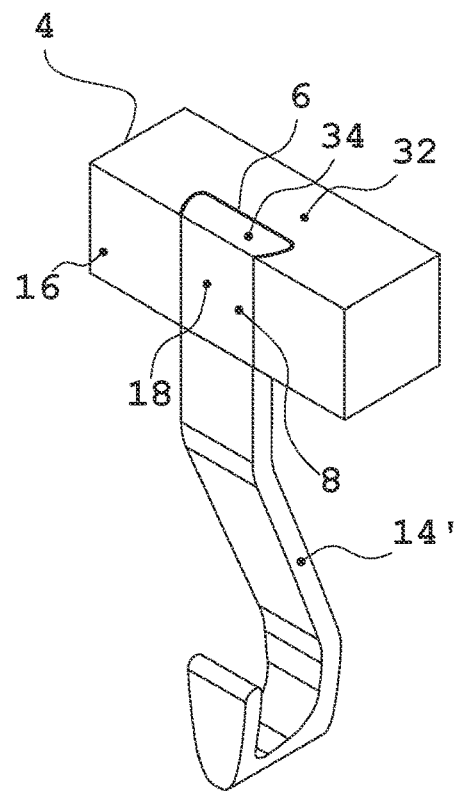

FIG. 38G is a schematic top perspective view of the product support and key of FIG. 38C coupled in a receiver station of a bar.

Figure 38I:
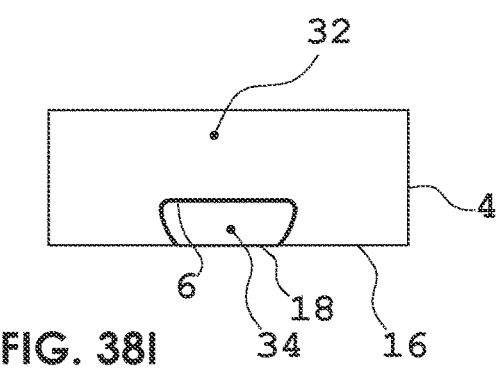
Figure 38H:
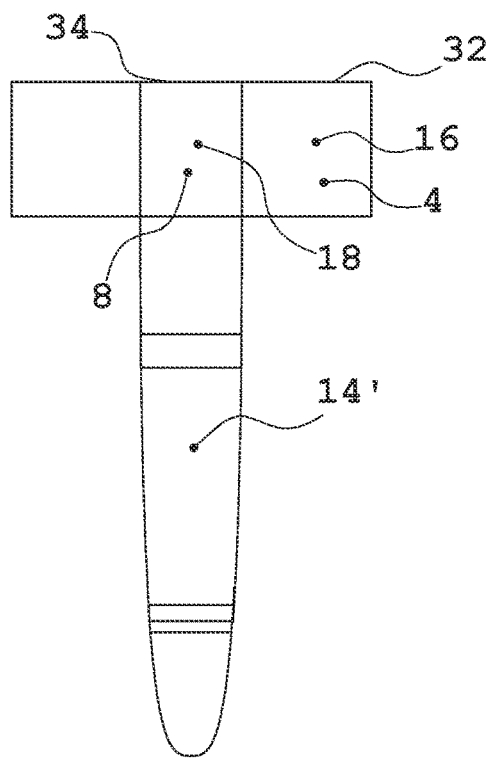

FIG. 38H is a schematic front view of the product support and key with the bar of FIG. 38G.

FIG. 38I is a schematic top view of the product support and key with the bar of FIG. 38G.

Figure 38J:
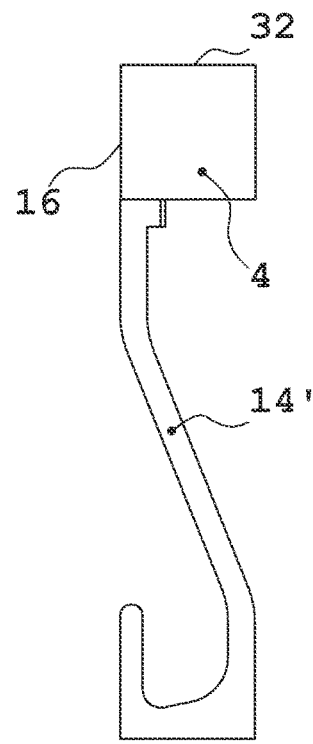

FIG. 38J is a schematic right side view of the product support and key with the bar of FIG. 38G.

Figure 39A:
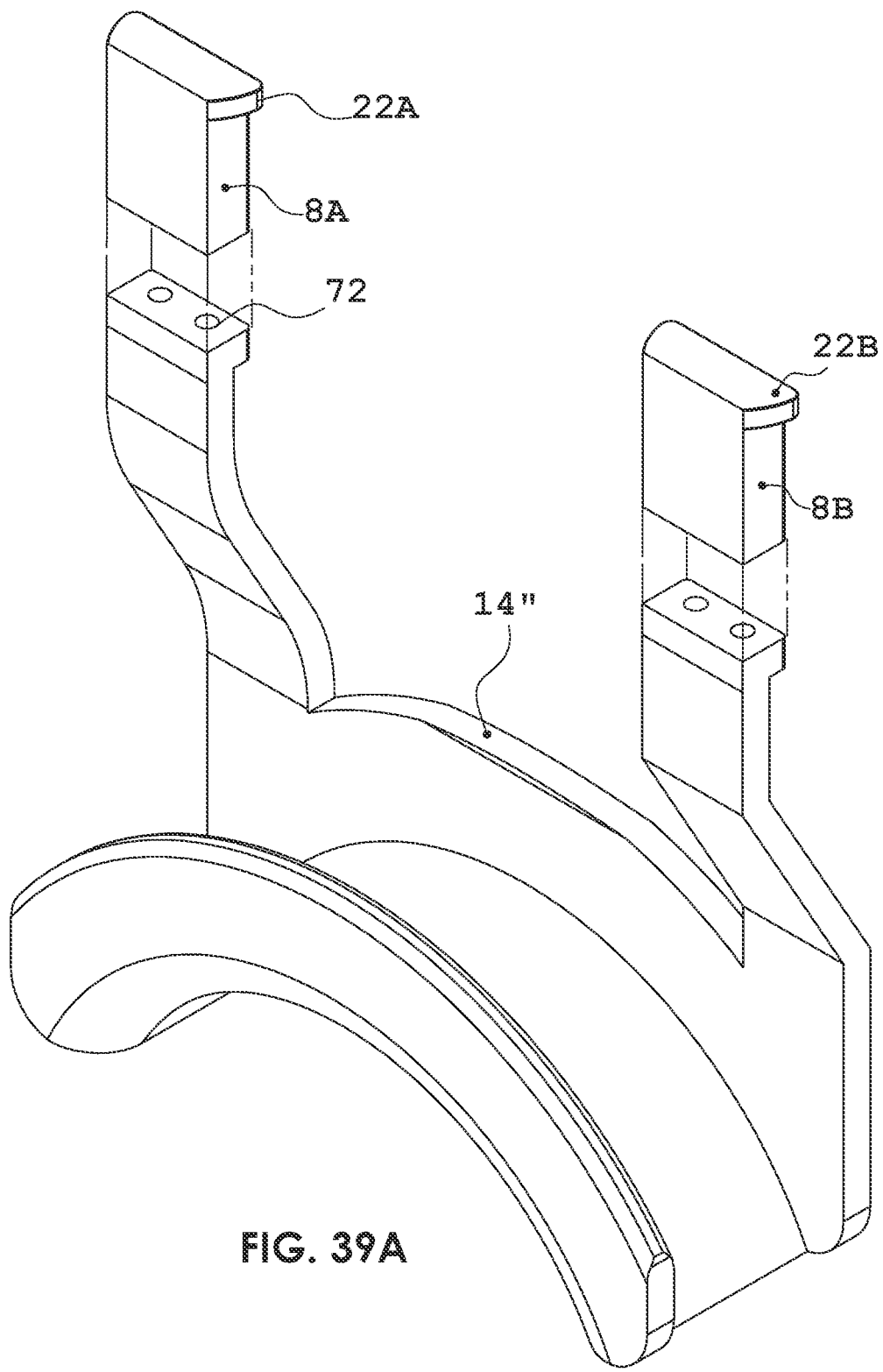

FIG. 39A is a schematic top perspective view of another embodiment of a product support with a plurality of keys configured to be removably coupled with receiver stations.

Figure 39C:
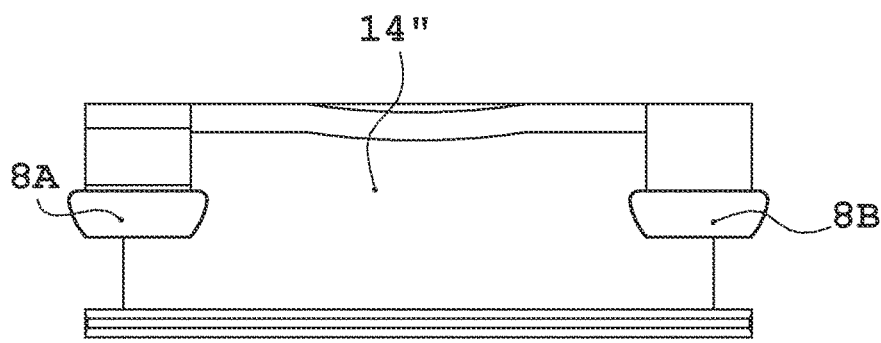
Figures 39B, 39E:
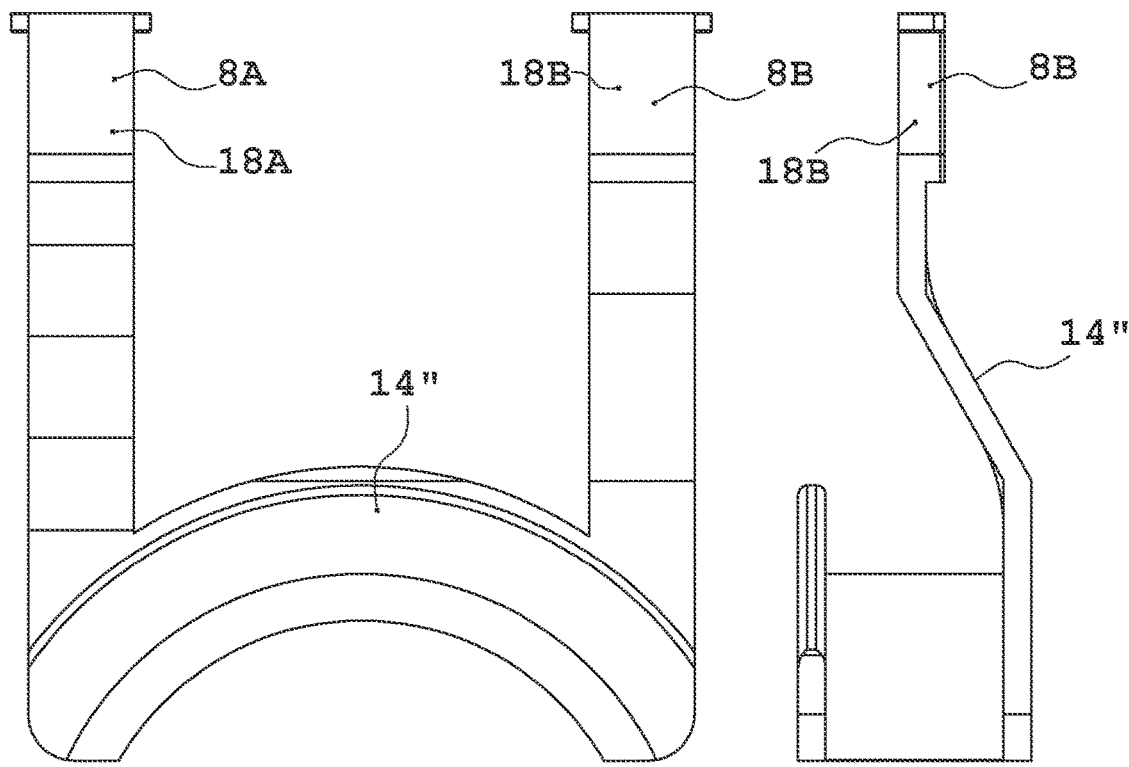

FIG. 39B is a schematic assembled front view of the product support and keys of FIG. 39A.

FIG. 39C is a schematic top view of the product support and keys of FIG. 39B.

Figure 39D:
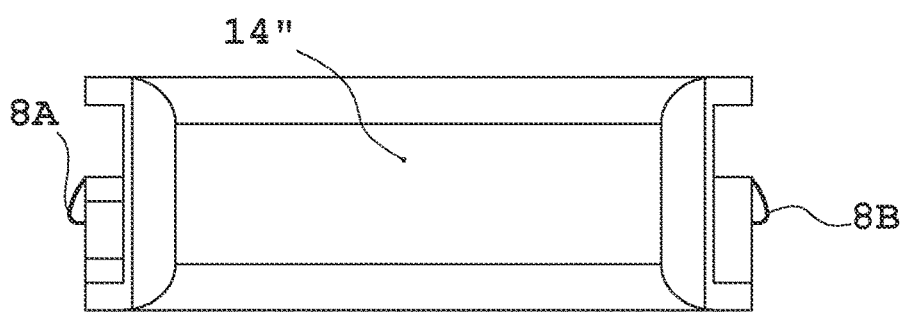

FIG. 39D is a schematic bottom view of the product support and keys of FIG. 38B.

FIG. 39E is a schematic right side view of the product support and keys of FIG. 38B.

Figure 40:
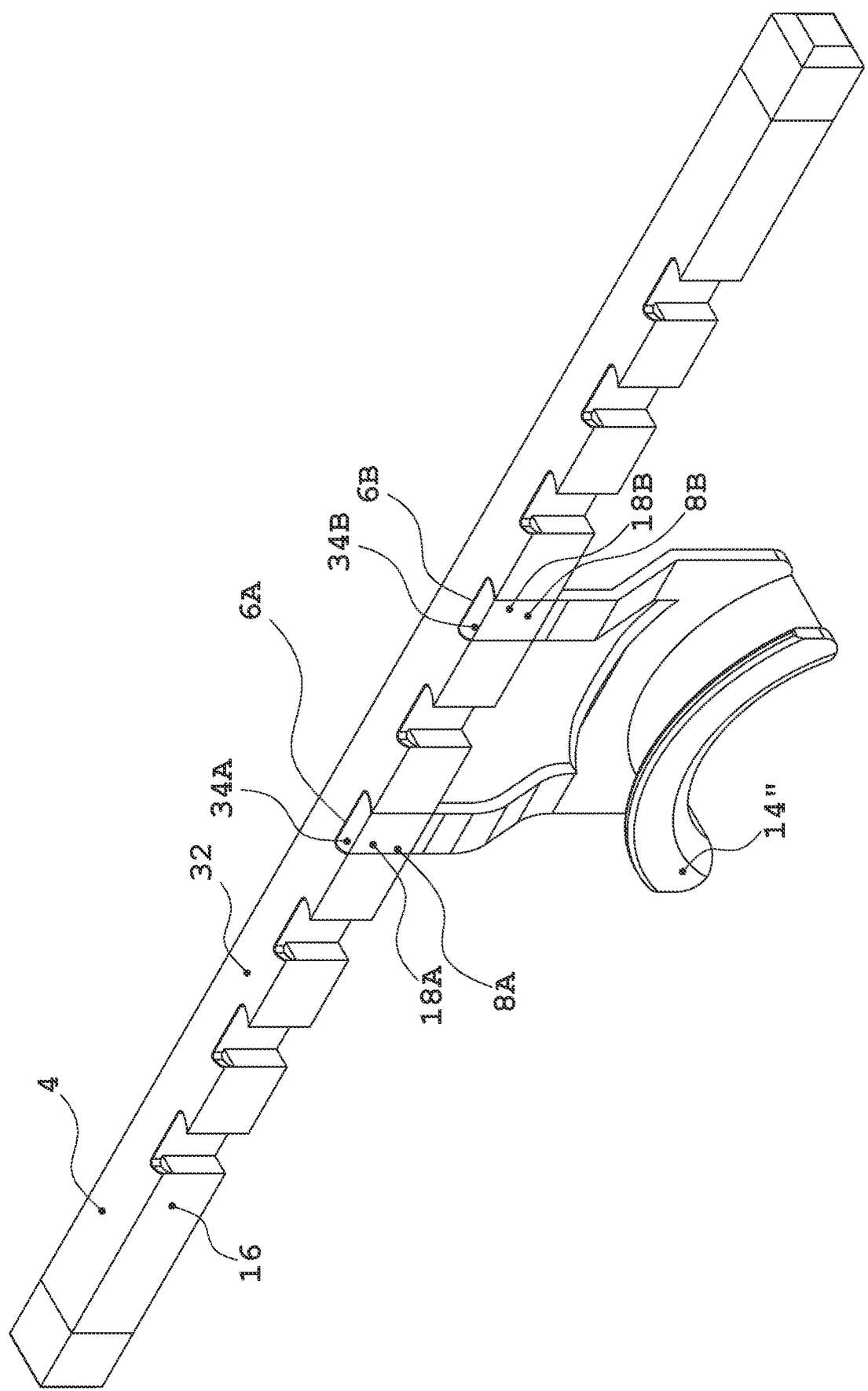

FIG. 40 is a schematic top perspective view of another embodiment of a hanging system with an example of the bar of FIG. 31A and a key with the product support of FIG. 39A removably coupled to a receiver station on the bar.

FIG. 41 is a schematic top perspective view of another embodiment of a hanging system with examples of another bar and product supports having keys removably coupled to receiver stations.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The device or system may be used in a number of directions and orientations. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a controller would encompass a processor and a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein.

A self-organizing hanging system generally includes at least two main components—bars and keys. The bars have at least three embodiments: standard embodiment, valet embodiment, and shelf embodiment. Each embodiment has variations of embodiments of bars and keys. Each of the bars and keys can have embodiments of magnetic elements and anti-rotation elements. The keys have additional opportunities for variations of embodiments to couple with a product support. In at least one aspect, the bars can be formed with receiver stations at predetermined spacing to cause organized placement for coupling keys with the bars. Further, the bars and keys can be coupled to appear as an integral assembly with one or more external surfaces in planar uniformity.

FIGS. 1A-3F illustrate an example of an embodiment of the hanging system.

Figure 1A:
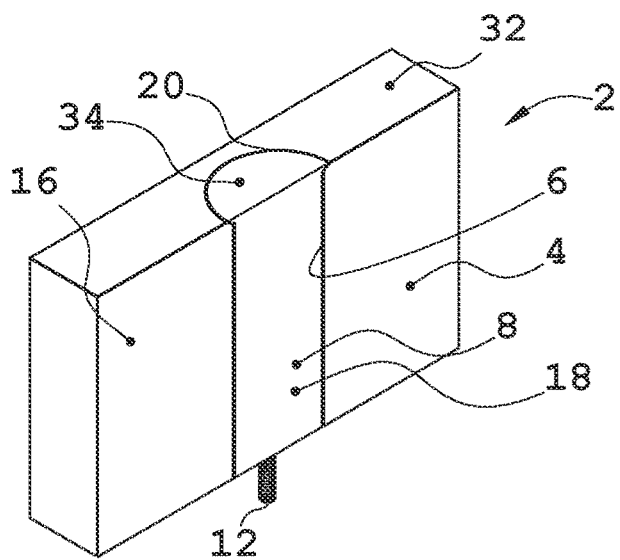
FIG. 1A is a schematic top perspective front view of an example of an embodiment of the hanging system having a bar and a key inserted into the bar.
Figure 1B:
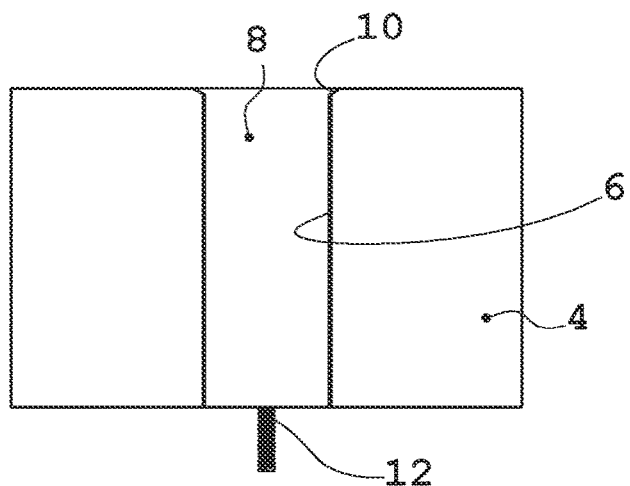
FIG. 1B is a schematic front view of the hanging system embodiment of FIG. 1A.
Figure 1C:
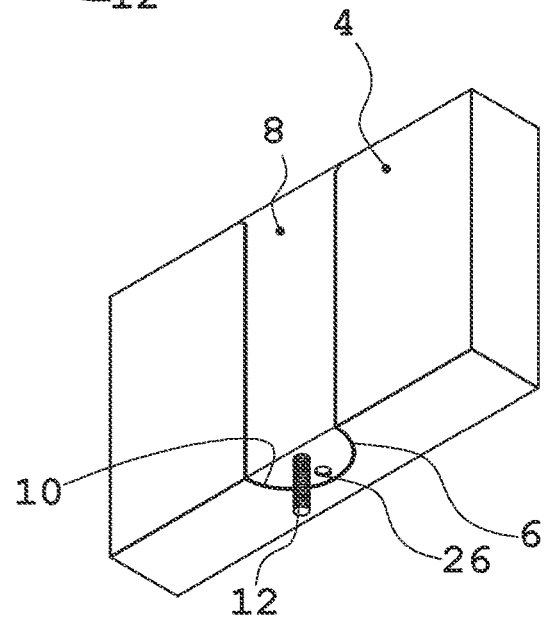
FIG. 1C is a schematic bottom perspective front view of the hanging system embodiment of FIG. 1A.

FIG. 1A is a schematic top perspective front view of an example of an embodiment of the hanging system having a bar and a key inserted into the bar. FIG. 1B is a schematic front view of the hanging system embodiment of FIG. 1A. FIG. 10 is a schematic bottom perspective front view of the hanging system embodiment of FIG. 1A.

Figure 2A:
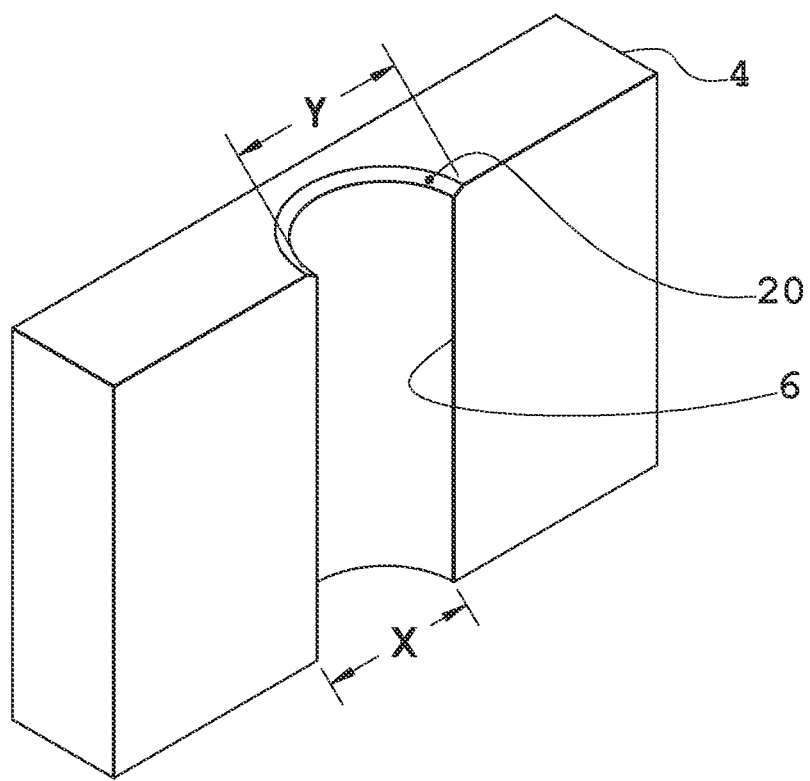
FIG. 2A is a schematic top perspective view of the bar of FIG. 1A.
Figure 2B:
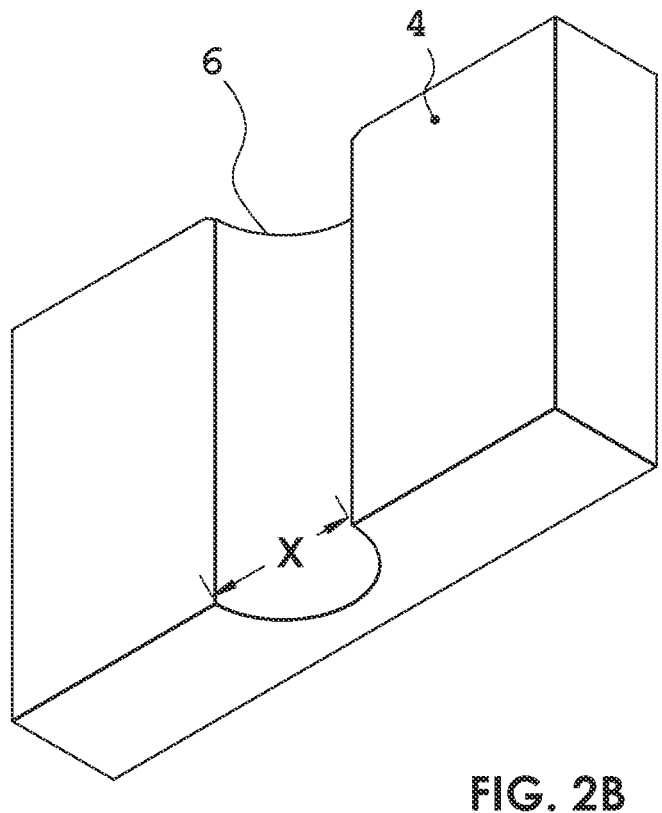
FIG. 2B is a schematic bottom perspective view of the bar of FIG. 2A.

FIG. 2A is a schematic top perspective view of the bar of FIG. 1A. FIG. 2B is a schematic bottom perspective view of the bar of FIG. 2A. FIG. 2C is a schematic front view of the bar of FIG. 2A. FIG. 2D is a schematic top view of the bar of FIG. 2C. FIG. 2E is a schematic bottom view of the bar of FIG. 2C. FIG. 2F is a schematic side view of the bar of FIG. 2C.

Figure 3A:
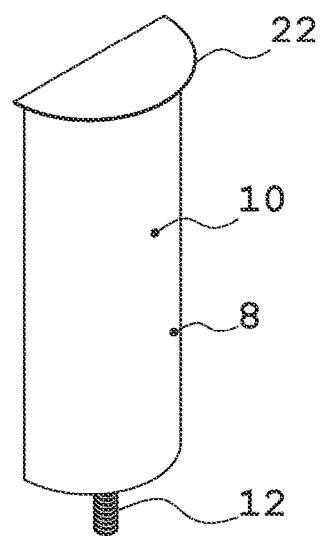
FIG. 3A is a schematic top perspective rear view of the key of FIG. 1A.
Figure 3B:
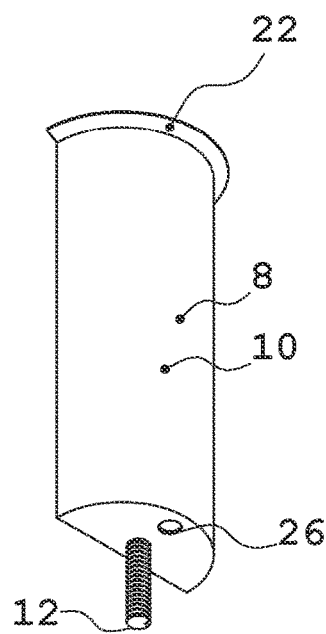
FIG. 3B is a schematic bottom perspective rear view of the key of FIG. 3A.
Figure 3C:
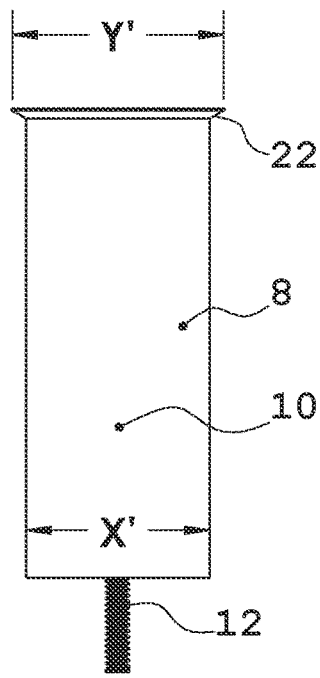
FIG. 3C is a schematic rear view of the key of FIG. 3A.
Figure 3D:
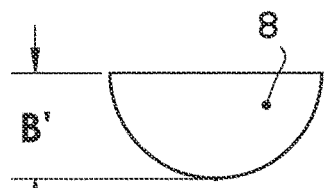
FIG. 3D is a schematic top view of the key of FIG. 3C.
Figure 3E:
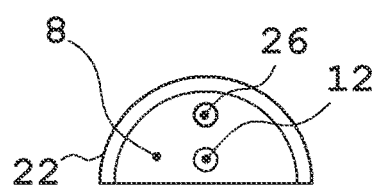
FIG. 3E is a schematic bottom view of the key of FIG. 3C.
Figure 3F:
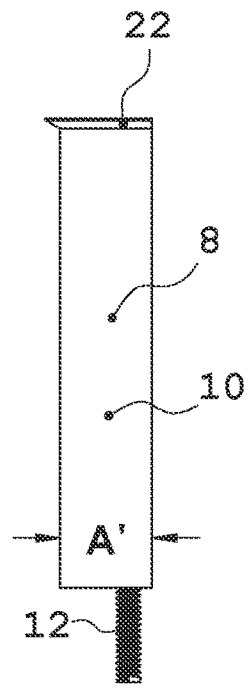
FIG. 3F is a schematic side view of the key of FIG. 3C.

FIG. 3A is a schematic top perspective rear view of the key of FIG. 1A. FIG. 3B is a schematic bottom perspective rear view of the key of FIG. 3A. FIG. 3C is a schematic rear view of the key of FIG. 3A. FIG. 3D is a schematic top view of the key of FIG. 3C. FIG. 3E is a schematic bottom view of the key of FIG. 3C. FIG. 3F is a schematic side view of the key of FIG. 3C.

The hanging system 2 generally includes a bar 4 having at least one and generally a plurality of receiver stations 6 and keys 8 configured to be coupled with at least one of the receiver stations. The bar 4 is generally elongated and the receiver stations are formed along a length of the bar on an outer face, generally a front face, for ease of access by a user. The key 8 forms a surface 10 configured to fit within the receiver station 6. In general, the receiver stations are spaced at predetermined distances along the bar to organize coupling with the keys in a modular manner. The bar 4 can be formed in a variety of shapes and cross-sections, and the illustrated embodiment is only for example. Likewise, the receiver station 6 can have a variety of shapes and cross-sections, and the illustrated embodiment of a semi-circular cross-section is only for example. Other shapes could include square, rectangular, triangular, trapezoidal, polygonal, and other shapes. Similarly, the key 8 can have a variety of shapes and cross-sections, and the illustrated embodiment of a semi-circular cross section is only for example to fit with the illustrated cross sectional shape of the receiver station 6. The key 8 could have a corresponding cross section to fit with the receiver station 6. Still further, the bar could have different shapes of receiver stations to fit different shapes of keys for further delineation and organization along the bar.

In this embodiment, the bar forms a generally front-facing, outer surface 16 and top surface 32. The key also forms a generally front-facing, outer surface 18 and a top surface 34. Advantageously when assembled with the bar 4, the key outer surface 18 can be configured to align in planar conformity with the bar outer surface 16. The term "planar" is intended to mean that the key outer surface 18 is aligned in the same plane as an adjacent bar outer surface 16, such as shown in FIG. 1A. The effects of such planar conformity promote a visually integrated coupling that can appear as a unitized assembly. Further, advantageously when assembled with the bar 4, the key top surface 34 can be configured to align in planar conformity with the bar top surface 32. When such surfaces are aligned, the key and the bar appear as an integral assembly. Further, the key generally includes a coupler 12. The coupler 12 is configured to be connected to a product support from which a product can be held. In some embodiments, the key 8 also can include a key magnetic field element 26 that can interface with the bar 4, as described in more detail below.

Generally, the receiver station 6 can have width X and depth A, and the key 8 can have a corresponding width X' and depth A' to removably couple with the receiver station. To maintain the key 8 in position on the bar and support weight of the product that can be attached to the key, a bar load bearing surface 20 can be formed on the bar. In at least one embodiment, the bar load bearing surface 20 can be formed on the bar top surface 32. However, the bar load bearing surface 20 can be formed at other elevations along the receiver station 6 height. Similarly, a key load bearing surface 22 can be formed on the key 8 to engage the bar load bearing surface 20. The bar load bearing surface 20 can be formed as a chamfer, stepped shoulder, or other shapes that would restrict the movement of the key at least downward when engaged with the bar. The shape of the key load bearing surface 22 can be formed to correspond with the shape of the bar load bearing surface 20. The bar load bearing surface 20 can have a width of Y and depth of B and the key load bearing surface 22 can have a corresponding width Y' and depth B'.

The bar can be mounted to surfaces such as a wall with a lateral support attached to the wall and extending at an angle to the bar. The bar can also be mounted from a vertical support extending upward and cantilevered over to the bar for clearance behind the key sufficient for product. The bar can be mounted from vertical supports extending downward from a ceiling or other upper structure. The bar can also be mounted using ends of the bar to walls, vertical supports, or lateral supports.

FIGS. 4A-6F illustrate another example of an embodiment of the hanging system.

Figure 4B:
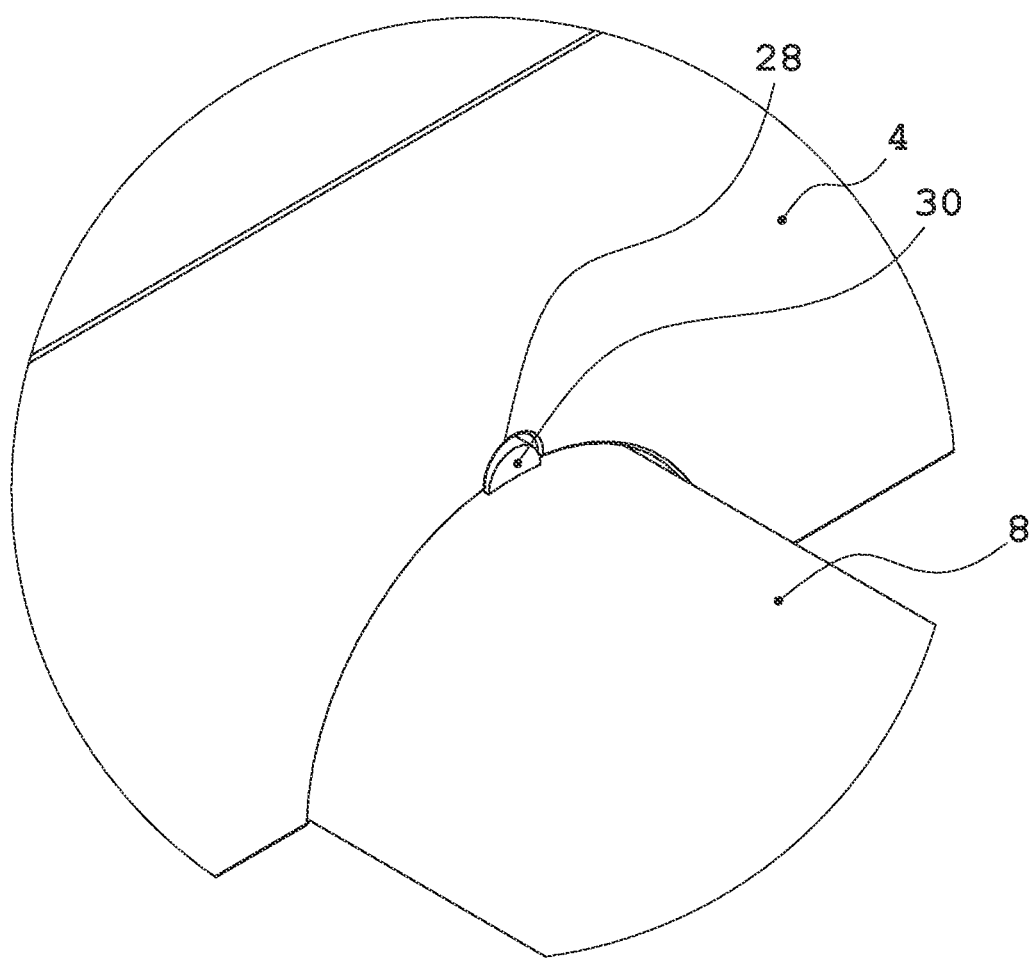
FIG. 4B is a schematic enlarged bottom perspective rear view of the hanging system embodiment of FIG. 4A.
Figure 4A:
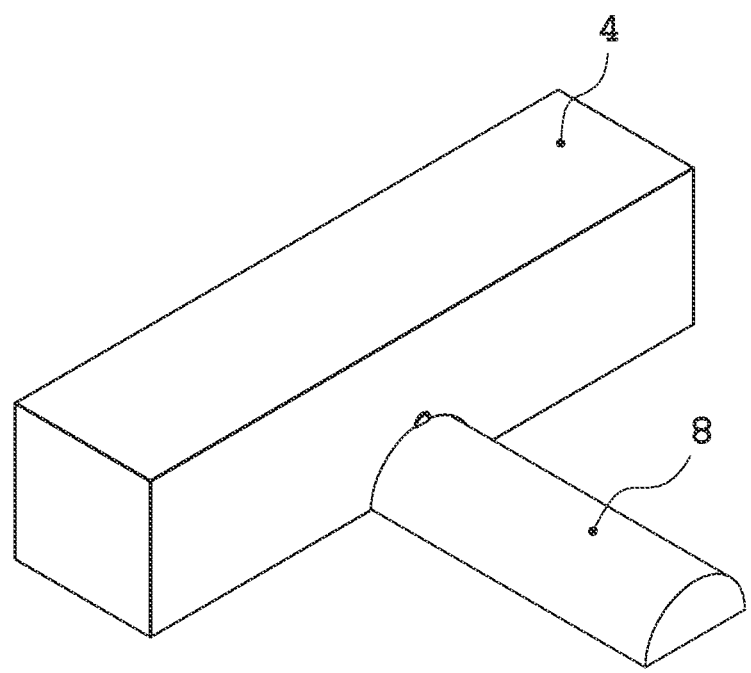
FIG. 4A is a schematic bottom perspective rear view of another example of an embodiment of the hanging system having a bar and a key inserted into the bar with an anti-rotation element.

FIG. 4A is a schematic bottom perspective rear view of another example of an embodiment of the hanging system having a bar and a key inserted into the bar with an anti-rotation element. FIG. 4B is a schematic enlarged bottom perspective rear view of the hanging system embodiment of FIG. 4A.

Figure 5A:
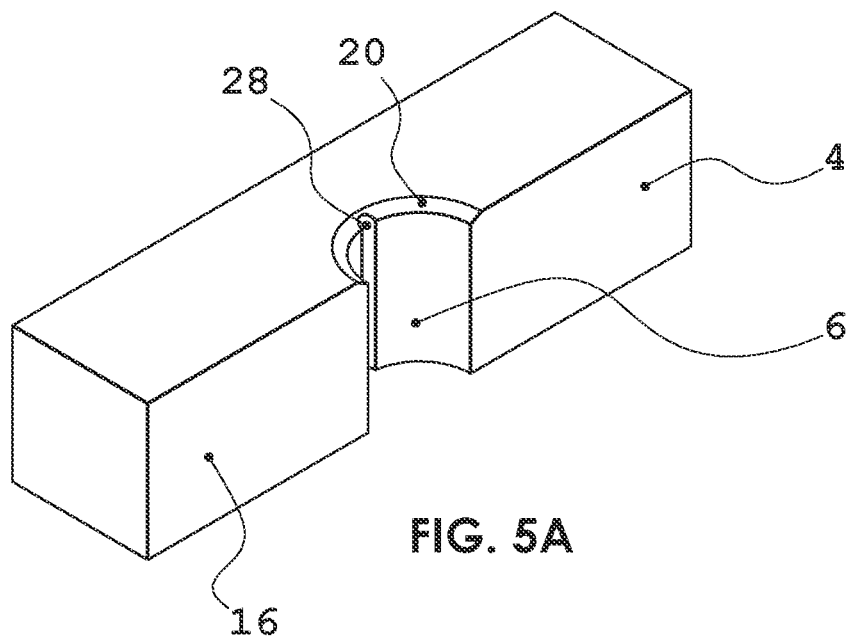
FIG. 5A is a schematic top perspective view of the bar of FIG. 4A.
Figure 5B:
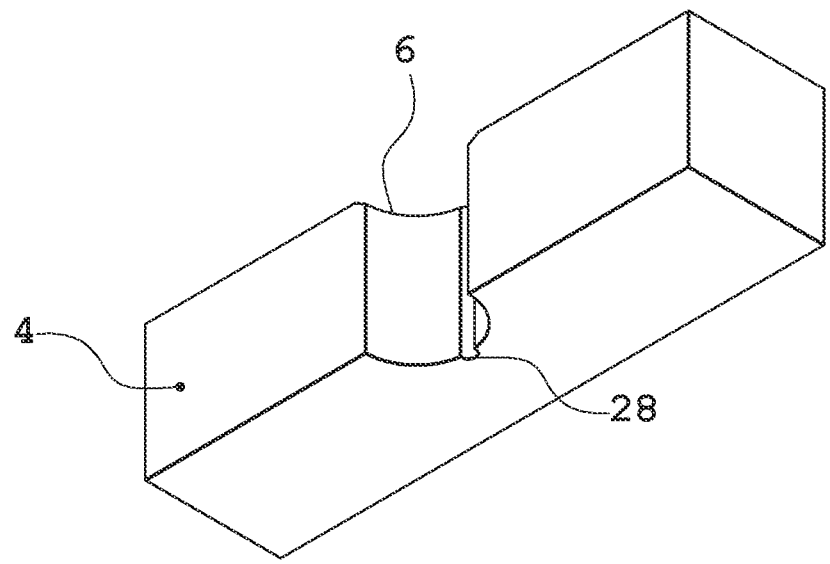
FIG. 5B is a schematic bottom perspective view of the bar of FIG. 5A.
Figure 5D:
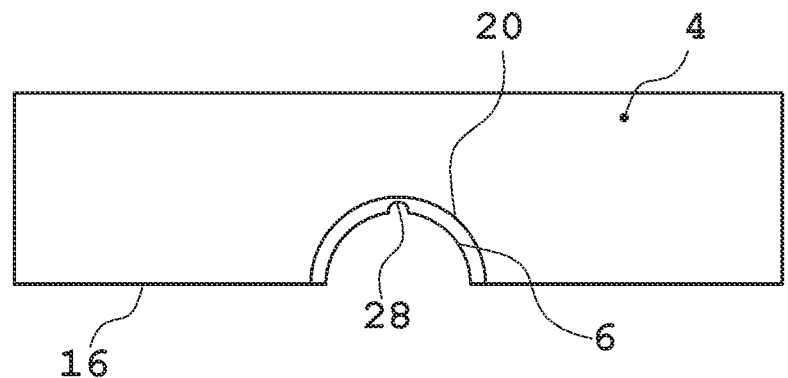
FIG. 5D is a schematic top view of the bar of FIG. 5C.
Figures 5C, 5F:
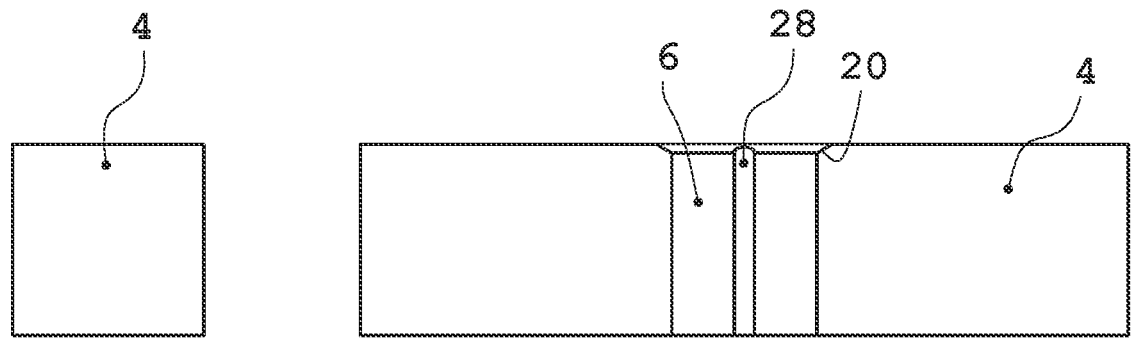
FIG. 5C is a schematic front view of the bar of FIG. 5A.
FIG. 5F is a schematic side view of the bar of FIG. 5C.
Figure 5E:
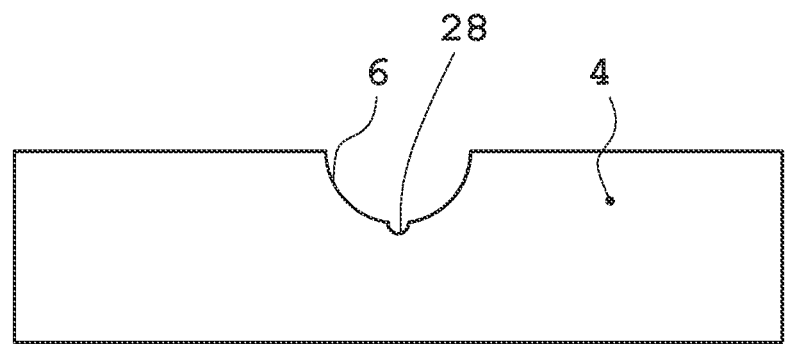
FIG. 5E is a schematic bottom view of the bar of FIG. 5C.

FIG. 5A is a schematic top perspective view of the bar of FIG. 4A. FIG. 5B is a schematic bottom perspective view of the bar of FIG. 5A. FIG. 5C is a schematic front view of the bar of FIG. 5A. FIG. 5D is a schematic top view of the bar of FIG. 5C. FIG. 5E is a schematic bottom view of the bar of FIG. 5C. FIG. 5F is a schematic side view of the bar of FIG. 5C.

FIG. 6A is a schematic top perspective rear view of the key of FIG. 4A. FIG. 6B is a schematic bottom perspective rear view of the key of FIG. 6A. FIG. 6C is a schematic rear view of the key of FIG. 6A. FIG. 6D is a schematic top view of the key of FIG. 6C. FIG. 6E is a schematic bottom view of the key of FIG. 6C. FIG. 6F is a schematic side view of the key of FIG. 6C.

This embodiment includes an anti-rotation feature between the key 8 when engaged with the bar 4. The anti-rotation feature can be provided in a variety of configurations and with any of the embodiments disclosed herein and generally is integral with the key and bar in corresponding shapes. In this embodiment, a single anti-rotation feature is shown, although the number can vary. Further, the location and shape of the anti-rotation feature can vary. In this embodiment, the bar 4 with the receiver station 6 can be formed with a bar anti-rotation element 28, such as a notch or rib. Correspondingly, the key 8 can be formed with a complimentary key anti-rotation element 30, such as a rib or notch, respectively, to fit and engage the bar anti-rotation element 28. When the key 8 is assembled with the receiver station 6, the anti-rotation elements between the bar and the key assist the key staying in planar conformity with the bar on their respective outer surfaces 16 and 18 shown in FIG. 1A, or otherwise maintaining the key in appropriate orientation relative to the bar.

FIGS. 7A-8E illustrate another example of an embodiment of the hanging system.

Figure 7A:
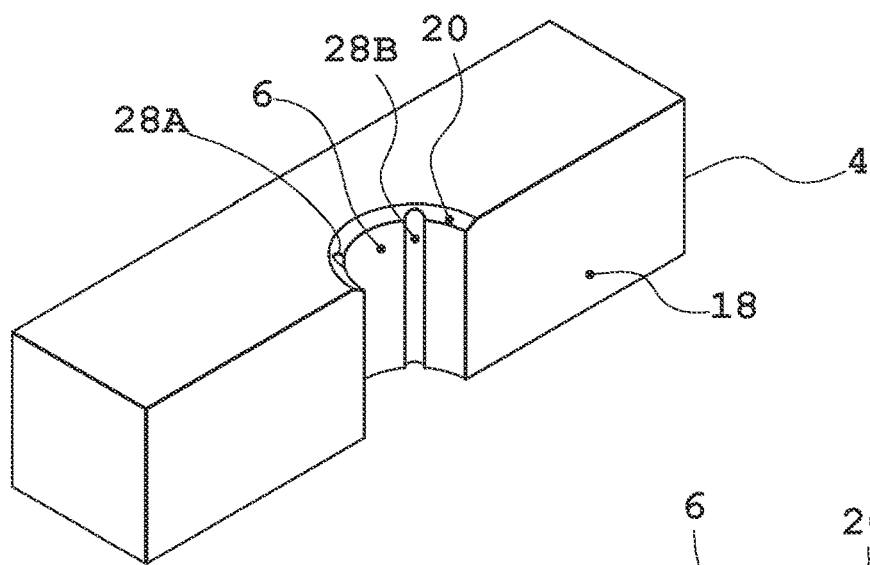
FIG. 7A is a schematic top perspective view of another embodiment of a bar similar to the bar of FIG. 4A.
Figure 7C:
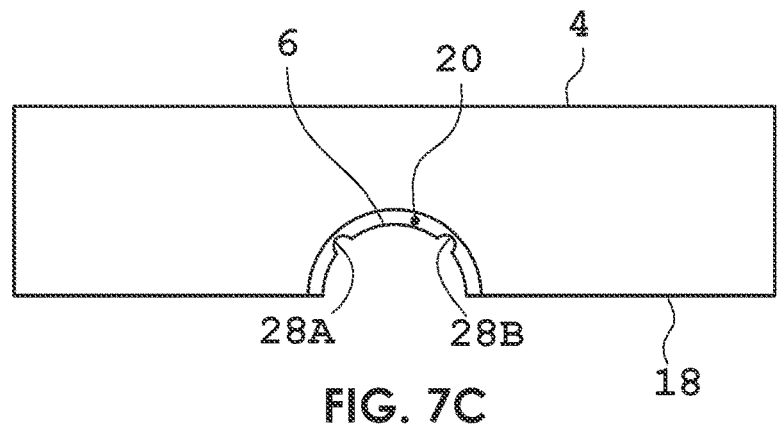
FIG. 7C is a schematic top view of the bar of FIG. 7B.
Figure 7B:
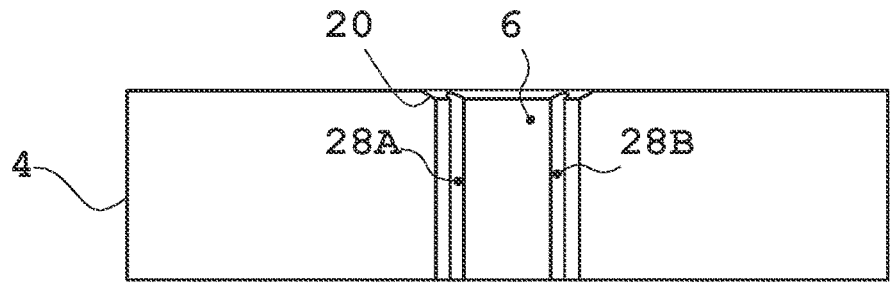
FIG. 7B is a schematic front view of the bar of FIG. 7A.
Figure 7D:
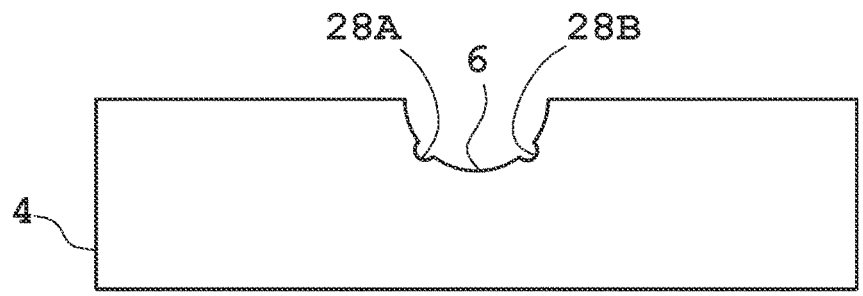
FIG. 7D is a schematic bottom view of the bar of FIG. 7B.

FIG. 7A is a schematic top perspective view of another embodiment of a bar similar to the bar of FIG. 4A. FIG. 7B is a schematic front view of the bar of FIG. 7A. FIG. 7C is a schematic top view of the bar of FIG. 7B. FIG. 7D is a schematic bottom view of the bar of FIG. 7B.

Figure 8A:
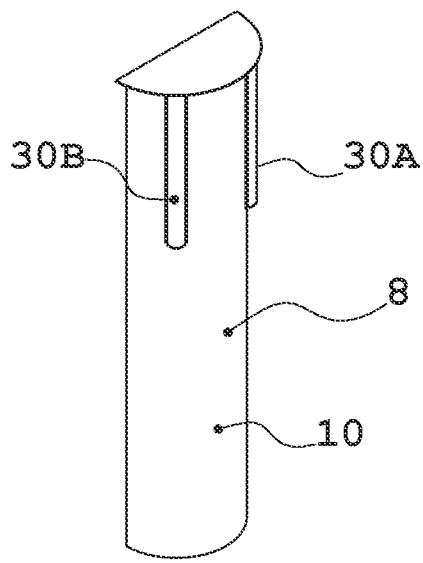
FIG. 8A is a schematic top perspective rear view of another embodiment of a key similar to the key of FIG. 4A.
Figure 8B:
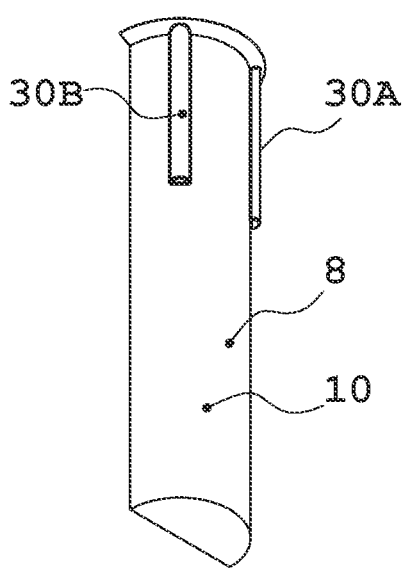
FIG. 8B is a schematic bottom perspective rear view of the key of FIG. 8A.
Figure 8C:
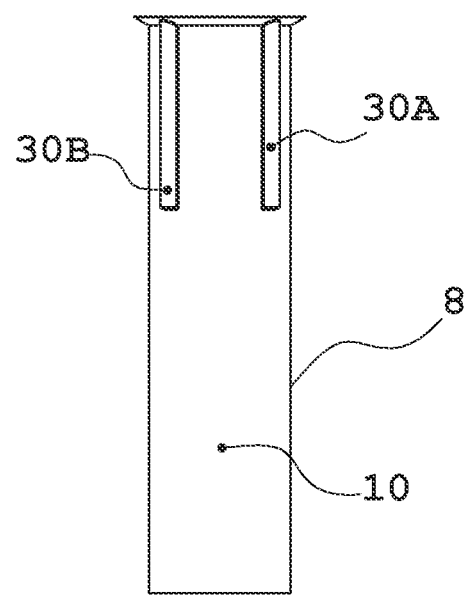
FIG. 8C is a schematic rear view of the key of FIG. 8A.
Figure 8D:
FIG. 8D is a schematic top view of the key of FIG. 8C.
Figure 8E:
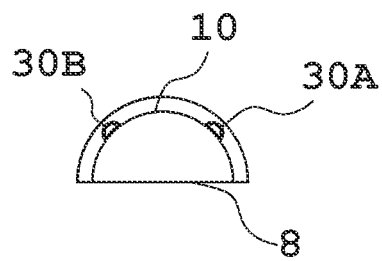
FIG. 8E is a schematic bottom view of the key of FIG. 8C.

FIG. 8A is a schematic top perspective rear view of another embodiment of a key similar to the key of FIG. 4A. FIG. 8B is a schematic bottom perspective rear view of the key of FIG. 8A. FIG. 8C is a schematic rear view of the key of FIG. 8A. FIG. 8D is a schematic top view of the key of FIG. 8C. FIG. 8E is a schematic bottom view of the key of FIG. 8C.

Similar to the above embodiment, this embodiment illustrates a plurality bar and key anti-rotation elements. In this embodiment, the receiver station 6 on the bar 4 includes a plurality of bar anti-rotation elements 28A and 28B. Correspondingly, the key includes a plurality of key anti-rotation elements 30A and 30B to fit the bar anti-rotation elements. The additional anti-rotation element can assist in further maintaining an intended orientation of the key with the receiver station. In some embodiments, the relative angle of the anti-rotation elements 28A and 28B to the outer surface 18 in the receiver station 6 can provide a slight resistance to the key to disengage from the receiver station once inserted into the receiver station.

FIGS. 9A-10F illustrate another example of an embodiment of the hanging system.

FIG. 9A is a schematic front view of another embodiment of a bar similar to the bar of FIG. 7B. FIG. 9B is a schematic top view of the bar of FIG. 9A. FIG. 9C is a schematic bottom view of the bar of FIG. 9B. FIG. 9D is a schematic side view of the bar of FIG. 9B.

Figure 10A:
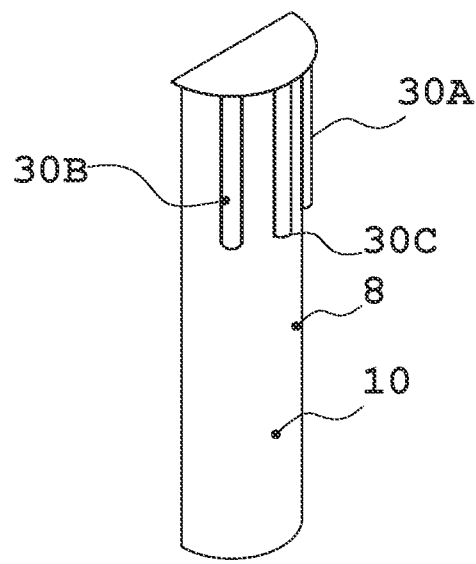
FIG. 10A is a schematic top perspective rear view of another embodiment of a key similar to the key of FIG. 8A.
Figure 10D:
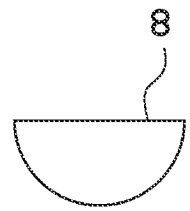
FIG. 10D is a schematic top view of the key of FIG. 10C.
Figures 10C, 10F:
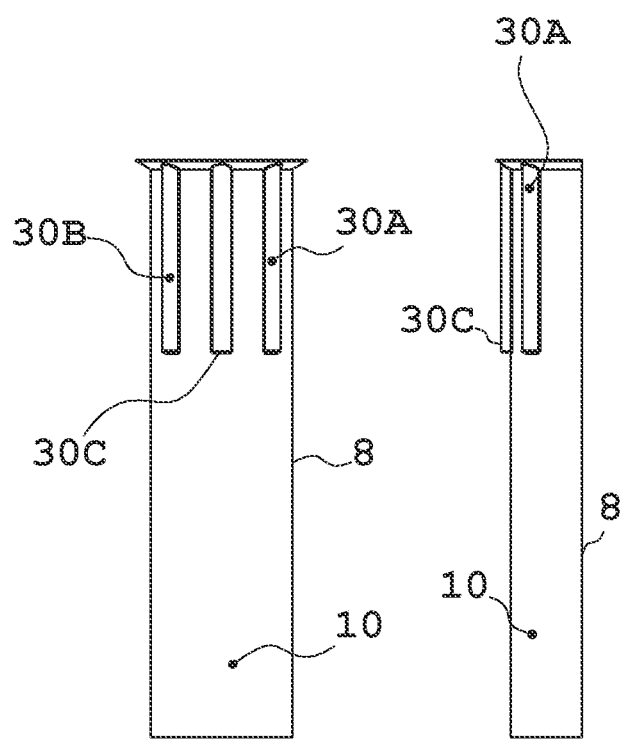
FIG. 10C is a schematic rear view of the key of FIG. 10A.
FIG. 10F is a schematic side view of the KEY of FIG. 10C.
Figure 10B:
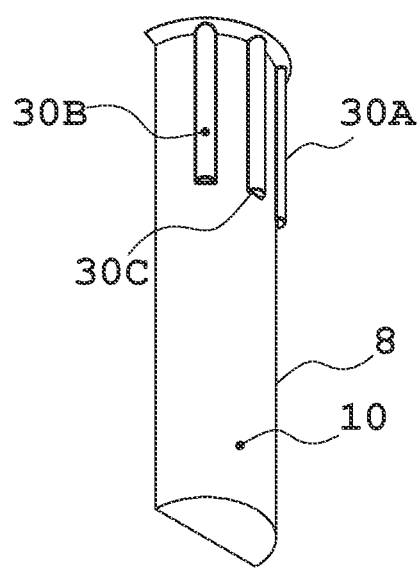
FIG. 10B is a schematic bottom perspective rear view of the key of FIG. 10A.
Figure 10E:
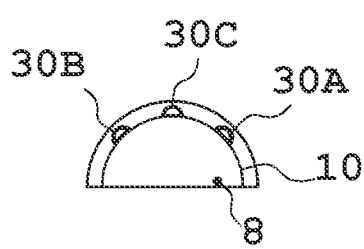
FIG. 10E is a schematic bottom view of the key of FIG. 10C.

FIG. 10A is a schematic top perspective rear view of another embodiment of a key similar to the key of FIG. 8A. FIG. 10B is a schematic bottom perspective rear view of the key of FIG. 10A. FIG. 10C is a schematic rear view of the key of FIG. 10A. FIG. 10D is a schematic top view of the key of FIG. 10C. FIG. 10E is a schematic bottom view of the key of FIG. 10C. FIG. 10F is a schematic side view of the KEY of FIG. 10C.

This embodiment shows yet another variation of the anti-rotation elements similar to the above two embodiments. This embodiment includes a bar 4 with a receiver station 6 having a further plurality of three 28A, 28B, and 28C bar anti-rotation elements. Correspondingly, the key 8 includes key anti-rotation elements 30A, 30B, and 30C to fit the bar anti-rotation elements. The further plurality of elements practically results in a tighter tolerance in manufacturing to align all three elements and can result in a more constrained and closer alignment of the key 8 with the receiver station 6 upon initial insertion and coupling.

FIGS. 11A-13J illustrate another example of an embodiment of the hanging system.

Figure 11A:
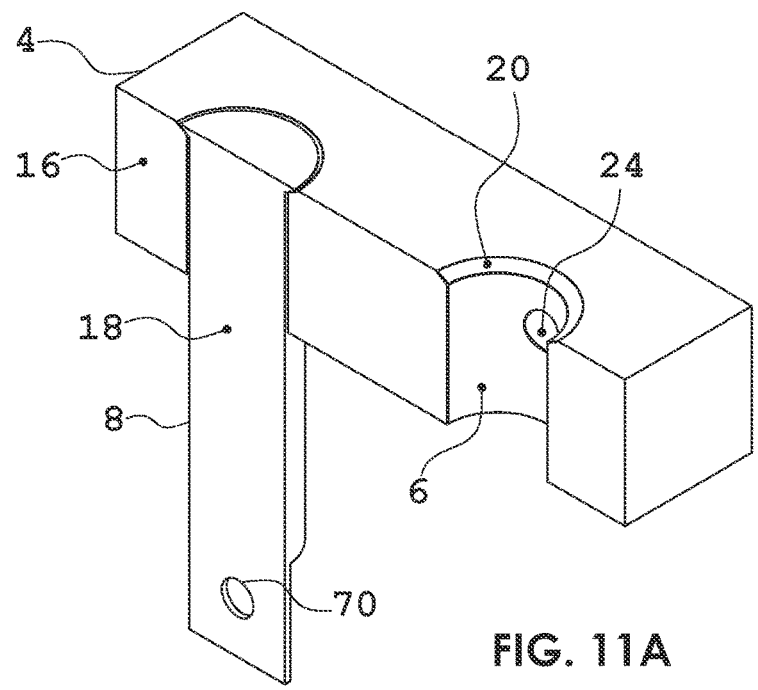
FIG. 11A is a schematic top perspective front view of another example of an embodiment of the hanging system having a bar and a key inserted into the bar with a magnetic field element.
Figures 11B, 11C:
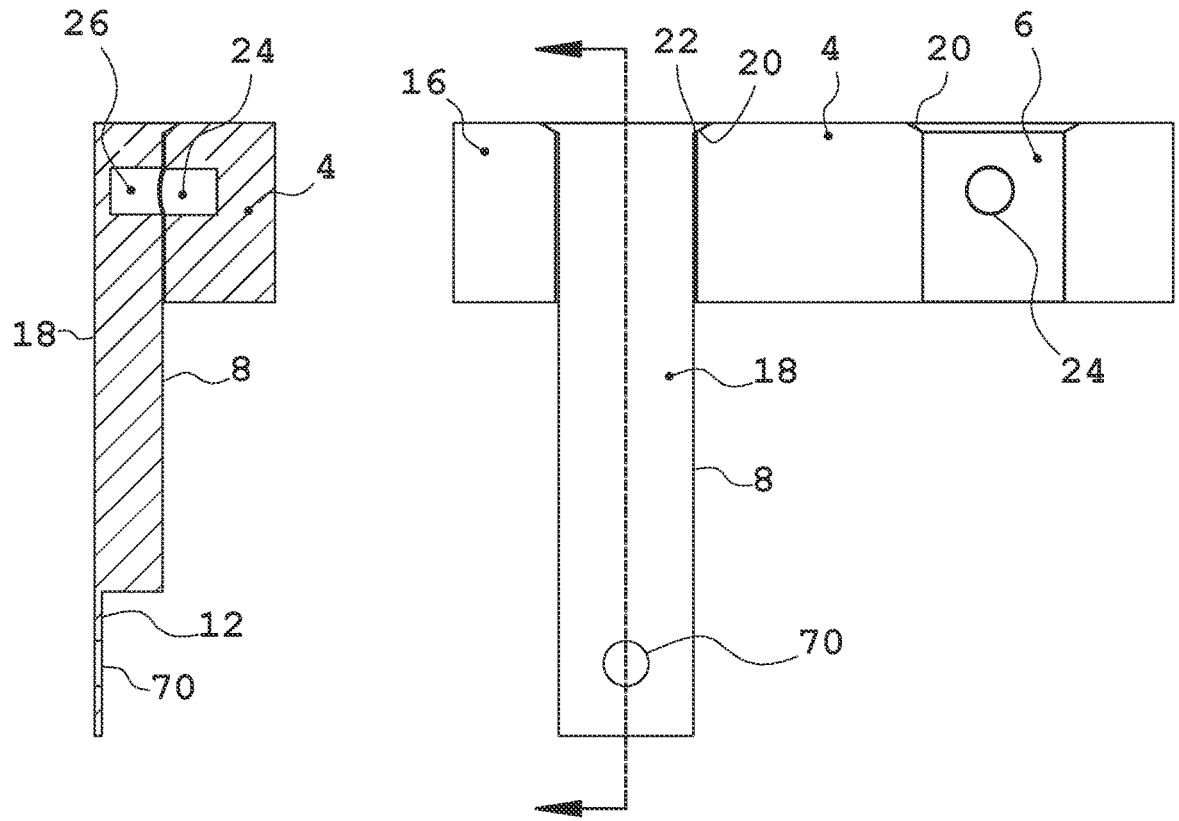
FIG. 11B is a schematic front view of the hanging system embodiment of FIG. 11A.
FIG. 11C is a schematic cross sectional side view of the hanging system embodiment of FIG. 11A.

FIG. 11A is a schematic top perspective front view of another example of an embodiment of the hanging system having a bar and a key inserted into the bar with a magnetic field element. FIG. 11B is a schematic front view of the hanging system embodiment of FIG. 11A. FIG. 11C is a schematic cross sectional side view of the hanging system embodiment of FIG. 11A.

Figure 12A:
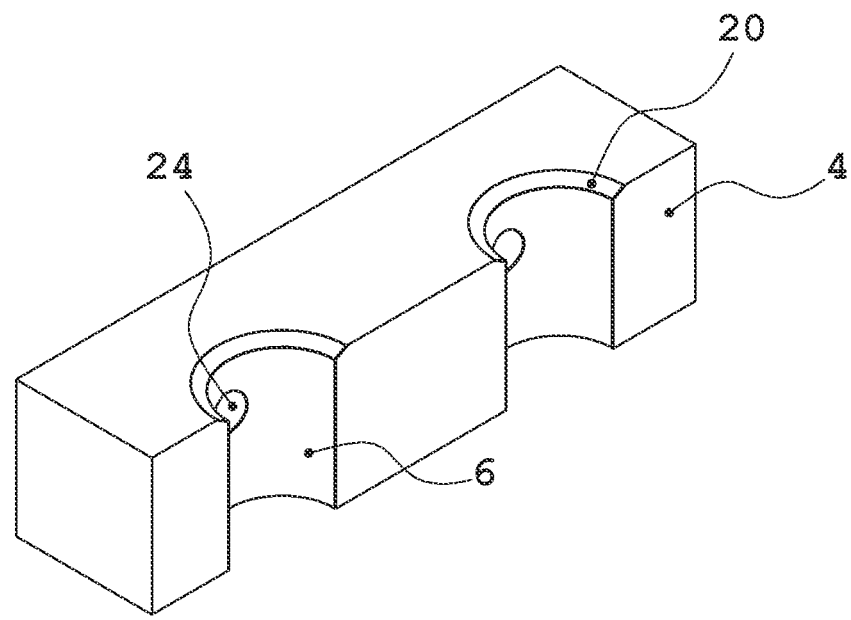
FIG. 12A is a schematic top perspective view of the bar of FIG. 11A.
Figure 12B:
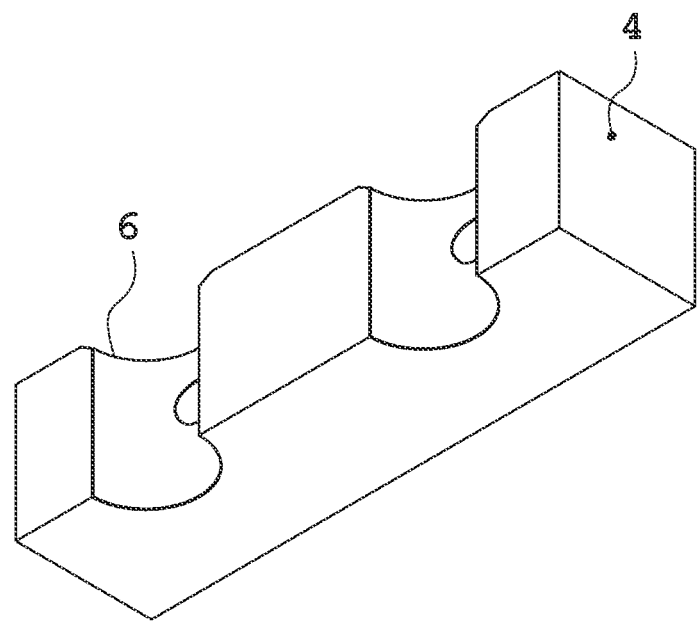
FIG. 12B is a schematic bottom perspective view of the bar of FIG. 12A.
Figure 12D:
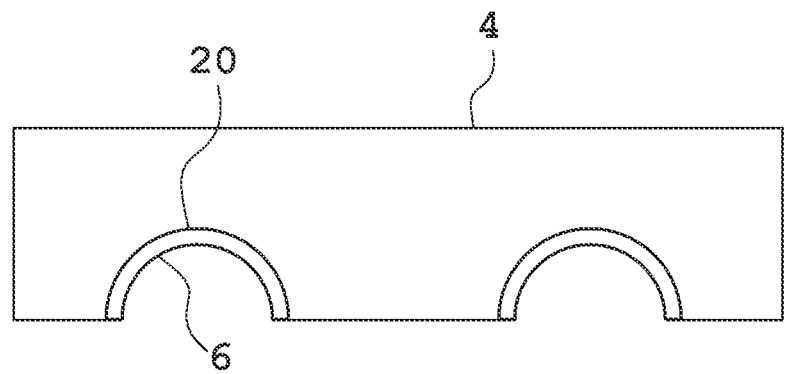
FIG. 12D is a schematic top view of the bar of FIG. 12C.
Figure 12C:
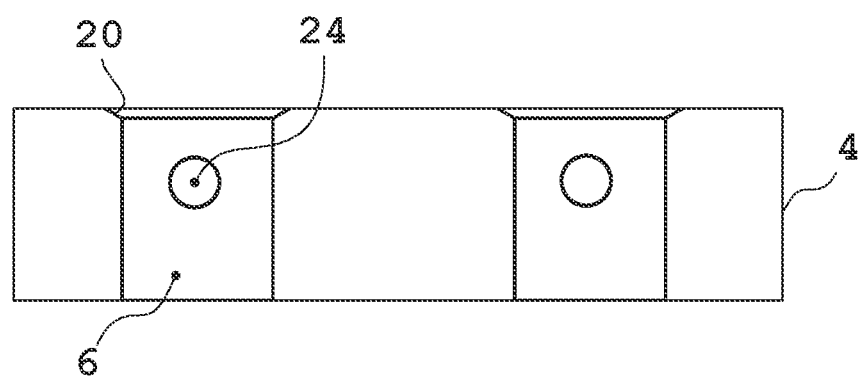
FIG. 12C is a schematic front view of the bar of FIG. 12A.
Figure 12E:
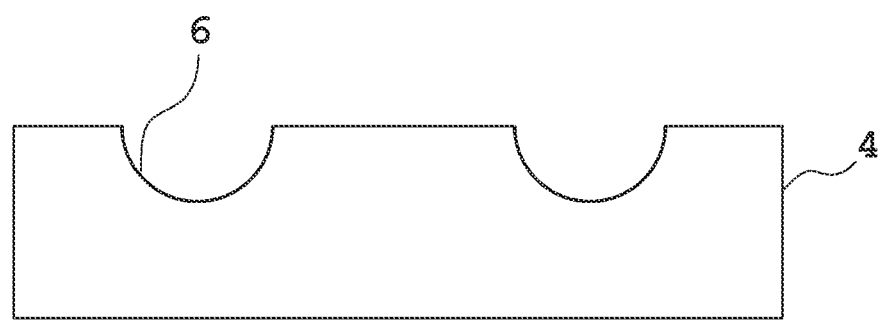
FIG. 12E is a schematic bottom view of the bar of FIG. 12C.

FIG. 12A is a schematic top perspective view of the bar of FIG. 11A. FIG. 12B is a schematic bottom perspective view of the bar of FIG. 12A. FIG. 12C is a schematic front view of the bar of FIG. 12A. FIG. 12D is a schematic top view of the bar of FIG. 12C. FIG. 12E is a schematic bottom view of the bar of FIG. 12C.

Figure 13A:
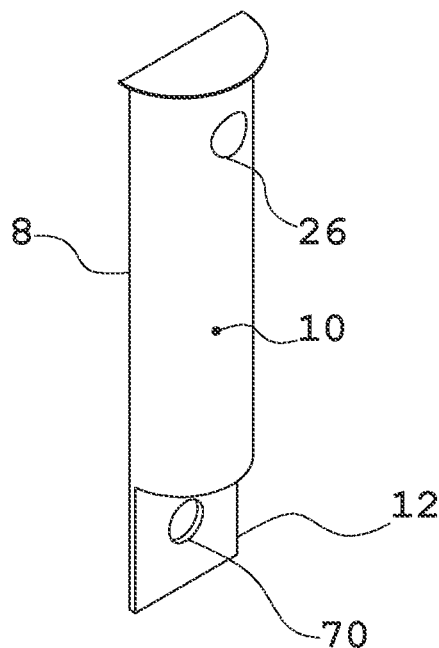
FIG. 13A is a schematic top perspective rear view of the key of FIG. 11A.
Figure 13B:
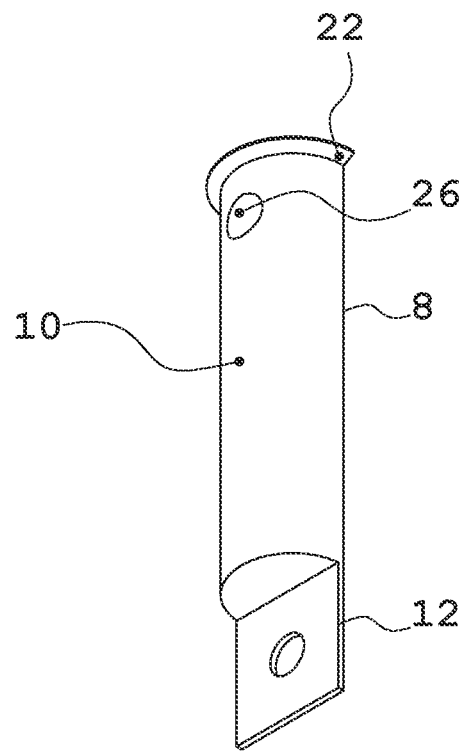
FIG. 13B is a schematic bottom perspective rear view of the key of FIG. 13A.
Figure 13H:
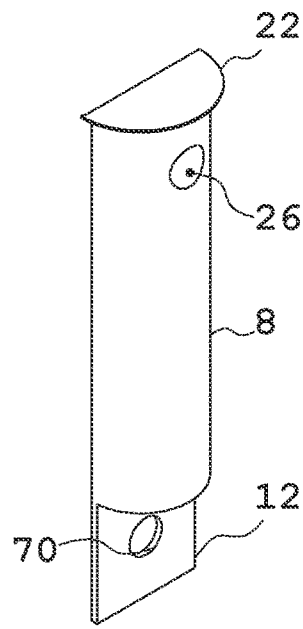
FIG. 13H is a schematic top perspective rear view of another embodiment of a key similar to the key of FIG. 11A.
Figure 13I:
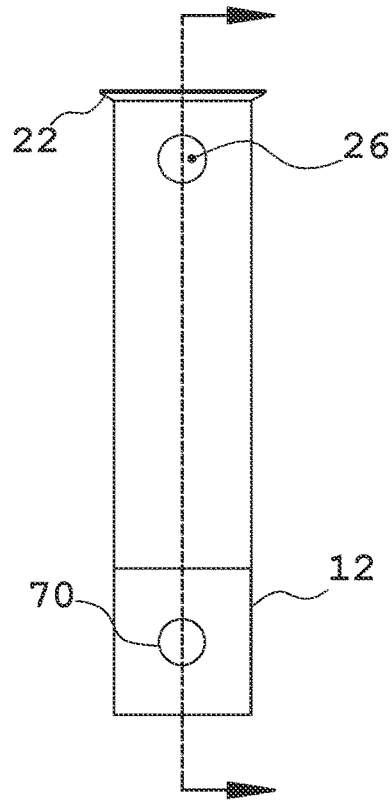
FIG. 13I is a schematic rear view of the key of FIG. 13H.
Figure 13J:
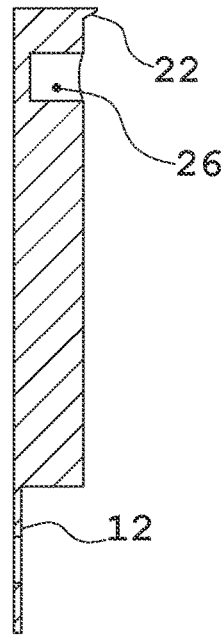
FIG. 13J is a schematic cross sectional side view of the key of FIG. 13H.

FIG. 13A is a schematic top perspective rear view of the key of FIG. 11A. FIG. 13B is a schematic bottom perspective rear view of the key of FIG. 13A. FIG. 13C is a schematic front view of the key of FIG. 13A. FIG. 13D is a schematic top view of the key of FIG. 13C. FIG. 13E is a schematic bottom view of the key of FIG. 13C. FIG. 13F is a schematic left side view of the key of FIG. 13C. FIG. 13G is a schematic rear view of the key of FIG. 13C. FIG. 13H is a schematic top perspective rear view of another embodiment of a key similar to the key of FIG. 11A. FIG. 13I is a schematic rear view of the key of FIG. 13H. FIG. 13J is a schematic cross sectional side view of the key of FIG. 13H.

This embodiment includes a magnetic field to assist in coupling the key 8 with the bar 4. At least one or more magnetic field elements 24 can be placed in the receiver station 6. Correspondingly, at least one or more key magnetic field elements 26 can be placed in the key 8. Advantageously, the magnetic field elements can be aligned in close proximity when the key is appropriately aligned in the receiver station 6. The magnetic field elements can generally include at least one magnet and another magnet or ferrous containing material. Without limitation, some variations of the magnetic field elements can be: magnet and ferrous containing material can be combined in the following ways: magnet(s) coupled in a key and ferrous containing material(s) coupled in a bar, magnet(s) coupled in a bar and ferrous containing material(s) coupled in a key, or magnets coupled in both the key and the bar. The ferrous materials can be coupled in a key in a variety of ways. The magnetic field elements 24 and 26 assist in retaining the key 8 laterally with the receiver station 6. The magnetic field elements can also assist in orienting the key in proper alignment with the receiver station when coupled thereto, such as when the key outer surface 18 is aligned in parallel (and more advantageously in planar) orientation with the bar outer surface 16. With the magnetic elements in conjunction with the bar load bearing surface 20 and key load bearing surface 22 described above, the key 8 can be restrained vertically and laterally with the bar 4. In some embodiments, the configuration of the load bearing surfaces can retain the key with the bar vertically and laterally. Further, in some embodiments, the magnetic field elements can be sufficiently strong to retain the key with the bar laterally and vertically. Thus, the embodiment is an example for illustrative purposes with other embodiments being contemplated. The key 8 can also include at least one opening 70 for coupling with product supports described herein. The opening 70 can be formed in various locations on the key, in various planes relative to the outer surface 18, and can be threaded in some embodiments to accept fasteners.

Figure 14A:
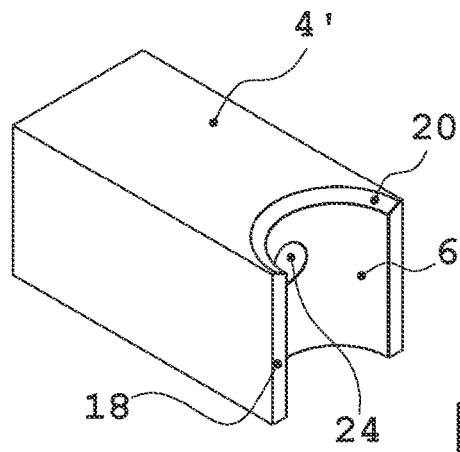
FIG. 14A is a schematic top perspective view of another embodiment termed a "valet" embodiment, of a bar with a receiver station on an end.
Figure 14C:
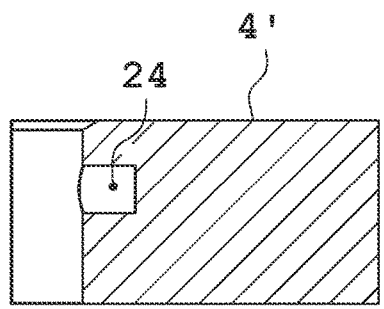
FIG. 14C is a schematic cross sectional side view of the key of FIG. 14B.
Figure 14B:
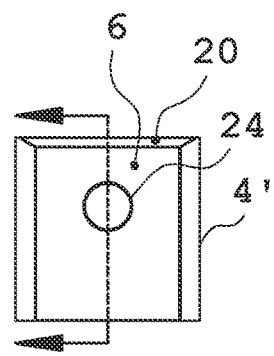
FIG. 14B is a schematic front view of the key of FIG. 14A.

FIG. 14A-14C illustrate another example of an embodiment of the hanging system.

FIG. 14A is a schematic top perspective view of another embodiment, termed herein a "valet" embodiment, of a bar with a receiver station on an end. FIG. 14B is a schematic front view of the key of FIG. 14A. FIG. 14C is a schematic cross sectional side view of the key of FIG. 14B.

In this embodiment, the receiver station 6 is formed on an end surface of the bar 4' and would be at an angle (such as transverse) to receiver stations 6 on other bars described herein, such as the bar 4 in FIG. 12A and therefore is termed herein a "valet" embodiment. The outer face 18 of the key could align in planar conformity in at least one embodiment with the outer face 16 on the end of the bar 4'. Thus, the outer face key 8, such as shown in FIG. 13A, would be at an angle to the length of the bar 4' when coupled with the receiver station 6.

FIGS. 15A-15F illustrate another example of an embodiment of the hanging system.

FIG. 15A is a schematic top perspective view of another embodiment, termed herein a "shelf" embodiment, of a bar with a plurality of receiver stations on an end. FIG. 15B is an enlarged schematic top perspective view of a portion of the bar of FIG. 15A. FIG. 15C is a schematic bottom perspective view of the bar of FIG. 15A. FIG. 15D is a schematic front view of the bar of FIG. 15A. FIG. 15E is a schematic top view of the bar of FIG. 15D. FIG. 15F is a schematic side view of the bar of FIG. 15D.

In this embodiment, the bar 4' can have a configuration of a shelf. The receiver stations 6 can still be positioned on the bar outer surface 16 and the bar 4' extended in depth to form a shelf for lateral storage. The bar 4' can further include a ridge 36 on the bar top surface 32 that can serve as a guide for storage on the bar and avoid interference with the interactions of the key (not shown) with the receiver stations.

FIGS. 16A-17F illustrate another example of an embodiment of the hanging system.

Figure 16A:
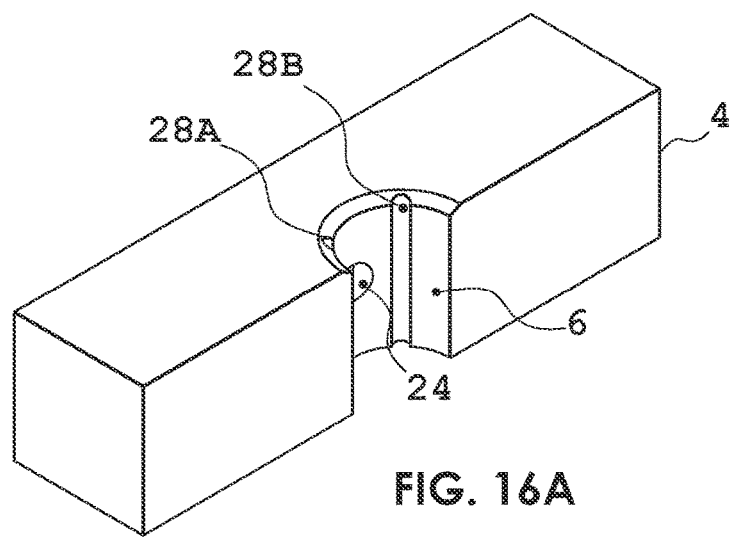
FIG. 16A is a schematic top perspective view of another embodiment of a bar similar to the bars of FIGS. 7A and 11A.
Figure 16C:
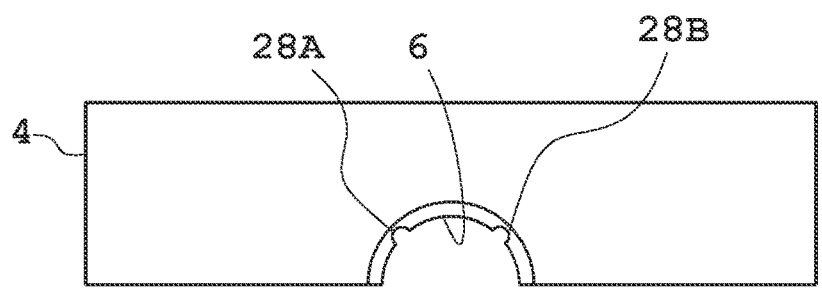
FIG. 16C is a schematic top view of the bar of FIG. 16B.
Figures 16B, 16E:
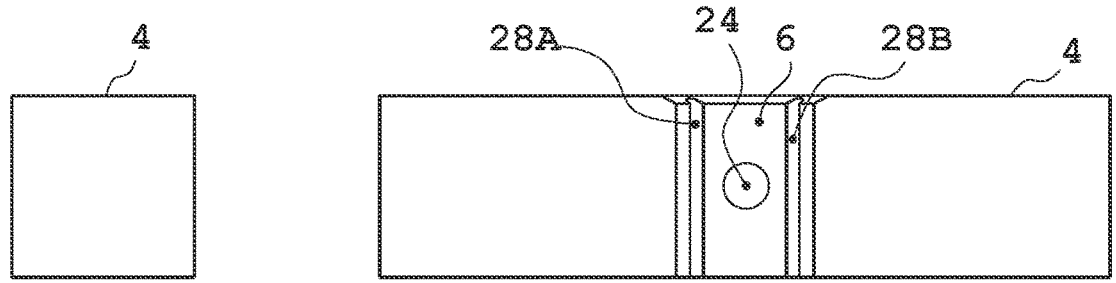
FIG. 16B is a schematic front view of the bar of FIG. 16A.
FIG. 16E is a schematic side view of the bar of FIG. 16B.
Figure 16D:
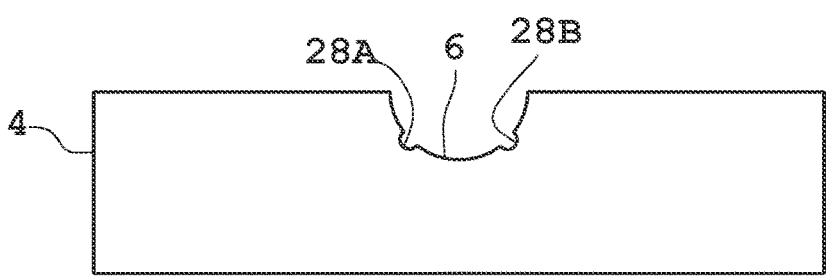
FIG. 16D is a schematic bottom view of the bar of FIG. 16B.

FIG. 16A is a schematic top perspective view of another embodiment of a bar similar to the bars of FIGS. 7A and 11A. FIG. 16B is a schematic front view of the bar of FIG. 16A. FIG. 16C is a schematic top view of the bar of FIG. 16B. FIG. 16D is a schematic bottom view of the bar of FIG. 16B. FIG. 16E is a schematic side view of the bar of FIG. 16B.

FIG. 17A is a schematic top perspective rear view of another embodiment of a key similar to the key of FIGS. 8A and 13A. FIG. 17B is a schematic bottom perspective rear view of the key of FIG. 17A. FIG. 17C is a schematic rear view of the key of FIG. 17A. FIG. 17D is a schematic top view of the key of FIG. 17C. FIG. 17E is a schematic bottom view of the key of FIG. 17C. FIG. 17F is a schematic side view of the bar of FIG. 17C.

This embodiment combines features of two or more previous embodiments described above. In this embodiment, anti-rotation elements, such as a plurality of anti-rotation elements 28A and 28B, formed in a receiver station 6 of the bar 4 can be used in conjunction with a bar magnetic field element 24 on the receiver station. Similarly, a plurality of anti-rotation elements 30A and 30B on the key 8 can be used in conjunction with a key magnetic field element 26. The combination of the anti-rotation elements and the magnetic field elements assist in laterally retaining the key engaged with the bar and in a proper orientation with the bar.

FIGS. 18A-19G illustrate another example of an embodiment of the hanging system.

Figure 18A:
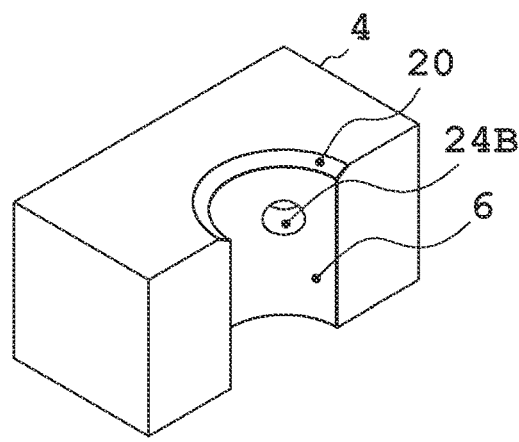
FIG. 18A is a schematic top perspective view of another embodiment of a bar similar to the bar of FIG. 12A with a plurality of magnetic field elements.
Figure 18D:
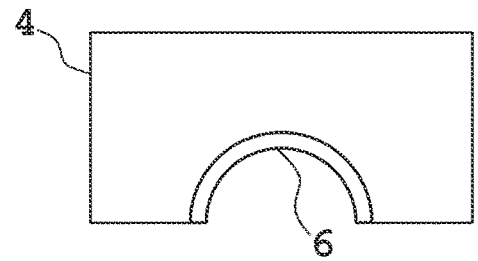
FIG. 18D is a schematic top view of the bar of FIG. 18C.
Figure 18F:
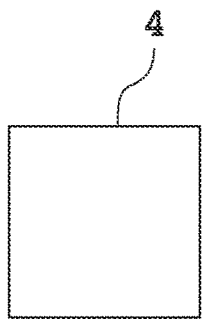
FIG. 18F is a schematic side view of the bar of FIG. 18C.
Figure 18C:
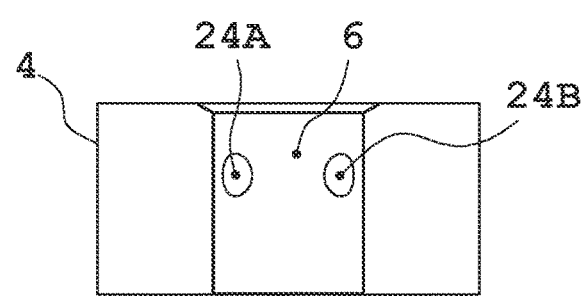
FIG. 18C is a schematic front view of the bar of FIG. 18A.
Figure 18E:
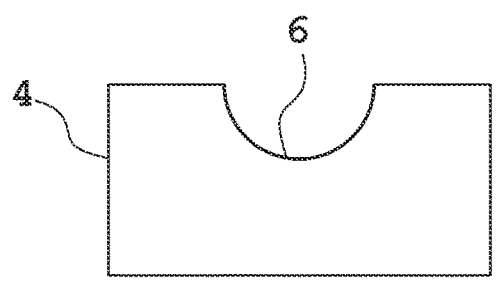
FIG. 18E is a schematic bottom view of the bar of FIG. 18C.
Figure 18B:
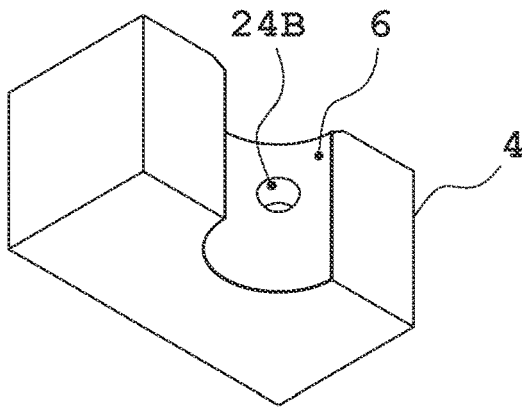
FIG. 18B is a schematic bottom perspective view of the bar of FIG. 18A.

FIG. 18A is a schematic top perspective view of another embodiment of a bar similar to the bar of FIG. 12A with a plurality of magnetic field elements. FIG. 18B is a schematic bottom perspective view of the bar of FIG. 18A. FIG. 18C is a schematic front view of the bar of FIG. 18A. FIG. 18D is a schematic top view of the bar of FIG. 18C. FIG. 18E is a schematic bottom view of the bar of FIG. 18C. FIG. 18F is a schematic side view of the bar of FIG. 18C.

Figure 19A:
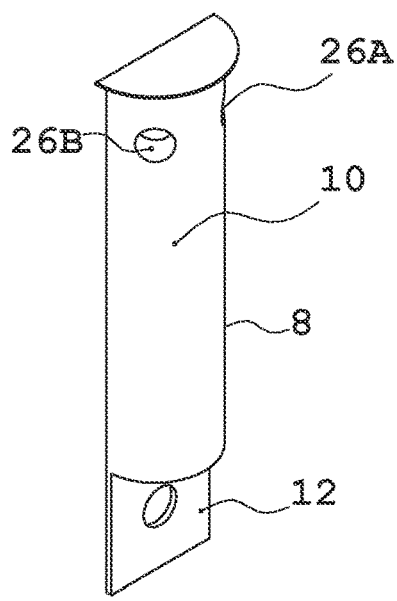
FIG. 19A is a schematic top perspective rear view of a key similar to the key of FIG. 13A with a plurality of magnetic field elements.
Figure 19D:
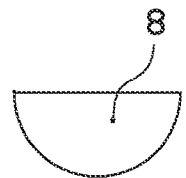
FIG. 19D is a schematic top view of the key of FIG. 19C.
Figure 19F:
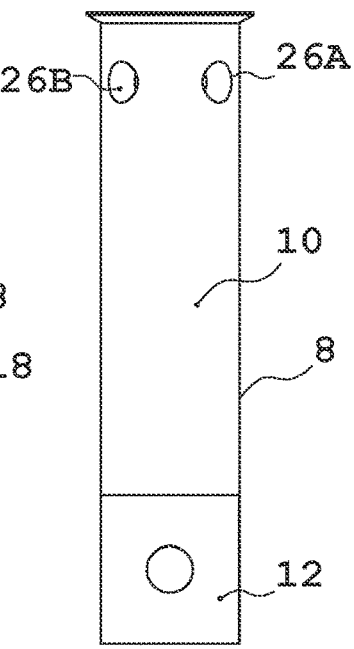
FIG. 19F is a schematic front view of the key of FIG. 19C.
Figure 19C:
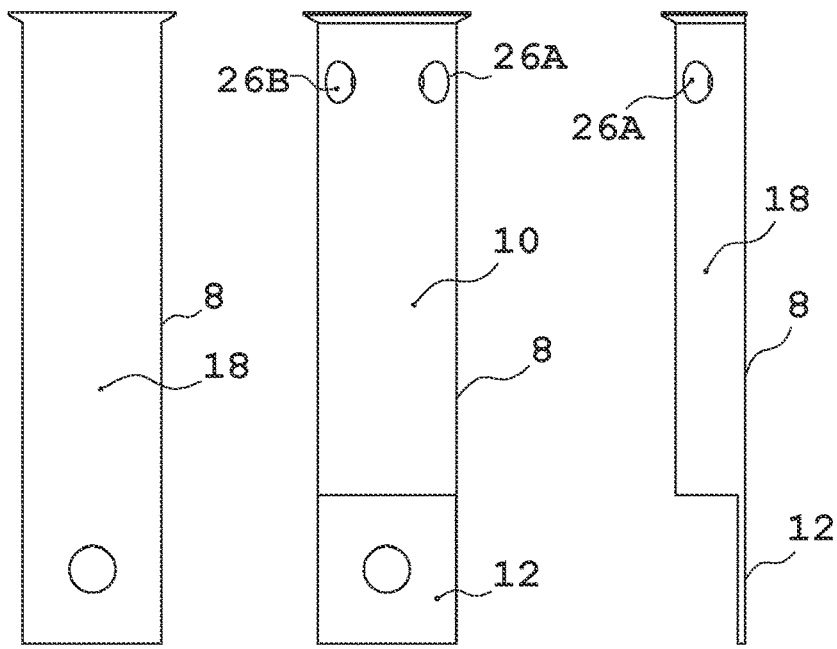
FIG. 19C is a schematic rear view of the key of FIG. 19A.
Figure 19G:
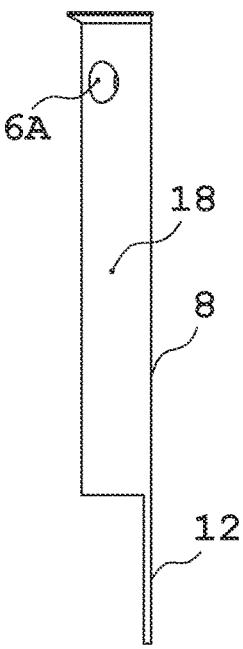
FIG. 19G is a schematic right side view of the key of FIG. 19C.
Figure 19E:
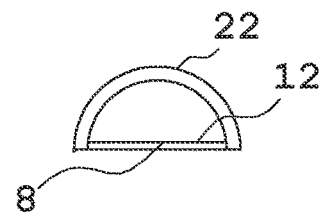
FIG. 19E is a schematic bottom view of the key of FIG. 19C.
Figure 19B:
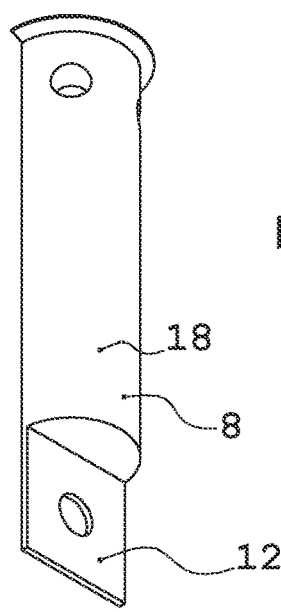
FIG. 19B is a schematic bottom perspective front view of the key of FIG. 19A.

FIG. 19A is a schematic top perspective rear view of a key similar to the key of FIG. 13A with a plurality of magnetic field elements. FIG. 19B is a schematic bottom perspective front view of the key of FIG. 19A. FIG. 19C is a schematic rear view of the key of FIG. 19A. FIG. 19D is a schematic top view of the key of FIG. 19C. FIG. 19E is a schematic bottom view of the key of FIG. 19C. FIG. 19F is a schematic front view of the key of FIG. 19C. FIG. 19G is a schematic right side view of the key of FIG. 19C.

In this embodiment, a plurality of magnetic field elements is used. For example, a pair of bar magnetic field elements 24A and 24B can be formed or otherwise placed securely into the wall of the receiver station 6. Similarly, a pair of key anti-rotation elements 26A and 26B can be formed or placed securely in the key shaped surface 10 of the key 8. The magnetic field elements can at least assist in proper alignment of the key with the receiver station.

FIGS. 20A-22C illustrate another example of an embodiment of the hanging system.

Figure 20B:
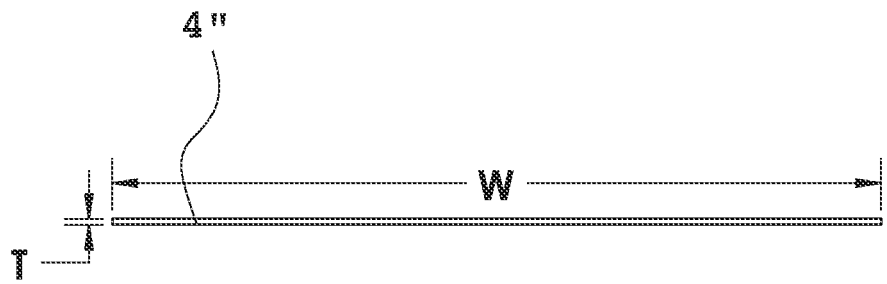
FIG. 20B is a side view of the prefolded bar.
Figure 20A:
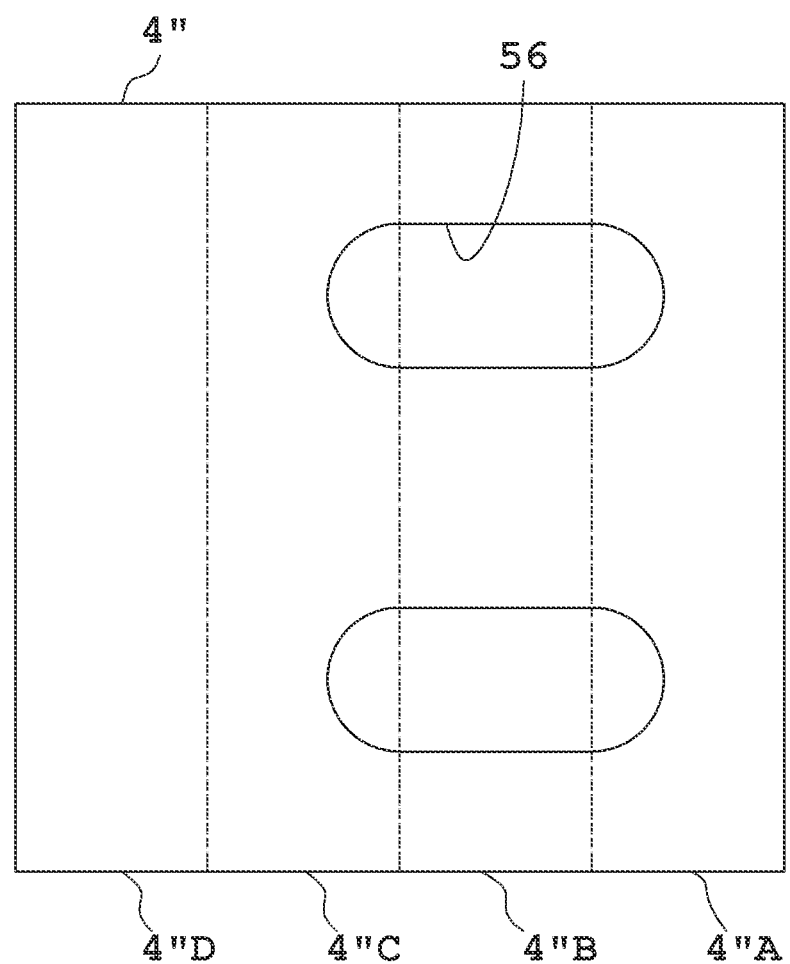
FIG. 20A is a schematic top view of another embodiment of a prefolded bar configured as a plate with bar portions to be folded into a bar.

FIG. 20A is a schematic top view of another embodiment of a prefolded bar configured as a plate with bar portions to be folded into a bar. FIG. 20B is a side view of the prefolded bar.

Figure 21A:
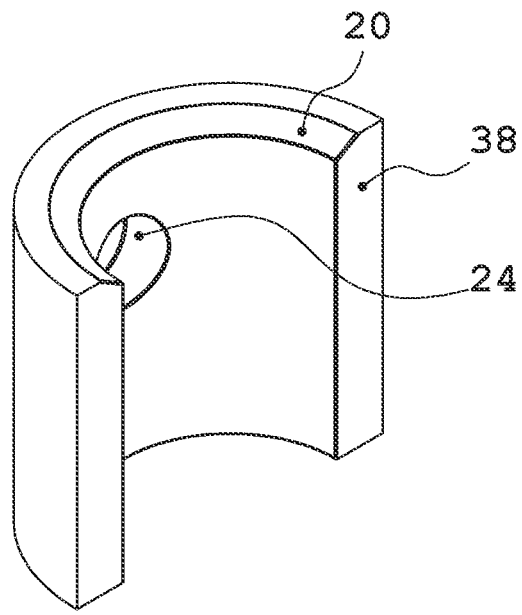
FIG. 21A is a schematic top view of a receiver station insert configured to be coupled to the bar of FIG. 20A.
Figure 21B:
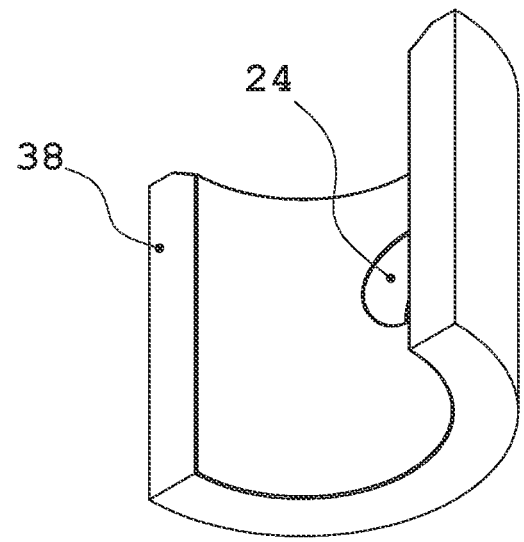
FIG. 21B is a schematic bottom view of the receiver station insert of FIG. 21A.
Figure 21D:
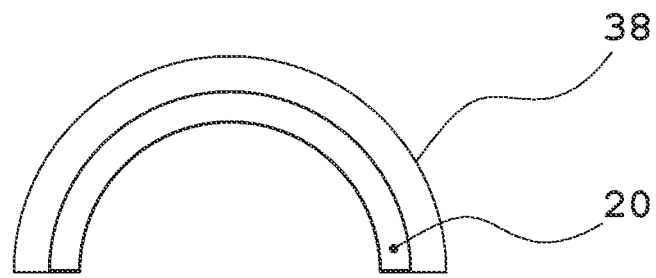
FIG. 21D is a schematic top view of the key of FIG. 21C.
Figure 21C:
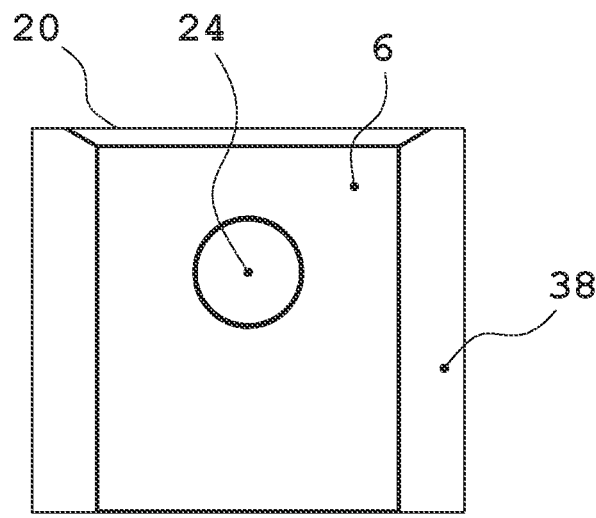
FIG. 21C is a schematic rear view of the key of FIG. 21A.
Figure 21E:
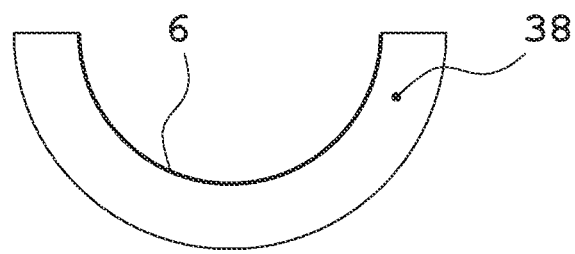
FIG. 21E is a schematic bottom view of the key of FIG. 21C.

FIG. 21A is a schematic top view of a receiver station insert configured to be coupled to the bar of FIG. 20A. FIG. 21B is a schematic bottom view of the receiver station insert of FIG. 21A. FIG. 21C is a schematic rear view of the key of FIG. 21A. FIG. 21D is a schematic top view of the key of FIG. 21C. FIG. 21E is a schematic bottom view of the key of FIG. 21C.

Figure 22A:
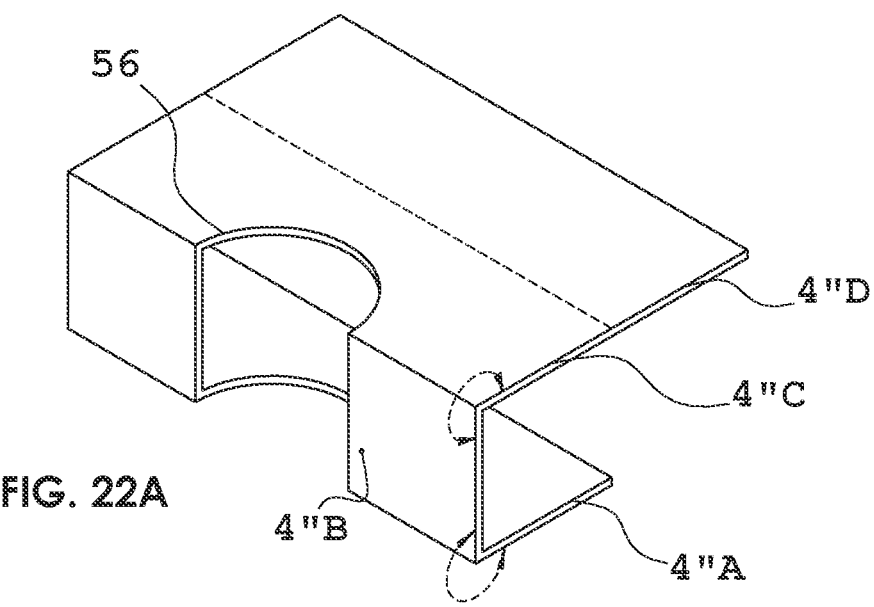
FIG. 22A is a schematic top perspective view of the bar of FIG. 20A folded with two bar portions.
Figure 22B:
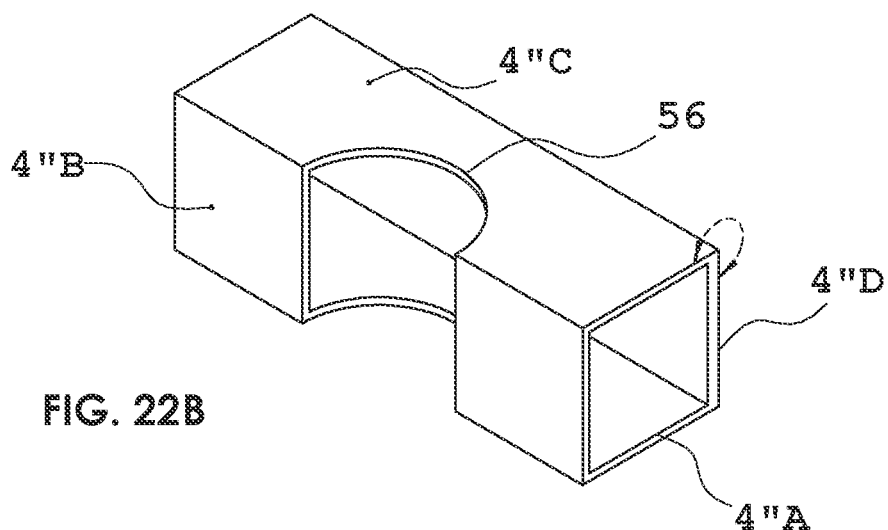
FIG. 22B is a schematic top perspective view of the bar of FIG. 22A folded with four bar portions to complete a periphery around the bar.
Figure 22C:
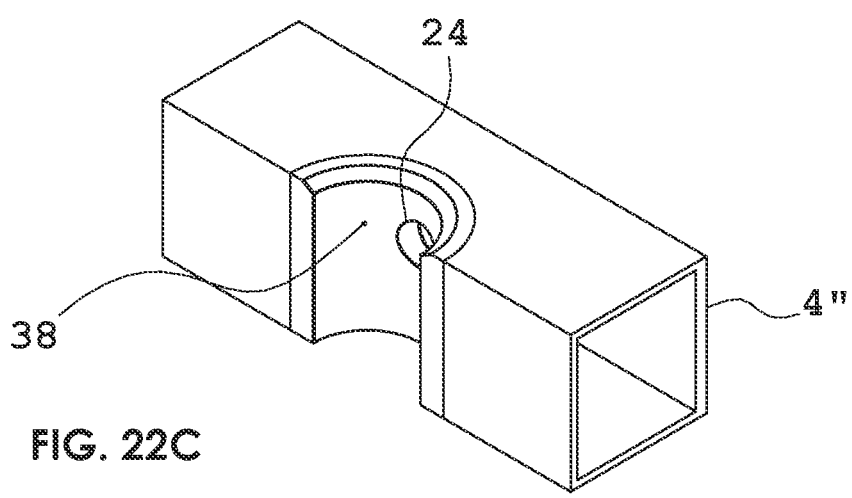
FIG. 22C is a schematic top perspective view of the bar of FIG. 22B with the insert coupled therein.

FIG. 22A is a schematic top perspective view of the bar of FIG. 20A folded with two bar portions. FIG. 22B is a schematic top perspective view of the bar of FIG. 22A folded with four bar portions to complete a periphery around the bar. FIG. 22C is a schematic top perspective view of the bar of FIG. 22B with the insert coupled therein.

This embodiment, the bar 4" can be manufactured, for example, from a sheet of structural material, such a metal or polymeric material, having a length L, width W, and thickness T. The sheet can be cut to form one or more receiver station openings 56 along the length L of the sheet. Receiver station inserts 38 can form the receiver stations 6 that can be engaged by a key. The receiver station inserts 38 can be formed with a suitable bar load bearing surface 20 and overall shape to fit a selected key and its key load bearing surface and key shaped surface.

The width W of the sheet for the bar 4" can be bent or otherwise folded or formed as shown by the arrows in FIGS.

22A and 22B along the length L into multiple planes along with the openings 56 to form a three-dimensional bar having multiple bar portions, such as bar portions 4"A, 4"B, 4"C, and 4"D. In the illustrated embodiment, the original plane of the sheet can be folded in three additional planes to form a four-sided cross section, as illustrated. Other shapes and number of planes are contemplated and the embodiment is only for illustration. The receiver station inserts 38 can be coupled in the openings 56 in FIG. 22C. Anti-rotation elements, load bearing surfaces, and magnetic field elements, described above, can be formed or coupled with the inserts 38 to couple with corresponding keys, as illustrated or described in the various embodiments herein. Other methods of forming the bar are contemplated, including of solid material, and the above example is illustrative.

Figure 23A:
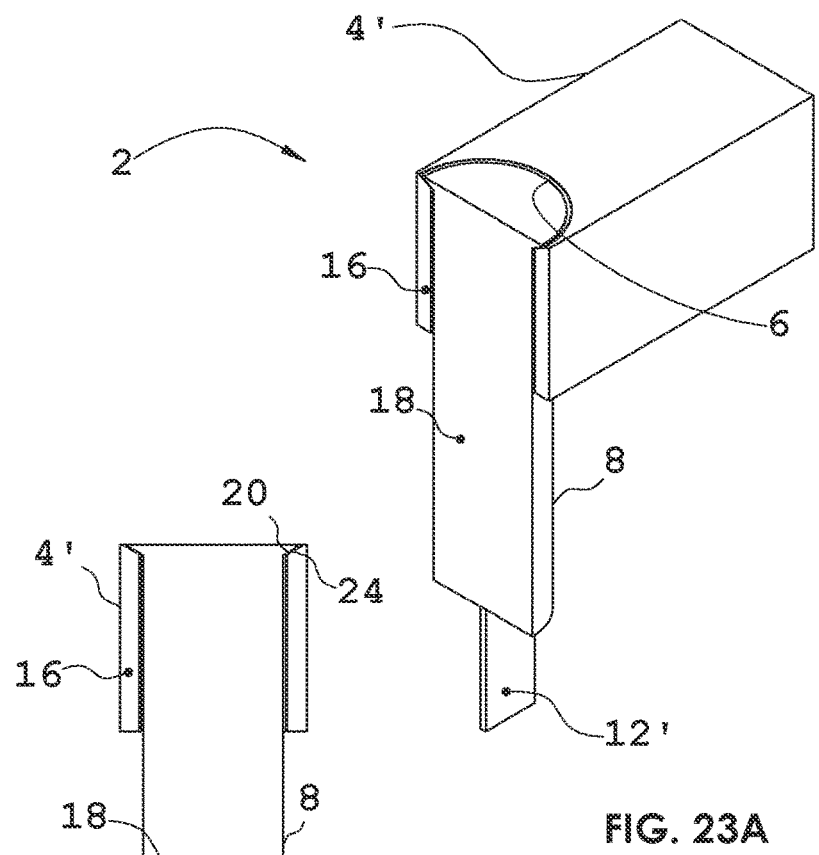
FIG. 23A is a schematic top perspective front view of another example of an embodiment of the hanging system having a bar and a key inserted into the bar on an end of the bar.
Figure 23B:
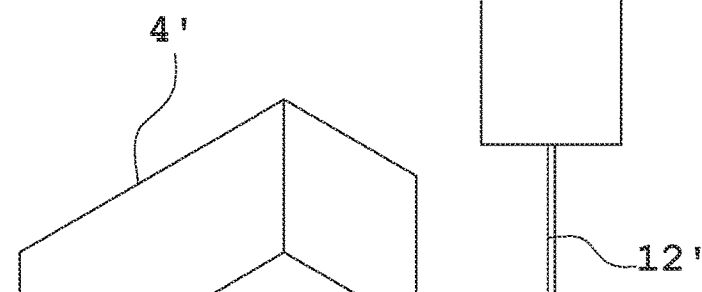
FIG. 23B is a schematic front view of the hanging system embodiment of FIG. 23A.
Figure 23C:
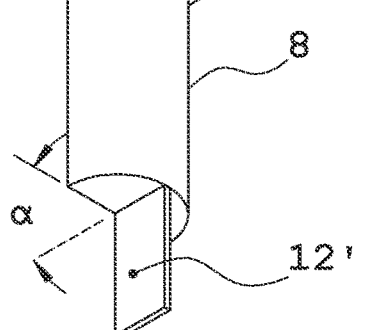
FIG. 23C is a schematic bottom perspective rear view of the hanging system embodiment of FIG. 23A.

FIG. 23A-25F illustrate another example of an embodiment of the hanging system. FIG. 23A is a schematic top perspective front view of another example of an embodiment of the hanging system having a bar and a key inserted into the bar on an end of the bar. FIG. 23B is a schematic front view of the hanging system embodiment of FIG. 23A. FIG. 23C is a schematic bottom perspective rear view of the hanging system embodiment of FIG. 23A.

Figure 24A:
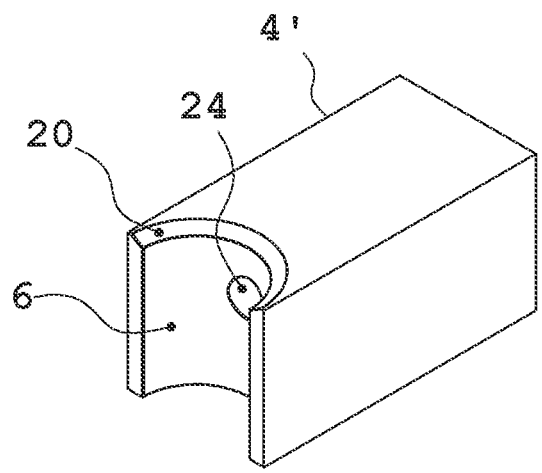
FIG. 24A is a schematic top perspective view of the bar of FIG. 23A.
Figure 24B:
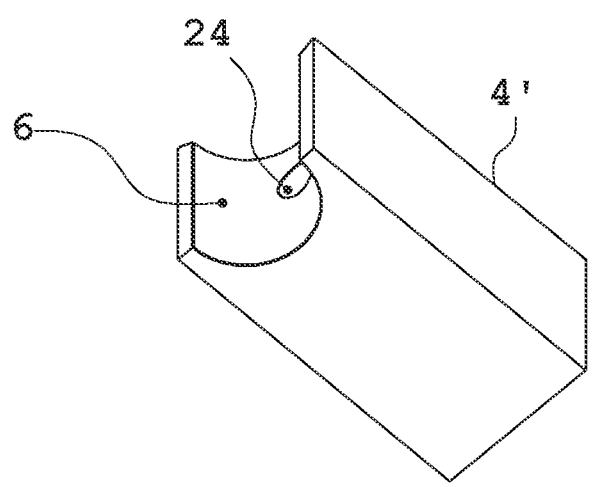
FIG. 24B is a schematic bottom perspective view of the bar of FIG. 24A.
Figure 24D:
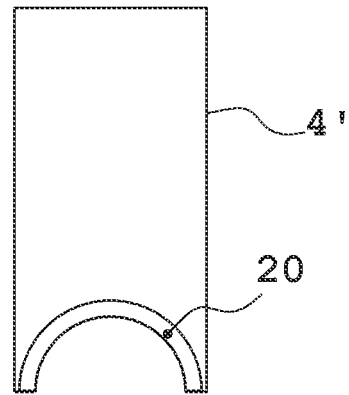
FIG. 24D is a schematic top view of the bar of FIG. 24C.
Figure 24F:
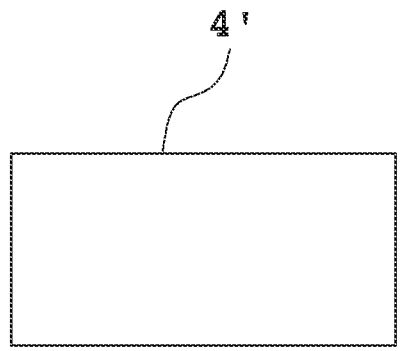
FIG. 24F is a schematic side view of the bar of FIG. 24C.
Figure 24C:
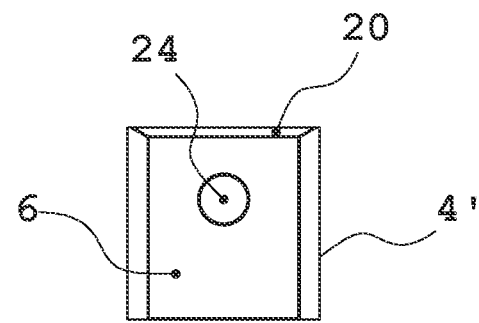
FIG. 24C is a schematic end view of the bar of FIG. 24A.
Figure 24E:
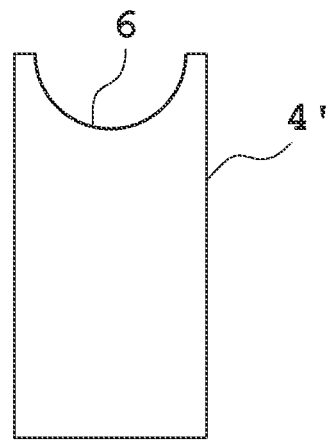
FIG. 24E is a schematic bottom view of the bar of FIG. 24C.

FIG. 24A is a schematic top perspective view of the bar of FIG. 23A. FIG. 24B is a schematic bottom perspective view of the bar of FIG. 24A. FIG. 24C is a schematic end view of the bar of FIG. 24A. FIG. 24D is a schematic top view of the bar of FIG. 24C. FIG. 24E is a schematic bottom view of the bar of FIG. 24C. FIG. 24F is a schematic side view of the bar of FIG. 24C.

FIG. 25A is a schematic top perspective front view of the key of FIG. 23A. FIG. 25B is a schematic top perspective rear view of the key of FIG. 25A. FIG. 25C is a schematic rear view of the key of FIG. 25A. FIG. 25D is a schematic top view of the key of FIG. 25C. FIG. 25E is a schematic bottom view of the key of FIG. 25C. FIG. 25F is a schematic front view of the key of FIG. 25C.

In this embodiment, the bar 4' can form a "valet" embodiment, such as described in FIGS. 14A-14C. In at least one embodiment, the bar 4' can be formed with a single receiver station 6, such as on the end of the bar, with the bar having an outer face 16 adjacent the receiver station. The key 8 can be coupled with the bar 4' in the receiver station. In at least one embodiment, the coupler 12' can be formed at an angle "a" relative to the outer surface 18. In at least one embodiment, the angle can be perpendicular to the key outer surface 18. Thus, this embodiment differs from the coupler 12 on the keys described above such as in FIG. 11A wherein an orientation angle of the coupler 12 can be parallel to the key outer surface 18.

The bar 4' can extend outwardly from the bar 4, described herein. The bar 4' can be useful in separating a particular supported product from other products supported by the above described bars, such as for display. In such a case, the supported product would generally be displayed at an angle, such as a perpendicular angle, to other products that are supported on the bar 4.

Figure 27:
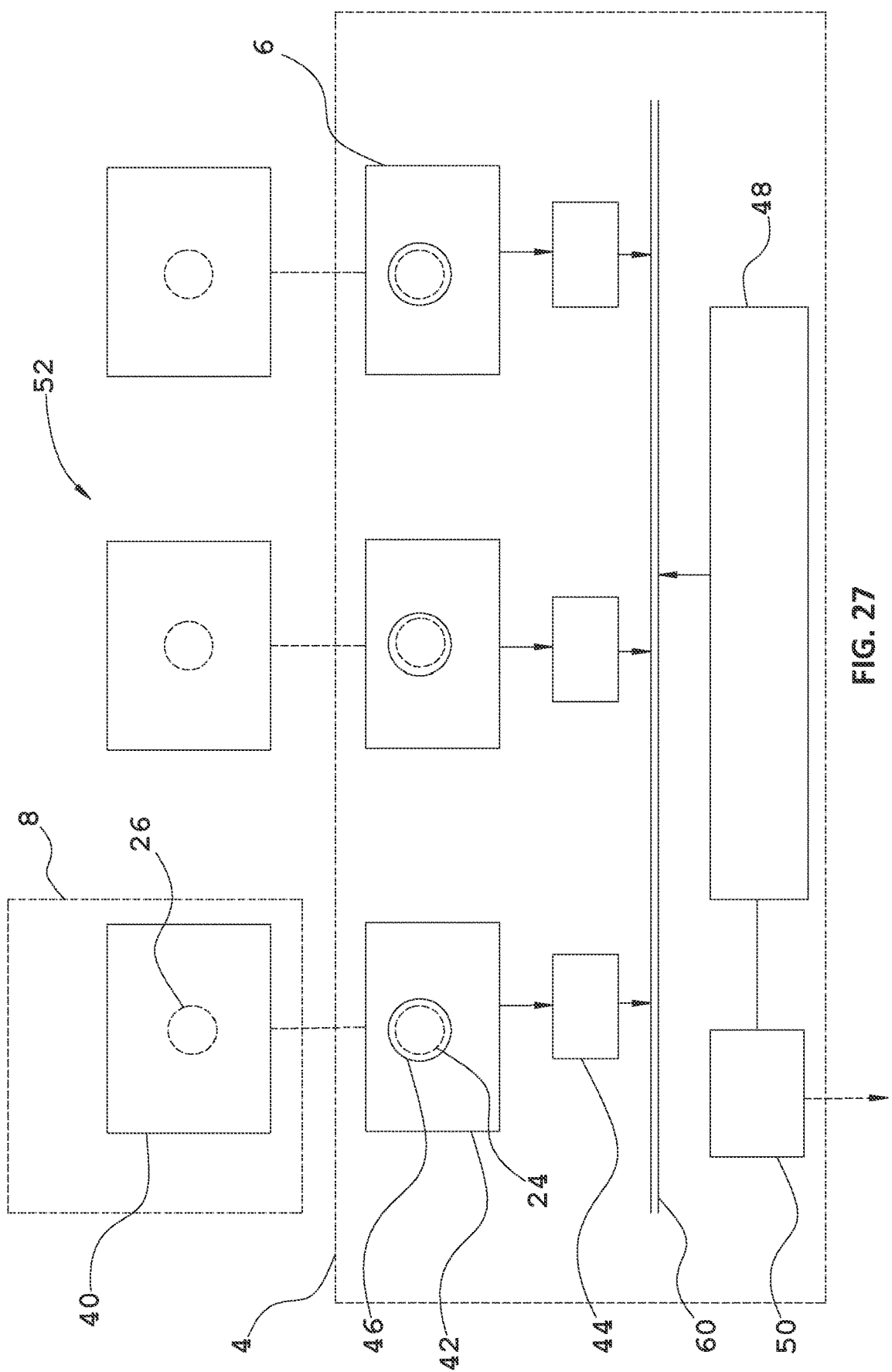

FIG. 26A-27 illustrate another example of an embodiment of the hanging system.

FIG. 26A is a schematic rear of another example of an embodiment of the hanging system having bar with a sensor and/or receiver. FIG. 26B is a schematic front view of another example of an embodiment of the hanging system having a key having a sensor and/or receiver to be coupled with the bar of FIG. 26A. FIG. 26C is a schematic top view of the key of FIG. 26B. FIG. 26D is a schematic bottom view of the key of FIG. 26B. FIG. 26E is a schematic side view of the key of FIG. 26B.

FIG. 27 is a schematic example of an electronic diagram for the hanging system of FIGS. 26A and 26B.

This embodiment includes a data sensing system 52 that can sense movement of the key 8 relative to the bar 4. The embodiment includes a sensor and a receiver with associated circuitry that can be coupled to the bar 4 with the receiver station 6 and the key 8. For example, the key 8 can include a key circuit 40 with an identifier, such as a radio-frequency identification (RFID) sensor chip or a near-field communication (NFC) sensor chip. The key circuit can also include a magnetic field element 26, such as a magnet, for a passive element that can exchange movement information with the bar 4 having corresponding elements of the data sensing system. In this example, the bar 4 can have a receiver antenna 42 with a corresponding magnetic field element 24, such as a ferrous material element or a magnet, and a sensor 46, such as a Hall effect sensor, that can sense when the key with the magnetic field element 26 and the key circuit 40 is moved relative to the bar through changes in the magnetic field created by the magnetic field elements. Associated circuity can include a corresponding bar circuit 44 that communicates with a microcontroller 48 for at least initial manipulation of data. For a plurality of keys and/or receiver stations, the circuits, magnetic field elements, and sensing elements can be replicated with individual (or group) identifiers for tracking. The receiver station(s) can communicate data along a bus 60 with a microcontroller 48. Data from the microcontroller can be communicated to a server or other processor (not shown) through a communication link 50.

FIG. 28A-28B illustrate a lengthened example of an embodiment of the hanging system.

FIG. 28A is a schematic top perspective view of an embodiment of a hanging system. FIG. 28B is a schematic top perspective enlarged view of the embodiment of the hanging system of FIG. 28A.

The hanging system can include the bar 4 having a plurality of receiver stations 6. A bar 4' can be coupled to the bar 4 and extend at an angle, such as perpendicularly, to the bar 4. The bar 4' can also include a receiver station 6. A lateral support 58 can be attached a wall or other structure on one end and to the bar 4 on the other end to support the bar and products hanging from the bar.

FIG. 29 is a schematic top perspective view of an embodiment of a hanging system with examples of product supports having keys removably coupled to receiver stations.

The hanging system can include the bar 4 having a plurality of receiver stations 6. A bar 4' with a receiver station 6 can be coupled to the bar 4 and extend at an angle to the bar 4. A lateral support 58 can be coupled to the bars 4 and 4' and coupled to some structure for supporting the bar and products hanging from the bar. A plurality of keys 8 can be coupled to a plurality of product supports 14. The keys 8 with the product supports 14 can be coupled to various receiver stations 6, as described herein. Products (not shown) can be coupled to the product support 14 and suspended from the bar 4 and bar 4'.

FIGS. 30A-30H illustrate an example of an embodiment of a product support.

FIG. 30A is a schematic top perspective view of an embodiment of a product support with a key configured to be removably coupled with receiver stations. FIG. 30B is a schematic front view of the product support of FIG. 30A. FIG. 30C is a schematic top view of the product support of FIG. 30B. FIG. 30D is a schematic bottom view of the product support of FIG. 30B. FIG. 30E is a schematic side view of the product support of FIG. 30B. FIG. 30F is a schematic cross sectional view of the product support of FIG. 30B. FIG. 30G is a schematic top perspective view of the product support of FIG. 30B prior to coupling with the key. FIG. 30H is a schematic enlarged top perspective view of the product support of FIG. 30G.

An example of a product support 14 is shown in this embodiment for a clothes hanger and is illustrative only. Product supports 14 can vary with the purpose, size, weight, and the particular product to be supported. In at least one embodiment, the product support 14 can be coupled to the key 8 by coupling with the coupler 12. In at least one embodiment, the coupler 12 can engage the hanger 14 through a product support opening 54 as a recess that is configured to fit an outer periphery of the key 8 with the coupler 12. The key slot 54 can assist in maintaining angular alignment of the product support with the key.

FIGS. 31A-32G illustrate another example of an embodiment of the hanging system.

FIG. 31A is a schematic top perspective front view of an embodiment of a bar for a hanging system. FIG. 31B is a schematic front view of the bar of FIG. 31A. FIG. 31C is a schematic top perspective view of the bar of FIG. 31B. FIG. 31D is a schematic bottom perspective view of the bar of FIG. 31B.

FIG. 32A is a schematic top perspective front view of an embodiment of a key configured for the bar of FIG. 31A. FIG. 32B is a schematic bottom perspective front view of the key of FIG. 32A. FIG. 32C is a schematic front view of the key of FIG. 32A. FIG. 32D is a schematic top view of the key of FIG. 32C. FIG. 32E is a schematic bottom view of the key of FIG. 32C. FIG. 32F is a schematic left side view of the key of FIG. 32C. FIG. 32G is a schematic right side view of the key of FIG. 32C.

A bar 4 having a bar outer surface 16 and a bar top surface 32 can include a receiver station 6. A key 8 can be configured to correspond to the receiver station. In at least one embodiment, a top surface 34 of the key is substantially planar with a top surface 32 of the bar, and a key outer surface 16 in the front is substantially planar with a bar outer surface 18 in the front, when the key has been inserted into the receiver station.

Generally, the receiver station 6 can have a width X and depth A, and the key 8 can have a corresponding width X' and depth A' to removably couple with the receiver station. To maintain the key 8 in position on the bar and support weight of the product that can be attached to the key, a bar load bearing surface 20 can be formed on the bar. In at least one embodiment, the bar load bearing surface 20 can be formed on the bar top surface 32. Similarly, a key load bearing surface 22 can be formed on the key 8 to engage the bar load bearing surface 20. The bar load bearing surface 20 can be formed as a stepped shoulder as shown, chamfer, or other shapes that would restrict the movement of the key at least downward when engaged with the bar load bearing surface 22. The shape of the key load bearing surface 22 can be formed to correspond with the shape of the bar load bearing surface 20. The bar load bearing surface 20 can have a front width of Y1 and back width of Y2, and depth B. The key load bearing surface 22 can have a corresponding front width of Y1' and back width of Y2', and depth B'. In the embodiment shown, the bar load bearing surface depth B and key load bearing depth B' can be substantially equal to the receiver station depth A and key depth A'. An integral calculation of the difference between the bar load bearing surface width Y and the receiver station width X along the bar load bearing surface depth B provides a support area of the receiver station. An integral calculation of the difference between the bar load bearing surface width Y' and the receiver station width X' along the bar load bearing surface depth B' provides a support area of the key. The peripheral shape of the bar load bearing surface and corresponding key load bearing surface from a top view as shown and described herein can be formed with a rounded shape, a trapezoidal shape, or other geometric or nongeometric shapes.

FIG. 33A is a schematic top perspective front view of another example of an embodiment of a key configured for the bars of FIGS. 31A and 34A (described below). FIG. 33B is a schematic enlarged perspective front view of the key of FIG. 33A. FIG. 33C is a schematic front view of the key of FIG. 33A. FIG. 33D is a schematic top view of the key of FIG. 33C. FIG. 33E is a schematic bottom view of the key of FIG. 33A. FIG. 33F is a schematic left side view of the key of FIG. 33C. FIG. 33G is a schematic right side view of the key of FIG. 33C.

The key 8 can be shaped with a similar key load bearing surface 22 and overall shape as the key 8 shown in FIGS. 32A-32G. As shown in the top view of FIG. 33D, the periphery shape of the key load bearing surface 22 (and corresponding periphery shape of the bar load bearing surface) can be formed from a segment of depth B' of an area of a circumscribed circle 66 with a center point 64 position along the key shaped (inner) surface 10 of the key. Other shapes are possible and this embodiment is only an example. The key in this embodiment illustrates an extended length that is longer than a height of the receiver station 6 of the bar 4 described herein and can be coupled to a product support supported below the bar. One or more openings 70 in the key 8 can be used to couple a product support to the key.

FIG. 34A is a schematic top perspective front view of another example of an embodiment of a bar for a hanging system having a key portion end. FIG. 34B is a schematic side view of the bar of FIG. 34A. FIG. 34C is a schematic top perspective view of the bar of FIG. 34B. FIG. 34D is a schematic bottom perspective view of the bar of FIG. 34B. FIG. 34E is a schematic rear view of the bar of FIG. 34B.

In this embodiment, the bar 4' can form a valet embodiment that can be removably coupled in a receiver station 6 of a bar 4, as described herein. The bar 4' can include a key portion 62 on an end of the bar. The key portion 62 can be formed with a shape of a key load bearing surface 22, such as described herein for various keys. Thus, the bar 4' can be removably coupled in a corresponding receiver station 6 of the bar 4 in a same or similar manner as a key 8, but with the bar 4' extending outwardly from the bar 4. In a similar manner as the keys 8 and bars 4 described above, the key top surface 34' of the key portion 62 can align in a planar manner with the bar top surface 32 of the bar 4. The bar 4' can be coupled at various receiver stations 6 along a length of the bar 4 having a plurality of receiver stations.

In at least one embodiment, the bar 4', having an outer face 16, can be formed with at least one receiver station 6 along a length of the bar 4', similar to previously described receiver stations formed in the bar 4. A corresponding key 8 can be removably coupled with the bar 4'. The bar 4' can be useful in separating a particular supported product from other products supported by the above described bars, such as for display. In such a case, the supported product would generally be displayed at an angle, such as a perpendicular angle, to other products that are supported on the bar 4.

FIG. 35A is a schematic top perspective view of another embodiment of a hanging system with an example of the bar of FIG. 34A and a key with a product support removably coupled to a receiver station on the bar. FIG. 35B is a schematic top detailed perspective view of a portion of the hanging system of FIG. 35A. FIG. 35C is a schematic top detailed perspective view of another portion of the hanging system of FIG. 35A.

In FIG. 35A, the example of a hanging system 2 can include a bar 4 having a bar top surface 32 and a bar outer face 16 with a plurality of receiver stations 6 formed in the outer face. The bar 4 can be mounted to a supporting structure at an appropriate elevation. An optional bar 4' can be removably coupled to a receiver station on the bar 4 and extend outward from the bar 4. A key top surface 34' of the bar 4' can be planar with the bar top surface 32 of the bar 4 for visual effects, as further illustrated in the detailed FIG. 35B.

The bar 4' can include one or more receiver stations 6 formed in a bar outer surface 16 of the bar 4'. A key 8 coupled to a product support 14 can be removably coupled to the receiver station 6 on the bar 4'. A key outer surface 18 can be aligned in a planar position with the bar outer surface 16 of the bar 4', and a key top surface 34 of the key 8 can be planar with the bar top surface 32 of the bar 4 for visual effects, as further illustrated in the detailed FIG. 35C.

FIG. 36A is a schematic top perspective view of another embodiment of a product support with a key configured to be removably coupled with receiver stations. FIG. 36B is a schematic front view of the product support of FIG. 36A. FIG. 36C is a schematic top view of the product support of FIG. 36B. FIG. 36D is a schematic bottom view of the product support of FIG. 36B. FIG. 36E is a schematic side view of the product support of FIG. 36B. FIG. 36F is a schematic assembly view of the product support of FIG. 36B.

The key 8 and product support 14 can have a variety of shapes as is suitable for supporting a given product. In the embodiment shown, the product support can be fashioned to support clothing as an example. The product support 14 can be formed by joining two portions 14A and 14B with a fastener 76 through opening 70 in the key 8 and extending into each of the two portions.

FIG. 37A is a schematic top perspective front view of an example of an embodiment of a key configured for the bars of FIGS. 31A and 34A. FIG. 37B is a schematic bottom perspective front view of the key of FIG. 37A. FIG. 37C is a schematic front view of the key of FIG. 37A. FIG. 37D is a schematic top view of the key of FIG. 37C. FIG. 37E is a schematic bottom view of the key of FIG. 37C. FIG. 37F is a schematic left side view of the key of FIG. 37C. FIG. 37G is a schematic right side view of the key of FIG. 37C.

The embodiment is generally similar to the embodiment shown in FIGS. 32A-32G. This embodiment further includes one or more openings 70 formed in an end surface 78 of the key 8. The opening 70 can be used to couple a product support with the key. The opening can be optionally threaded for accepting a threaded fastener from the product support, or otherwise formed to be coupled with a product support. In some alternative embodiments, the opening could be used to slide a fastener through the opening so that the coupling occurred from the product support. In such an alternative, side ports (not shown) in the key could be used to allow the fastener to be inserted through the side and then through the opening 70 into a product support for coupled with the product support.

FIG. 38A is a schematic top perspective assembly view of another embodiment of a product support with a bottom perspective view of a key configured to be removably coupled with receiver stations. FIG. 38B is a schematic top perspective assembly view of the product support and a key of FIG. 38A. FIG. 38C is a schematic assembled front view of the product support and key of FIG. 38A. FIG. 38D is a schematic top view of the product support and key of FIG. 38C. FIG. 38E is a schematic bottom view of the product support and key of FIG. 38C. FIG. 38F is a schematic right side view of the product support and key of FIG. 38C.

The example of a product support 14' can be in the general form of a ledge to support products hanging from the ledge or draped over the ledge. A key 8 with opening 70 can be coupled with the product support having aligned corresponding opening 72. In the embodiment, threaded fasteners (not shown) can be inserted up through the openings 72 of the product support and into the key 8 where the openings 70 can be threaded and tightened to couple firmly the key and product support. Coupling in other methods are contemplated including integrally forming, adhesively coupling, welding if appropriate, and other known methods of coupling. Further, the product support can be formed to offset a lower portion below the key by an offset distance Z from a key longitudinal axis 74 to adjust a center of gravity of the product support and products hanging therefrom relative to the key 8 with the key load bearing surface 22.

FIG. 38G is a schematic top perspective view of the product support and key of FIG. 38C coupled in a receiver station of a bar. FIG. 38H is a schematic front view of the product support and key with the bar of FIG. 38G. FIG. 38I is a schematic top view of the product support and key with the bar of FIG. 38G. FIG. 38J is a schematic right side view of the product support and key with the bar of FIG. 38G.

The shape of the product support 14' and key 8 can merge with the shape of the bar 4 (or bar 4' or 4") to provide a smooth planar alignment with the mating front and top surfaces in the proximate to the receiver station 6. The key outer surface 18 can be planar with the bar outer surface 16. The key top surface 34 can be planar with the bar top surface 32.

FIG. 39A is a schematic top perspective view of another embodiment of a product support with a plurality of keys configured to be removably coupled with receiver stations. FIG. 39B is a schematic assembled front view of the product support and keys of FIG. 39A. FIG. 39C is a schematic top view of the product support and keys of FIG. 39B. FIG. 39D is a schematic bottom view of the product support and keys of FIG. 38B. FIG. 39E is a schematic right side view of the product support and keys of FIG. 38B.

The example of a product support 14" can be in the general form of an extended ledge with a curved surface to support products hanging from the ledge or draped over the ledge. In this embodiment, a plurality of keys 8A and 8B with openings, such as described in FIGS. 38A and 38B, can be coupled with the product support having aligned corresponding openings 72. The keys 8A and 8B can be firmly coupled with the product support. Further, the product support can be formed to offset a lower portion below the key by an offset distance, as described above, to adjust a center of gravity of the product support and products hanging therefrom relative to the keys 8A and 8B with the key load bearing surfaces 22A and 22B.

FIG. 40 is a schematic top perspective view of another embodiment of a hanging system with an example of the bar of FIG. 31A and a key with the product support of FIG. 39A removably coupled to a receiver station on the bar.

With appropriate spacing of the keys 8A and 8B of FIG. 39A, the keys can be inserted into corresponding receiver stations 6A and 6B of the bar 4. As described in other embodiments, for visual appeal, the key outer surfaces 18A and 18B can be planar aligned with the bar outer surface 16 and the key top surfaces 34A and 34B can be planar aligned with the bar top surface 32, so that the surfaces appear smooth and uniform across the receiver stations.

FIG. 41 is a schematic top perspective view of another embodiment of a hanging system with examples of another bar and product supports having keys removably coupled to receiver stations.

The example of a hanging system 2 can include a bar 4 having a plurality of receiver stations 6 formed in the outer face 16. The bar 4 can be mounted to a supporting structure (not shown) at an appropriate elevation. A bar 4' can be removably coupled to a receiver station 6 on the bar 4 and extend outward from the bar 4. A key top surface 34' of the bar 4' can be planar with the bar top surface 32 of the bar 4 for visual effects. The bar 4' can be include one or more receiver stations 6 formed in a bar outer surface 16 of the bar 4'. A key 8 coupled to a product support 14 can be removably coupled to the receiver station 6 on the bar 4'. A key outer surface 18 can be aligned in a planar position with the bar outer surface 16 of the bar 4'. A plurality of keys 8 with product supports 14 can be coupled at various receiving stations. A key 8 with a different product support 14' can be coupled at another receiving station 6. The assembly can be modular by inserting various types of bars 4', product supports 14 and 14', and other variations to arrange a custom hanging system.

Other and further embodiments utilizing one or more aspects of the inventions described above can be devised without departing from the disclosed invention as defined in the claims. For example, other embodiments can types of keys, bar and key load bearing surfaces, magnetic field elements; anti-rotation elements, sensors and circuit and antennae, and other variations than those specifically disclosed above within the scope of the claims.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. A hanging system, comprising:
a bar having a top surface defining in part a plurality of receiving stations, and at least one receiver station having a bar load bearing surface; and
a key having a shaped surface and a key load bearing surface configured to be coupled to the bar load bearing surface on the at least one receiver station to support the key at least vertically in the bar and a coupler configured to be coupled to a product support, the key having a top surface planar with the bar top surface when the key load bearing surface is coupled with the bar load bearing surface.

2. The hanging system of claim 1, wherein the plurality of receiver stations are spaced at predetermined distances from each other and configured to restrict spacing of keys along the bar.

3. The hanging system of claim 1, wherein the bar and key are configured to suspend products independent of a hook.

4. The hanging system of claim 1, wherein bar is formed with a bar outer surface and the key is formed with a key outer surface, and wherein the key outer surface is aligned in a plane with the bar outer surface when coupled with the bar outer surface.

5. The hanging system of claim 1, further comprising an electronic circuit coupled with the bar and the key and configured to communicate when the bar and key are moved relative to each other.

6. The hanging system of claim 1, wherein the receiver stations comprise at least one recessed receiver and the key comprises a protruding shape configured to engage with the recessed receiver.

7. The hanging system of claim 6, wherein the key fits evenly with the bar outer surface when engaged with the recessed receiver.

8. The hanging system of claim 6, wherein the recessed receiver is configured to support vertically the key when the key is engaged with the recessed receiver.

9. The hanging system of claim 8, wherein the shaped load bearing surface comprises one of a chamfer and a stepped surface.

10. The hanging system of claim 8, wherein the key is laterally coupled with the recessed receiver with a magnetic field.

11. The hanging system of claim 1, wherein the key and at least one of the receiver stations are removably coupled with a magnetic field and the magnetic field resists rotation of the key relative to the receiver station.

12. The hanging system of claim 1, further comprising a support coupled to the bar to elevate the bar above a surface.

13. The hanging system of claim 1, wherein at least one of the coupler and the product support extend through a bottom of the bar.

14. The handing system of claim 1, wherein the coupling between the receiver station and the key restrains the key laterally with the receiver station.

* * * * *